US012467091B2

(12) United States Patent
Hamet et al.

(10) Patent No.: US 12,467,091 B2
(45) Date of Patent: Nov. 11, 2025

(54) POLYGENIC RISK SCORES FOR PREDICTING DISEASE COMPLICATIONS AND/OR RESPONSE TO THERAPY

(71) Applicants: OPTI-THERA INC., Montréal (CA); LES LABORATOIRES SERVIER, Suresnes (FR); VAL-CHUM, LIMITED PARTNERSHIP, Québec (CA)

(72) Inventors: Pavel Hamet, Montréal (CA); Johanne Tremblay, Montréal (CA)

(73) Assignees: OPTI-THERA INC., Montréal (CA); LES LABORATOIRES SERVIER, Suresnes (FR); VAL-CHUM, LIMITED PARTNERSHIP, Québec (CA)

( * ) Notice: Subject to any disclaimer, the term of this patent is extended or adjusted under 35 U.S.C. 154(b) by 962 days.

(21) Appl. No.: 17/252,140

(22) PCT Filed: Jun. 14, 2019

(86) PCT No.: PCT/CA2019/050848
§ 371 (c)(1),
(2) Date: Dec. 14, 2020

(87) PCT Pub. No.: WO2019/237209
PCT Pub. Date: Dec. 19, 2019

(65) Prior Publication Data
US 2021/0254164 A1  Aug. 19, 2021

Related U.S. Application Data

(60) Provisional application No. 62/685,642, filed on Jun. 15, 2018.

(51) Int. Cl.
*C12Q 1/6883* (2018.01)
*G16B 10/00* (2019.01)
*G16B 20/20* (2019.01)
*G16B 40/00* (2019.01)

(52) U.S. Cl.
CPC ........... *C12Q 1/6883* (2013.01); *G16B 10/00* (2019.02); *G16B 20/20* (2019.02); *G16B 40/00* (2019.02); *C12Q 2600/106* (2013.01); *C12Q 2600/118* (2013.01); *C12Q 2600/156* (2013.01)

(58) Field of Classification Search
CPC ...... C12Q 1/6883; G16B 20/20; G16B 10/10; G16B 40/00
See application file for complete search history.

(56) References Cited

U.S. PATENT DOCUMENTS

2007/0059722 A1  3/2007  Salonen et al.
2010/0070455 A1  3/2010  Halperin et al.
2016/0125141 A1  5/2016  Raisaro et al.

FOREIGN PATENT DOCUMENTS

WO  2012025055 A1  3/2012
WO  2012038827 A2  3/2012
WO  2014134970 A1  9/2014
WO  2016146811 A1  9/2016

OTHER PUBLICATIONS

Reisberg (PloS ONE 12(7) e0179238 2017).*
International Search Report and Written Opinion mailed Aug. 27, 2019 for corresponding International Application No. PCT/CA2019/050848 (Authorized officer, Richin Choi), 9 pages.
Abraham et al., "Genomic risk prediction of complex human disease and its clinical application", Current Opinion in Genetics & Development, 2015, vol. 33, pp. 10-16.
ADVANCE Collaborative Group, Patel et al., "Intensive blood glucose control and vascular outcomes in patients with type 2 diabetes", The New England Journal of Medicine, 2008, vol. 358, pp. 2560-2572.
Ahlqvist et al., "Novel subgroups of adult-onset diabetes and their association with outcomes: a data-driven cluster analysis of six variables", Lancet Diabetes Endocrinol, 2018, vol. 6, pp. 361-369.
American Diabetes Association, "9. Cardiovascular Disease and Risk Management: Standards of Medical Care in Diabetes-2018", Diabetes Care, 2018, vol. 41, Supplement 1, pp. S86-S104.
Anand et al., "Genetic information and the prediction of incident type 2 diabetes in a high-risk multiethnic population: the EpiDREAM genetic study", Diabetes Care, 2013, vol. 36, pp. 2836-2842.
Cunningham et al., "Ensembl 2015", Nucleic Acids Research, 2015, vol. 43, pp. D662-D669.
Curtis, David, "Polygenic risk score for schizophrenia is more strongly associated with ancestry than with schizophrenia", Psychiatric Genetics 2018, vol. 28, pp. 85-89.
D'Agostino et al., "General cardiovascular risk profile for use in primary care: the Framingham Heart Study", Circulation, 2008, vol. 117, pp. 743-753.
DCCT/EDIC research group, "Effect of intensive diabetes treatment on albuminuria in type 1 diabetes: long-term follow-up of the Diabetes Control and Complications Trial and Epidemiology of Diabetes Interventions and Complications study", Lancet Diabetes Endocrinol, 2014, vol. 2, No. 10, pp. 793-800.

(Continued)

*Primary Examiner* — Jerry Lin
(74) *Attorney, Agent, or Firm* — MH2 Technology Law Group, LLP

(57) ABSTRACT

Methods, processes, and systems for predicting a subject's disease complications and/or response to therapy are described herein. The methods generally comprise genotyping or receiving genotyping information from the subject at a plurality of risk alleles associated with the disease and at a plurality of ancestry-informative markers. The genotyping information is used to generate a polygenic risk score (PRS) by weighting the number of risk alleles by the effect size of their association (weighted genetic risk score or wGRS), combined with a geo-ethnic principal component (PC) determined from the subject's genotype at said ancestry-informative markers. The PRS enables better prediction of the subject's disease complications and/or response to therapy, as compared to a corresponding PRS generated lacking the geo-ethnic principal component. Computer-implemented methods and processes are also described herein.

20 Claims, 33 Drawing Sheets

(56) References Cited

OTHER PUBLICATIONS

De Vries et al., "Incremental predictive value of 152 single nucleotide polymorphisms in the 10-year risk prediction of Incident coronary heart disease: the Rotterdam Study", International Journal of Epidemiology, 2015, vol. 44, No. 2, pp. 682-688.
Delaneau et al., "A linear complexity phasing method for thousands of genomes", Nature Methods, 2011, vol. 9, No. 2, pp. 179-181.
Delong et al., "Comparing the areas under two or more correlated receiver operating characteristic curves: a nonparametric approach", Biometrics, 1988, vol. 44, pp. 837-845.
Emerging Risk Factors Collaboration, Sarwar et al., "Diabetes mellitus, fasting blood glucose concentration, and risk of vascular disease: a collaborative meta-analysis of 102 prospective studies", Lancet, 2010, vol. 375, pp. 2215-2222.
Escott-Price et al., "Polygenic score prediction captures nearly all common genetic risk for Alzheimer's disease", Neurobiology of Aging, 2017, vol. 49, pp. 214.e7-e214.e11.
Hamet et al., "PROX1 gene CC genotype as a major determinant of early onset of type 2 diabetes in slavic study participants from Action in Diabetes and Vascular Disease: Preterax and Diamicron MR Controlled Evaluation study", Journal of Hypertension, 2017, vol. 35, Suppl 1, pp. S24-S32.
Hamet P., "Missing heritability or need for reality check of clinical utility in genomic testing?", Journal of Hypertension, 2014, vol. 32, pp. 1395-1396.
Howie et al., "A flexible and accurate genotype imputation method for the next generation of genome-wide association studies", PLoS Genet, 2009, vol. 5, Issue 6, e1000529, 15 pages.
1,000GP Phase 1 haplotypes Dec. 9, 2013, printed from https://mathgen.stats.ox.ac.uk/impute/1000GP_Phase3.html, on Dec. 9, 2020, 2 pages (author unknown).
Ibrahim-Verbaas et al., "Predicting stroke through genetic risk functions: the CHARGE Risk Score Project", Stroke, 2014, vol. 45, No. 2, pp. 403-412.
Jacobs et al., "Burden of Mortality Attributable to Diagnosed Diabetes: A Nationwide Analysis Based on Claims Data From 65 Million People in Germany", Diabetes Care, 2017, vol. 40, pp. 1703-1709.
Kengne et al., "The Framingham and UK Prospective Diabetes Study (UKPDS) risk equations do not reliably estimate the probability of cardiovascular events in a large ethnically diverse sample of patients with diabetes: the Action in Diabetes and Vascular Disease: Preterax and Diamicron-MR Controlled Evaluation (ADVANCE) Study", Diabetologia, 2010, vol. 53, pp. 821-831.
Kengne et al., "Contemporary model for cardiovascular risk prediction in people with type 2 diabetes", European Journal of Cardiovascular Prevention & Rehabilitation, 2011, vol. 18, No. 3, pp. 393-398.
Kengne, Andre Pascal, "The ADVANCE cardiovascular risk model and current strategies for cardiovascular disease fisk evaluation in people with diabetes", Cardiovascular Journal of Africa, 2013, vol. 24, No. 9/10, pp. 376-381.
Lall et al., "Personalized risk prediction for type 2 diabetes: the potential of genetic risk scores", Genet Med, 2017, vol. 19, No. 3, pp. 322-329.
Lei et al., "Enrichment of minor allele of SNPs and genetic prediction of type 2 diabetes risk in British population", PLoS One, 2017, vol. 12, No. 11, e0187644, 13 pages.
Li et al., "Application of computational methods in genetic study of inflammatory bowel disease", World J Gastroenterol, 2016, vol. 22, No. 3, pp. 949-960.
Ma et al., "Genetic risk score and risk of stage 3 chronic kidney disease", BMC Nephrology, 2017, vol. 18, No. 32, 6 pages.
Mega et al., "Genetic risk, coronary heart disease events, and the clinical benefit of statin therapy: an analysis of primary and secondary prevention trials", Lancet, 2015, vol. 385, Issue 9984, pp. 2264-2271.
Mihaescu et al., "Predictive genetic testing for the identification of high-risk groups: a simulation study on the impact of predictive ability", Genome Medicine, 2011, vol. 3, No. 51, 8 pages.
Ninomiya et al., "Albuminuria and kidney function independently predict cardiovascular and renal outcomes in diabetes", J Am Soc Nephrol, 2009, vol. 20, pp. 1813-1821.
Patel et al., "Effects of a fixed combination of perindopril and indapamide on macrovascular and microvascular putcomes in patients with type 2 diabetes mellitus (the ADVANCE trial): a randomised controlled trial", Lancet, 2007, vol. 370, pp. 829-840.
Patel et al., "Association of a genetic risk score with prevalent and incident myocardial infarction in subjects undergoing coronary angiography", Circ Cardiovasc Genet, 2012, vol. 5, pp. 441-449.
Price et al., "Principal components analysis corrects for stratification in genome-wide association studies", Nature Genetics, 2006, vol. 38, No. 8, pp. 904-909.
Purcell et al., "PLINK: a tool set for whole-genome association and population-based linkage analyses", The American Journal of Human Genetics, 2007, vol. 81, pp. 559-575.
Radholm et al., "Use of the waist-to-height-ratio to predict cardiovascular risk in patients with diabetes: results from ADVANCE-ON", Diabetes Obes Metab, 2018, 21 pages.
Raj et al., "fastSTRUCTURE: variational inference of population structure in large SNP data sets", Genetics, 2014, vol. 197, pp. 573-589.
Robin et al., "pROC: an open-source package for R and S+ to analyze and compare ROC curves", BMC Bioinformatics, 2011, vol. 12, No. 77, 8 pages.
Southam et al., "The effect of genome-wide association scan quality control on imputation outcome for common variants", European Journal of Human Genetics, 2011, vol. 19, pp. 610-614.
United Kingdom Prospective Diabetes Study (UKPDS) Group, Stevens et al., "The UKPDS risk engine: a model for the risk of coronary heart disease in Type II diabetes (UKPDS 56)", Clinical Science, 2001, vol. 101, pp. 671-679.
Today Study Group, Lynch et al., "Rapid rise in hypertension and nephropathy in youth with type 2 diabetes: the TODAY clinical trial", Diabetes Care, 2013, vol. 36, No. 1735-1741.
Van Dieren et al., "Prediction models for the risk of cardiovascular disease in patients with type 2 diabetes: a systematic review", Heart, 2012, vol. 98, pp. 360-369.
Van Setten et al., "Serum lipid levels, body mass index, and their role in coronary artery calcification: a polygenic analysis", Circ Cardiovasc Genet, 2015, vol. 8, pp. 327-333.
Witoelar et al., "Genome-wide Pleiotropy Between Parkinson Disease and Autoimmune Diseases", JAMA Neurol, 2017, vol. 74, No. 7, pp. 780-792.
Wong et al., "Long-term Benefits of Intensive Glucose Control for Preventing End-Stage Kidney Disease: ADVANCE-ON", Diabetes Care, 2016, vol. 39, No. 694-700.
Wu et al., "Functional annotation of sixty-five type-2 diabetes risk SNPs and its application in risk prediction", Sci Rep, 2017, vol. 7, e43709, 11 pages.
Zarkoob et al., "Utilization of genetic data can improve the prediction of type 2 diabetes incidence in a Swedish cohort", PLoS One, 2017, vol. 12, e0180180, 17 pages.
Zoungas et al., "Follow-up of blood-pressure lowering and glucose control in type 2 diabetes", N Engl J Med, 2014, vol. 371, pp. 1392-1406.
Zoungas et al., "Combined effects of routine blood pressure lowering and intensive glucose control on macrovascular and microvascular outcomes in patients with type 2 diabetes: New results from the ADVANCE trial", Diabetes Care, 2009, vol. 32, No. 11, pp. 2068-2074.
Zoungas et al., "Impact of age, age at diagnosis and duration of diabetes on the risk of macrovascular and microvascular complications and death in type 2 diabetes", Diabetologia, 2014, vol. 57, pp. 2465-2474.
Chatterjee, Nilanjan et al., "Projecting the performance of risk prediction based on polygenic analyses of genome-wide association studies," Nature Genetics, Apr. 2013, vol. 45, No. 4, 9 pages.

(56) References Cited

OTHER PUBLICATIONS

Supplementary European Search Report mailed Feb. 23, 2022 for corresponding International Application No. EP 19819320.3, 4 pages.
Tremblay et al., "Polygenic risk scores predict diabetes complications and their response to intensive blood. pressure and glucose control" and Electronic Supplemental Material, Diabetologia, 2021, vol. 64, pp. 2012-2025.
Choi et al., "PRSice-2: Polygenic Risk Score software for biobank-scale data", Gigascience, Jul. 1, 2019, vol. 8, No. 7, pp. 1-6. doi: 10.1093/gigascience/giz082.
Mak et al., "Polygenic scores via penalized regression on summary statistics", Genet Epidemiol, Sep. 2017, vol. 41, No. 6, pp. 469-480. DOI: 10.1002/gepi.22050.
Mlhjalmsson et al., "Modeling Linkage Disequilibrium Increases Accuracy of Polygenic Risk Scores" Am J Hum Genet, Oct. 1, 2015, vol. 97, No. 4, pp. 576-592.

\* cited by examiner

Fig. 1

Characteristics of ADVANCE genotyped participants at baseline in comparison with whole ADVANCE cohort

| Characteristic | Genotyped ADVANCE (N = 4098) | Whole ADVANCE (N = 11,140)* |
|---|---|---|
| Age — yr; Mean (SD) | 67 (7) | 66 (6) |
| Female sex — no (%) | 1524 (37.2) | 4735 (43) |
| Diagnosis age — yr; Mean (SD) | 60 (9) | 58 (9) |
| Diabetes duration — yr; Median (SD) | 5 (2-10) | 7 (3-11) |
| BMI — kg/m$^2$; Mean (SD) | 30 (5) | 28 (5) |
| HbA$_{1c}$— %; Mean (SD) | 7.31 (1.36) | 7.50 (1.6) |
| SBP — mmHg; Mean (SD) | 147 (21) | 145 (21) |
| DBP — mmHg; Mean (SD) | 82 (11) | 81 (11) |
| History of currently treated hypertension — n (%) | 2635 (64) | 7655 (69) |
| eGFR — ml/min/1.73 m$^2$; Median (IQR) | 72.9 (61.0-85.7) | 75.9 (63.6-89.7) |
| eGFR ≥ 90; no (%) | 653 (16) | 2611 (25) |
| eGFR 60 to 89; no (%) | 2465 (61) | 5996 (56) |
| eGFR < 60; no (%) | 956 (23) | 2033 (19) |
| UACR — μg/mg; Median (IQR) | 13.7 (6.2-39.7) | 15.0 (7.1-39.8) |
| UACR < 30; no (%) | 2702 (70) | 7377 (69) |
| UACR 30 to 300; no (%) | 996 (26) | 2862 (27) |
| UACR > 300; no (%) | 178 (4) | 401 (4) |

* The values of all characteristics for whole ADVANCE are reported and extracted from Patel et al. [16] except for eGFR & UACR, extracted from Ninomiya T. et al. [17] Abbreviation: n: Number of patients, yr: Years, SD: Standard deviation, IQR: Interquartile range. BMI: Body mass index, HbA$_{1c}$: Glycated hemoglobin, SBP: Systolic blood pressure, DBP: Diastolic blood pressure, eGFR: Estimated glomerular filtration rate based on CKD-EPI formula, UACR: Urinary albumin creatinine ratio.

Fig. 5

SNPs are selected from literature and divided into 9 risk groups of complications of T2D

| Risk group | Phenotypes | Included SNPs | Reference number |
|---|---|---|---|
| Diabetes | Type 2 Diabetes, Glycated hemoglobin | 45 | 3,18,19 |
| Obesity | Body mass index, Waist circumference, Waist hip ratio | 81 | 3,20,21 |
| Albuminuria | Microalbuminuria, Urinary albumin creatinine ratio | 35 | 22 |
| GFR | Estimated glomerular filtration rate, Plasma creatinine, End-stage renal disease | 59 | 3,23 |
| BP | Hypertension, Pulse pressure, Systolic blood pressure | 82 | 3,24-26 |
| Biomarkers levels | C-reactive protein, Fibrinogen | 19 | 3 |
| Lipids | High density lipoprotein, Low density lipoprotein, Total Cholesterol, Triglycerides | 78 | 3,21 |
| Cardiovascular | Atrial fibrillation, Coronary artery calcification, Coronary artery disease, Coronary Heart disease, Intracranial aneurysm, Myocardial infarction, , Stroke | 169 | 3,27-46 |
| Birth weight | Birth weight | 54 | 47 |
| Total risk SNPs |  | 622 |  |

SNPs are selected from the listed references as adapted from the model described by Ibrahim-Verbaas CA[3].

Fig. 6
List of 622 SNPs organized by risk groups

| Original SNP | Chr | Position of original SNP (GRCh37) | Locus (Gene) | Functional Consequence | Alleles Effect | Alleles Other | EAF | European ancestry values as published β | European ancestry values as published p-value | Present in ADVANCE? | Best ADVANCE Proxy | ADVANCE Effect Allele | Risk Factor | Reference |
|---|---|---|---|---|---|---|---|---|---|---|---|---|---|---|
| DIABETES | | | | | | | | | | | | | | |
| rs10923931 | 1 | 120517959 | NOTCH2 | Intron | T | G | 0.10 | 0.086 | 6.52E-05 | No | rs835576 | C | T2D | 3 |
| rs2779116 | 1 | 158585415 | SPTA1 | Intron | T | C | 0.27 | 0.020 | 2.75E-09 | Yes | | T | HbA1c | 18 |
| rs340874 | 1 | 214159256 | PROX1, PROX1-AS1 | Intron | C | T | 0.50 | 0.068 | 7.20E-10 | Yes | | C | T2D | 3 |
| rs7578597 | 2 | 43732823 | THADA | Exon non-syn. | T | C | 0.91 | 0.140 | 4.47E-05 | Yes | | T | T2D | 3 |
| rs243021 | 2 | 60584819 | LOC105374754-MIR4432HG | | A | G | 0.46 | 0.086 | 2.90E-15 | Yes | | A | T2D | 3 |
| rs7593730 | 2 | 161171454 | RBMS1 | Intron | C | T | 0.80 | 0.104 | 3.70E-08 | Yes | | C | T2D | 3 |
| rs552976 | 2 | 169791438 | ABCB11 | Intron | G | A | 0.64 | 0.050 | 8.16E-18 | Yes | | G | HbA1c | 18 |
| rs7578326 | 2 | 227020653 | LOC646736 | Intron | A | G | 0.64 | 0.113 | 1.30E-19 | Yes | | A | T2D | 3 |
| rs1801282 | 3 | 12393125 | PPARG | Exon non-syn. | C | G | 0.86 | 0.131 | 8.01E-06 | Yes | | C | T2D | 3 |
| rs4607103 | 3 | 64711904 | ADAMTS9-AS2 | Intron | C | T | 0.76 | 0.086 | 2.34E-04 | Yes | | C | T2D | 3 |
| rs11708067 | 3 | 123065778 | ADCY5 | Intron | A | G | 0.80 | 0.113 | 9.90E-21 | No | rs11720108 | C | T2D | 3 |
| rs1470579 | 3 | 185529080 | IGF2BP2 | Intron | C | A | 0.30 | 0.131 | 2.17E-09 | Yes | | C | T2D | 3 |
| rs10010131 | 4 | 6295693 | WFS1 | Intron | G | C | 0.60 | 0.104 | 4.59E-07 | No | rs1801214 | T | T2D | 3 |
| rs7754840 | 6 | 20661250 | CDKAL1 | Intron | C | G | 0.33 | 0.113 | 3.11E-15 | Yes | | C | T2D | 3 |
| rs1800562 | 6 | 26093141 | HFE | Exon non-syn. | G | A | 0.94 | 0.060 | 2.59E-20 | No | rs115740542 | T | HbA1c | 18 |
| rs9472138 | 6 | 43811762 | LOC107986598 | Intron | T | C | 0.28 | 0.058 | 4.00E-06 | Yes | | T | T2D | 3 |
| rs2191349 | 7 | 15064309 | DGKB-AGMO | | T | G | 0.50 | 0.058 | 1.10E-08 | Yes | | T | T2D | 3 |
| rs864745 | 7 | 28180556 | JAZF1 | Intron | T | C | 0.51 | 0.095 | 2.06E-08 | Yes | | T | T2D | 3 |
| rs1799884 | 7 | 44229068 | GCK | Upstream 2KB | C | T | 0.18 | 0.040 | 1.45E-20 | Yes | | T | HbA1c | 18 |
| rs4607517 | 7 | 44235668 | GCK-YKT6 | | A | G | 0.20 | 0.068 | 5.00E-08 | Yes | | A | T2D | 3 |
| rs972283 | 7 | 130466854 | LOC105375508 | Intron | A | G | 0.55 | 0.095 | 4.40E-10 | Yes | | G | T2D | 3 |
| rs4737009 | 8 | 41630405 | ANK1 | Intron | A | G | 0.24 | 0.030 | 6.11E-12 | Yes | | A | HbA1c | 18 |
| rs896854 | 8 | 95960511 | NDUFAF6, TP53INP1 | Intron, 5'UTR | C | T | 0.48 | 0.095 | 2.00E-09 | Yes | | T | T2D | 3 |
| rs13266634 | 8 | 118184783 | SLC30A8 | Exon non-syn. | A | G | 0.30 | 0.019 | 4.90E-08 | Yes | | A | HbA1c | 19 |
| rs10811661 | 9 | 22134094 | CDKN2B-AS1-DMRTA1 | | T | C | 0.83 | 0.182 | 1.45E-10 | No | rs10965250 | G | T2D | 3 |
| rs13292136 | 9 | 81952128 | PSAT1-TLE4 | | C | T | 0.93 | 0.182 | 2.80E-08 | Yes | | C | T2D | 3 |
| rs12779790 | 10 | 12328010 | CDC123-CAMK1D | Exon non-coding | G | A | 0.20 | 0.104 | 6.75E-04 | Yes | | G | T2D | 3 |
| rs1111875 | 10 | 94462882 | HHEX-EXOC6 | | C | T | 0.57 | 0.122 | 9.10E-15 | No | rs5015480 | C | T2D | 3 |
| rs2334499 | 11 | 1696849 | FAM99A-FAM99B | | T | C | 0.41 | 0.104 | 1.70E-02 | Yes | | T | T2D | 3 |
| rs231362 | 11 | 2691471 | KCNQ1 | Intron | G | A | 0.52 | 0.104 | 4.70E-13 | Yes | | G | HbA1c | 18 |
| rs2237892 | 11 | 2839751 | KCNQ1 | Intron | C | T | 0.94 | 0.131 | 2.70E-03 | No | rs2283228 | A | T2D | 3 |
| rs5215 | 11 | 17408630 | KCNJ11 | Exon non-syn. | C | T | 0.41 | 0.104 | 1.60E-05 | No | rs1002226 | C | T2D | 3 |
| rs1552224 | 11 | 72433098 | ARAP1 | Exon non-coding | A | C | 0.88 | 0.122 | 2.90E-22 | No | rs76550717 | A | T2D | 3 |
| rs1387153 | 11 | 92673828 | FAT3-MTNR1B | | T | C | 0.28 | 0.030 | 3.96E-11 | No | rs11020124 | C | HbA1c | 18 |
| rs10830963 | 11 | 92708710 | MTNR1B | Intron | G | C | 0.30 | 0.122 | 1.01E-06 | Yes | | G | T2D | 3 |

Fig. 6 (continued)

| Original SNP | Chr | Position of original SNP (GRCh37) | Locus (Gene) | Functional Consequence | Alleles Effect | Alleles Other | EAF | European ancestry values as published β | European ancestry values as published p-value | Present in ADVANCE? | Best ADVANCE Proxy | ADVANCE Effect Allele | Risk Factor | Reference |
|---|---|---|---|---|---|---|---|---|---|---|---|---|---|---|
| rs1153188 | 12 | 55098996 | DCD-MUCL1 |  | A | T | 0.73 | 0.077 | 1.80E-07 | Yes |  | A | T2D | 3 |
| rs1531343 | 12 | 66174894 | RPSAP52 | Intron | C | G | 0.10 | 0.182 | 7.20E-09 | No | rs2884591 | C | T2D | 3 |
| rs7961581 | 12 | 71663102 | TSPAN8-LGR5 |  | C | T | 0.25 | 0.086 | 1.82E-05 | Yes |  | C | T2D | 3 |
| rs7957197 | 12 | 121460686 | OASL | Intron | T | A | 0.85 | 0.131 | 4.90E-08 | No | rs7131696 | T | T2D | 3 |
| rs7998202 | 13 | 113331868 | ATP11AUN | Intron | G | A | 0.14 | 0.030 | 5.24E-09 | No | rs166864 | A | HbA1c | 18 |
| rs11634397 | 15 | 80432222 | ZFAND-FAH |  | G | A | 0.60 | 0.104 | 2.40E-09 | Yes |  | G | T2D | 3 |
| rs8042680 | 15 | 91521337 | PRC1, PRC1-AS1 | Intron, Intron | A | C | 0.22 | 0.095 | 4.10E-10 | Yes |  | A | T2D | 3 |
| rs9939609 | 16 | 53820527 | FTO | Intron | A | T | 0.40 | 0.113 | 8.65E-08 | Yes |  | A | T2D | 3 |
| rs1045896 | 17 | 80685533 | FN3KRP | 3'UTR | T | C | 0.31 | 0.040 | 1.57E-26 | Yes |  | T | HbA1c | 18 |
| rs855791 | 22 | 37462936 | TMPRSS6 | Exon non-syn. | A | G | 0.42 | 0.030 | 2.74E-14 | Yes |  | A | HbA1c | 18 |
| OBESITY | | | | | | | | | | | | | | |
| rs3127553 | 1 | 49438005 | AGBL4 | Intron | A | G | 0.63 | 0.023 | 1.60E-10 | Yes |  | A | WC | 20 |
| rs2815752 | 1 | 72812440 | LOC105378797 | Intron | A | G | 0.61 | 0.130 | 1.17E-14 | Yes |  | A | BMI | 3 |
| rs7531118 | 1 | 72837239 | LOC105378797 | Intron | T | C | 0.44 | 0.027 | 1.47E-14 | Yes |  | T | WC | 20 |
| rs1514175 | 1 | 74991644 | FPGT-TNNI3K, TNNI3K | Intron, Intron | A | G | 0.43 | 0.070 | 1.36E-09 | Yes |  | A | BMI | 3 |
| rs4130548 | 1 | 78463868 | DNAJB4 | Intron | T | C | 0.65 | 0.022 | 3.40E-10 | Yes |  | T | WC | 20 |
| rs11165623 | 1 | 96893000 | RWDD3-PTBP2 |  | A | G | 0.49 | 0.020 | 5.23E-09 | Yes |  | A | WC | 20 |
| rs1555543 | 1 | 96944797 | RWDD3-PTBP2 |  | C | A | 0.59 | 0.060 | 7.65E-07 | Yes |  | C | BMI | 3 |
| rs984222 | 1 | 119503843 | TBX15 | Intron | G | C | 0.37 | 0.034 | 8.69E-25 | Yes |  | G | WHR | 3 |
| rs1011731 | 1 | 172346548 | DNM3 | Intron | G | A | 0.57 | 0.028 | 9.51E-18 | Yes |  | G | WHR | 3 |
| rs633715 | 1 | 177852580 | BRINP2-SEC16B |  | T | C | 0.80 | 0.043 | 3.30E-23 | No | rs693232 | C | WC | 20 |
| rs543874 | 1 | 177889480 | BRINP2-SEC16B |  | G | A | 0.19 | 0.220 | 1.66E-13 | Yes |  | G | BMI | 3 |
| rs2820292 | 1 | 201784462 | NAV1 | Intron | A | G | 0.45 | 0.019 | 2.37E-08 | Yes |  | A | WC | 20 |
| rs4845567 | 1 | 219750717 | LYPLAL1-ZC3H11B |  | G | T | 0.28 | 0.034 | 6.89E-21 | Yes |  | G | WHR | 3 |
| rs6429082 | 1 | 235600129 | TBCE | Intron | C | T | 0.50 | 0.026 | 2.59E-08 | No | rs704710 | A | WC | 20 |
| rs2867125 | 2 | 622827 | FAM150B-TMEM18 |  | C | T | 0.83 | 0.310 | 2.42E-22 | Yes |  | C | BMI | 3 |
| rs6755502 | 2 | 635721 | TMEM18-FAM150B |  | T | C | 0.17 | 0.051 | 2.03E-30 | Yes |  | T | WC | 20 |
| rs713586 | 2 | 25158008 | ADCY3-DNAJC27 |  | C | T | 0.47 | 0.140 | 1.80E-07 | Yes |  | C | WC | 20 |
| rs887912 | 2 | 59302877 | FANCL-BCL11A | Intron | T | C | 0.29 | 0.100 | 2.69E-06 | Yes |  | T | BMI | 3 |
| rs6545714 | 2 | 59307725 | FANCL-BCL11A |  | A | G | 0.61 | 0.022 | 1.94E-10 | No | rs11711331 | A | WC | 20 |
| rs2890652 | 2 | 142959931 | LRP1B-KYNU |  | C | T | 0.18 | 0.090 | 2.38E-07 | Yes |  | C | BMI | 3 |
| rs10195252 | 2 | 165513091 | GRB14-COBLL1 |  | T | C | 0.60 | 0.033 | 2.09E-24 | No | rs9852859 | T | WHR | 3 |
| rs2176040 | 2 | 227092802 | NYAP2-IRS1 |  | A | G | 0.37 | 0.034 | 1.41E-12 | Yes |  | A | WC | 20 |
| rs6784615 | 3 | 52506426 | NISCH | Intron | T | C | 0.94 | 0.043 | 3.84E-10 | Yes |  | T | WHR | 3 |
| rs6795735 | 3 | 64705365 | ADAMTS9-AS2 |  | C | T | 0.41 | 0.025 | 9.79E-14 | Yes |  | C | WHR | 20 |
| rs3849570 | 3 | 81792112 | GBE1 | Intron | A | C | 0.36 | 0.021 | 2.23E-08 | Yes |  | A | WC | 20 |
| rs2325036 | 3 | 85819412 | CADM2 | Intron | A | G | 0.60 | 0.023 | 2.06E-11 | Yes |  | A | WC | 20 |
| rs13078807 | 3 | 85884150 | CADM2 | Intron | G | A | 0.20 | 0.100 | 9.81E-08 | No |  | C | BMI | 3 |
| rs6440003 | 3 | 141094209 | ZBTB38 | Intron | A | G | 0.44 | 0.022 | 2.88E-10 | Yes |  | A | WC | 20 |

Fig. 6 (continued)

| Original SNP | Chr | Position of original SNP (GRCh37) | Locus (Gene) | Functional Consequence | Alleles Effect | Alleles Other | EAF | European ancestry values as published β | European ancestry values as published p-value | Present in ADVANCE? | Best ADVANCE Proxy | ADVANCE Effect Allele | Risk Factor | Reference |
|---|---|---|---|---|---|---|---|---|---|---|---|---|---|---|
| rs9816226 | 3 | 185834499 | ETV5-DGKG |  | T | A | 0.82 | 0.140 | 7.61E-14 | Yes |  | T | BMI | 3 |
| rs1516725 | 3 | 185824004 | ETV5 | Intron | T | C | 0.13 | 0.031 | 1.73E-09 | Yes |  | T | WC | 20 |
| rs10938397 | 4 | 45182527 | GNPDA2-GABRG1 |  | A | G | 0.56 | 0.032 | 6.10E-20 | Yes |  | A | WC | 20 |
| rs2112347 | 5 | 75015242 | LOC441087, POC5 | Intron, Upstr.2KB | T | G | 0.63 | 0.033 | 2.40E-13 | Yes |  | T | WC | 20 |
| rs4836133 | 5 | 124332103 | ZNF608-GRAMD3 |  | A | C | 0.48 | 0.070 | 7.04E-07 | No | rs6864049 | C | BMI | 3 |
| rs6861681 | 5 | 173362458 | CPEB4 | Intron | A | G | 0.34 | 0.022 | 1.91E-09 | Yes |  | A | WHR | 3 |
| rs1294421 | 6 | 6743149 | LOC101928004 | Intron | G | T | 0.39 | 0.028 | 1.75E-17 | Yes |  | G | WHR | 3 |
| rs806794 | 6 | 26200677 | HIST1H2BF | Downstream 500B | A | G | 0.69 | 0.022 | 2.12E-09 | Yes |  | A | WC | 20 |
| rs206936 | 6 | 34302869 | RPS10-NUDT3, NUDT3 | Intron, Intron | G | A | 0.21 | 0.060 | 2.81E-06 | Yes |  | G | BMI | 3 |
| rs16894959 | 6 | 34825662 | UHRF1BP1 | Exon syn. | T | C | 0.84 | 0.026 | 3.44E-08 | No | rs9469911 | A | WC | 20 |
| rs6905288 | 6 | 43758873 | VEGFA-LOC105375070 |  | A | G | 0.56 | 0.036 | 5.88E-25 | Yes |  | A | WHR | 3 |
| rs987237 | 6 | 50803050 | TFAP2B | Intron | G | A | 0.18 | 0.130 | 5.97E-16 | No | rs62405422 | C | BMI | 3 |
| rs943005 | 6 | 50865820 | TFAP2B-PKHD1 |  | T | C | 0.18 | 0.039 | 7.22E-19 | Yes |  | T | WC | 20 |
| rs9400239 | 6 | 108977663 | FOXO3 | Intron | T | C | 0.31 | 0.024 | 1.88E-11 | Yes |  | T | WHR | 3 |
| rs9491696 | 6 | 127452639 | RSPO3 | Intron | G | C | 0.52 | 0.042 | 1.84E-40 | Yes |  | G | WHR | 3 |
| rs2489623 | 6 | 127455821 | RSPO3 | Intron | A | C | 0.48 | 0.019 | 3.41E-08 | Yes |  | A | WC | 20 |
| rs1055144 | 7 | 25871109 | LOC100506236 | Non coding | T | C | 0.21 | 0.040 | 9.97E-25 | Yes |  | T | WHR | 3 |
| rs10968576 | 9 | 28414339 | LINGO2 | Intron | A | G | 0.68 | 0.025 | 1.17E-11 | Yes |  | A | WC | 20 |
| rs6163 | 10 | 104596924 | CYP17A1 | Exon syn. | T | C | 0.39 | 0.019 | 3.68E-08 | Yes |  | A | WC | 20 |
| rs7903146 | 10 | 114758349 | TCF7L2 | Intron | T | C | 0.29 | 0.022 | 3.92E-08 | Yes |  | T | WC | 20 |
| rs4929949 | 11 | 8604593 | STK33 | Intron | C | T | 0.52 | 0.060 | 7.57E-08 | No | rs7949988 | T | BMI | 3 |
| rs10840100 | 11 | 8669437 | TRIM66 | Intron | A | G | 0.36 | 0.020 | 5.42E-09 | Yes |  | A | WC | 20 |
| rs10767658 | 11 | 27672252 | BDNF-AS | Intron | C | G | 0.31 | 0.031 | 3.29E-17 | Yes |  | C | WC | 20 |
| rs10767664 | 11 | 27725986 | BDNF | Intron | A | T | 0.78 | 0.190 | 5.53E-13 | Yes |  | A | BMI | 3 |
| rs2293576 | 11 | 47434986 | SLC39A13 | Exon syn. | A | G | 0.33 | 0.022 | 9.36E-10 | Yes |  | A | WC | 20 |
| rs3817334 | 11 | 47650993 | MTCH2 | Intron | T | C | 0.41 | 0.060 | 4.79E-11 | No | rs7928842 | C | BMI | 3 |
| rs7121446 | 11 | 121954657 | LOC107984402-MIR100HG |  | G | A | 0.77 | 0.150 | 2.50E-06 | Yes |  | A | WC | 20 |
| rs718314 | 12 | 26453283 | LOC105369705 | Intron | G | A | 0.74 | 0.030 | 1.14E-17 | Yes |  | G | WHR | 21 |
| rs7138803 | 12 | 50247468 | BCDIN3D-FAIM2 |  | A | G | 0.38 | 0.028 | 1.55E-15 | Yes |  | A | WC | 3 |
| rs1443512 | 12 | 54342684 | HOXC13-HOXC12 |  | A | C | 0.24 | 0.031 | 6.38E-17 | Yes |  | A | WHR | 20 |
| rs4771122 | 13 | 28020180 | MTIF3 | Intron | G | A | 0.24 | 0.090 | 1.20E-07 | No | rs9512699 | G | BMI | 3 |
| rs12429545 | 13 | 54102206 | LOC105370210-OLFM4 |  | A | G | 0.13 | 0.031 | 2.49E-09 | Yes |  | A | WC | 20 |
| rs10132280 | 14 | 25928179 | STXBP6-NOVA1 |  | A | C | 0.32 | 0.022 | 2.25E-09 | Yes |  | A | WC | 20 |
| rs12885454 | 14 | 29736838 | LOC102724934 | Non coding | A | C | 0.36 | 0.020 | 2.59E-08 | Yes |  | A | WC | 20 |
| rs10150332 | 14 | 79936964 | NRXN3 | Intron | C | T | 0.21 | 0.130 | 2.03E-07 | Yes |  | C | BMI | 3 |
| rs7144011 | 14 | 79940383 | NRXN3 | Intron | T | G | 0.22 | 0.033 | 9.40E-16 | Yes |  | T | WC | 20 |
| rs4776970 | 15 | 68080886 | MAP2K5 | Intron | A | T | 0.64 | 0.028 | 5.25E-09 | Yes |  | A | WC | 20 |
| rs2241423 | 15 | 68086838 | MAP2K5 | Intron | G | A | 0.78 | 0.130 | 1.15E-10 | No | rs8028313 | C | BMI | 3 |
| rs2531992 | 16 | 4021734 | ADCY9 | Intron | A | G | 0.15 | 0.028 | 3.03E-09 | Yes |  | A | WC | 20 |

Fig. 6 (continued)

| Original SNP | Chr | Position of original SNP (GRCh37) | Locus (Gene) | Functional Consequence | Alleles Effect | Alleles Other | EAF | European ancestry values as published β | European ancestry values as published p-value | Present in ADVANCE? | Best ADVANCE Proxy | ADVANCE Effect Allele | Risk Factor | Reference |
|---|---|---|---|---|---|---|---|---|---|---|---|---|---|---|
| rs12444979 | 16 | 19933600 | GPRC5B-GPR139 | | C | T | 0.87 | 0.170 | 4.20E-11 | Yes | | C | BMI | 3 |
| rs12446632 | 16 | 19935389 | LOC105371116 | Intron | A | G | 0.14 | 0.036 | 5.21E-13 | Yes | | A | WC | 20 |
| rs2650492 | 16 | 28333411 | SBK1 | 3'UTR | A | G | 0.30 | 0.026 | 2.46E-11 | No | rs2726036 | C | WC | 20 |
| rs7498665 | 16 | 28883241 | SH2B1 | Exon non-syn. | A | G | 0.60 | 0.034 | 1.43E-22 | Yes | | A | WC | 20 |
| rs7359397 | 16 | 28885659 | SH2B1 | Downstream 500B | T | C | 0.40 | 0.150 | 1.75E-10 | Yes | | T | BMI | 3 |
| rs1549293 | 16 | 31141993 | KAT8 | Intron | T | C | 0.38 | 0.020 | 7.29E-09 | Yes | | T | WC | 20 |
| rs1558902 | 16 | 53803574 | FTO | Intron | A | T | 0.42 | 0.074 | 3.70E-101 | Yes | | A | BMI | 3 |
| rs7239883 | 18 | 40147671 | LINC00907 | Intron | A | G | 0.60 | 0.021 | 2.30E-09 | Yes | | A | WC | 20 |
| rs6567160 | 18 | 57829135 | PMAIP1-MC4R | | T | C | 0.77 | 0.048 | 2.61E-33 | No | rs663129 | G | WC | 20 |
| rs571312 | 18 | 57839769 | CCBE1-CDH20 | | A | C | 0.24 | 0.230 | 1.82E-22 | Yes | | A | BMI | 3 |
| rs29941 | 19 | 34309532 | KCTD15-LSM14A | | G | A | 0.67 | 0.060 | 1.31E-09 | Yes | | G | BMI | 3 |
| rs3810291 | 19 | 47569003 | ZC3H4 | 3'UTR | A | G | 0.67 | 0.026 | 1.67E-10 | Yes | | A | WC | 20 |
| rs16996700 | 20 | 50981945 | LOC105372666 | Intron | T | C | 0.73 | 0.023 | 1.52E-09 | Yes | | T | WC | 20 |
| rs4823006 | 22 | 29451671 | ZNRF3 | 3'UTR | A | G | 0.57 | 0.023 | 1.10E-11 | Yes | | A | WHR | 3 |
| | | | | ALBUMINURIA | | | | | | | | | | |
| rs11579312 | 1 | 30656572 | LOC105378617 | Intron | T | C | 0.69 | 0.110 | 9.70E-06 | Yes | | T | MA | 22 |
| rs4072037 | 1 | 155162067 | MUC1 | Exon syn. | T | C | 0.54 | 0.029 | 2.50E-06 | Yes | | T | UACR | 22 |
| rs914615 | 1 | 155175892 | THBS3 | Intron | A | G | 0.47 | 0.030 | 7.40E-06 | Yes | | G | UACR | 22 |
| rs13427836 | 2 | 129027961 | HS6ST1 | Intron | T | C | 0.14 | 0.199 | 6.10E-06 | Yes | | T | UACR | 22 |
| rs17346504 | 2 | 137923761 | THSD7B | Intron | T | C | 0.12 | 0.050 | 7.20E-06 | Yes | | T | UACR | 22 |
| rs16827742 | 2 | 150907159 | MMADHC-RND3 | | A | G | 0.06 | 0.300 | 3.10E-06 | No | rs114375510 | C | MA | 22 |
| rs116678190 | 2 | 187560308 | FAM171B | Intron | T | C | 0.70 | 0.100 | 5.10E-06 | Yes | | C | MA | 22 |
| rs116678190 | 2 | 187560308 | FAM171B | Intron | A | C | 0.69 | 0.035 | 1.50E-06 | Yes | | C | UACR | 22 |
| rs13079877 | 3 | 2127845 | CNTN4-CNTN6 | | A | G | 0.45 | 0.148 | 5.60E-06 | No | rs7633224 | T | UACR | 22 |
| rs1077216 | 3 | 46892161 | MYL3-PRSS42 | | T | C | 0.07 | 0.200 | 5.20E-06 | Yes | | T | MA | 22 |
| rs7634770 | 3 | 66930228 | LOC105377144 | Intron | A | C | 0.70 | 0.142 | 2.70E-06 | No | rs34401437 | T | UACR | 22 |
| rs13160548 | 5 | 38778850 | OSMR-AS1 | Intron | T | C | 0.69 | 0.100 | 8.20E-06 | Yes | | C | MA | 22 |
| rs12719264 | 5 | 119183940 | LOC105379144 | Intron | A | G | 0.30 | 0.100 | 6.20E-06 | Yes | | G | MA | 22 |
| rs17738155 | 6 | 51156076 | TFAP2B-PKHD1 | | T | C | 0.92 | 0.241 | 5.90E-06 | Yes | | C | UACR | 22 |
| rs2110904 | 6 | 107594771 | PDSS2 | Intron | T | C | 0.65 | 0.100 | 8.90E-06 | Yes | | T | MA | 22 |
| rs47222909 | 7 | 29514931 | CHN2 | Intron | A | G | 0.60 | 0.134 | 3.20E-06 | Yes | | G | UACR | 22 |
| rs17301329 | 8 | 54858981 | RGS20 | Intron | A | T | 0.29 | 0.042 | 5.60E-07 | Yes | | A | UACR | 22 |
| rs7851726 | 9 | 97503985 | C9orf3 | Intron | T | C | 0.42 | 0.027 | 5.20E-06 | Yes | | T | UACR | 22 |
| rs1109861 | 10 | 11246269 | CELF2 | Intron | A | C | 0.55 | 0.030 | 1.90E-06 | Yes | | C | UACR | 22 |
| rs17343073 | 10 | 16932196 | CUBN | Intron | A | T | 0.90 | 0.071 | 4.00E-09 | No | rs79801018 | C | MA | 22 |
| rs1801239 | 10 | 16932196 | CUBN | Intron | C | T | 0.1 | 0.058 | 3.00E-07 | No | rs79801018 | C | UACR | 3 |
| rs6602163 | 10 | 16966766 | CUBN | Intron | A | G | 0.84 | 0.056 | 1.20E-09 | Yes | | G | UACR | 22 |
| rs12764441 | 10 | 72691651 | PCBD1-UNC5B | | T | C | 0.48 | 0.100 | 3.50E-06 | Yes | | C | MA | 22 |
| rs3740393 | 10 | 104636655 | BORCS7-ASMT, AS3MT | Intron, intron | C | G | 0.21 | 0.130 | 6.10E-06 | Yes | | C | MA | 22 |

Fig. 6 (continued)

| Original SNP | Chr | Position of original SNP (GRch37) | Locus (Gene) | Functional Consequence | Alleles Effect | Alleles Other | EAF | European ancestry values as published β | European ancestry values as published p-value | Present in ADVANCE? | Best ADVANCE Proxy | ADVANCE Effect Allele | Risk Factor | Reference |
|---|---|---|---|---|---|---|---|---|---|---|---|---|---|---|
| rs7922045 | 10 | 123001732 | WDR11-FGFR2 | | T | C | 0.26 | 0.165 | 5.70E-07 | Yes | | T | UACR | 22 |
| rs729014 | 10 | 123002806 | WDR11-FGFR2 | | T | C | 0.15 | 0.202 | 2.40E-06 | Yes | | T | UACR | 22 |
| rs10899033 | 11 | 74393171 | POLD3-CHRDL2 | | C | G | 0.72 | 0.110 | 9.30E-06 | No | rs7111585 | T | MA | 22 |
| rs649529 | 11 | 88008251 | CTSC-RAB38 | | T | G | 0.43 | 0.147 | 9.30E-06 | No | rs605042 | A | UACR | 22 |
| rs2303658 | 12 | 20278430 | LOC105369684 | Intron | A | G | 0.34 | 0.030 | 9.50E-06 | Yes | | A | UACR | 22 |
| rs7145202 | 14 | 23092105 | ABHD4-OXA1L | | T | C | 0.62 | 0.100 | 3.70E-06 | Yes | | T | MA | 22 |
| rs1728897 | 15 | 55301370 | UNC13C-RSL24D1 | | T | C | 0.54 | 0.028 | 4.10E-06 | Yes | | C | UACR | 22 |
| rs1528472 | 15 | 55211128 | UNC13C-RSL24D1 | 5'UTR | A | C | 0.48 | 0.032 | 5.40E-07 | Yes | | C | UACR | 22 |
| rs231227 | 19 | 36268067 | ARHGAP33 | | A | G | 0.38 | 0.033 | 4.90E-06 | Yes | | A | UACR | 22 |
| rs6513791 | 20 | 41058122 | PTPRT | Intron | T | C | 0.18 | 0.120 | 4.40E-06 | Yes | | T | MA | 22 |
| rs2828785 | 21 | 25437505 | No gene within 1 Mb | | T | C | 0.27 | 0.038 | 7.90E-06 | Yes | | C | UACR | 22 |

GLOMERULAR FILTRATION RATE

| Original SNP | Chr | Position of original SNP (GRch37) | Locus (Gene) | Functional Consequence | Alleles Effect | Alleles Other | EAF | β | p-value | Present in ADVANCE? | Best ADVANCE Proxy | ADVANCE Effect Allele | Risk Factor | Reference |
|---|---|---|---|---|---|---|---|---|---|---|---|---|---|---|
| rs1800615 | 1 | 15832281 | CASP9 | Intron | T | C | 0.30 | 0.006 | 1.90E-09 | Yes | | T | eGFR | 23 |
| rs12136063 | 1 | 110014170 | SYPL2 | Intron | A | G | 0.70 | 0.005 | 4.71E-08 | Yes | | G | eGFR | 23 |
| rs267734 | 1 | 150951447 | CERS2-ANXA9 | | T | C | 0.79 | 0.008 | 4.01E-13 | Yes | | T | eGFR | 23 |
| rs3850625 | 1 | 201016296 | CACNA1S | Exon non-syn. | A | G | 0.12 | 0.008 | 6.82E-11 | Yes | | G | eGFR | 23 |
| rs2802729 | 1 | 243501763 | SDCCAG8 | Intron | A | C | 0.43 | 0.005 | 2.20E-08 | Yes | | A | eGFR | 23 |
| rs807601 | 2 | 15793014 | DDX1-MYCN | | T | G | 0.34 | 0.006 | 6.60E-12 | Yes | | G | eGFR | 23 |
| rs1260326 | 2 | 27730940 | GCKR | Exon non-syn. | T | C | 0.42 | 0.007 | 3.38E-14 | No | rs780094 | C | eGFR | 23 |
| rs6546838 | 2 | 73679280 | ALMS1 | Exon non-syn. | A | G | 0.76 | 0.009 | 7.72E-20 | Yes | | A | eGFR | 23 |
| rs13538 | 2 | 73868328 | NAT8 | Exon non-syn. | A | G | 0.77 | 0.009 | 4.50E-14 | Yes | | A | eGFR | 3 |
| rs4667594 | 2 | 170008506 | LRP2 | Intron | A | T | 0.53 | 0.004 | 3.52E-08 | Yes | | A | eGFR | 23 |
| rs2712184 | 2 | 217682779 | LOC101928278 | Intron | A | C | 0.58 | 0.005 | 1.33E-10 | Yes | | A | eGFR | 23 |
| rs6795744 | 3 | 139066850 | WNT7A | Intron | A | G | 0.15 | 0.006 | 3.33E-08 | Yes | | G | eGFR | 23 |
| rs2861422 | 3 | 141724644 | TFDP2 | Intron | A | C | 0.27 | 0.007 | 9.12E-14 | Yes | | C | eGFR | 23 |
| rs347685 | 3 | 141807137 | TFDP2 | Intron | A | C | 0.72 | 0.009 | 3.00E-11 | Yes | | A | eGFR | 23 |
| rs9682041 | 3 | 170091902 | SKIL | Intron | T | C | 0.87 | 0.007 | 2.58E-08 | No | rs6767869 | C | eGFR | 3 |
| rs10513801 | 3 | 185822353 | ETV5 | Intron | T | G | 0.87 | 0.007 | 1.03E-09 | Yes | | G | eGFR | 23 |
| rs17319721 | 4 | 77368847 | SHROOM3 | Intron | A | G | 0.43 | 0.009 | 1.32E-37 | Yes | | A | eGFR | 23 |
| rs228611 | 4 | 103561709 | MANBA | Intron | A | G | 0.47 | 0.006 | 3.58E-12 | Yes | | A | eGFR | 23 |
| rs11959928 | 5 | 39397132 | DAB2 | Intron | A | T | 0.44 | 0.008 | 1.66E-20 | No | rs10062079 | A | eGFR | 23 |
| rs11959928 | 5 | 39397132 | DAB2 | Intron | A | T | 0.44 | 0.009 | 1.40E-17 | No | rs10062079 | A | eGFR | 3 |
| rs7759001 | 6 | 27341409 | ZNF204P, ZNF391 | Intron, Upstr. 2KB | A | G | 0.76 | 0.005 | 1.75E-08 | Yes | | A | eGFR | 23 |
| rs881858 | 6 | 43806609 | LOC107986598, LOC105375069 | Intron, Upstr. 2KB | A | G | 0.72 | 0.011 | 9.40E-14 | Yes | | A | eGFR | 3 |
| rs9472135 | 6 | 43809802 | LOC107986598 | Intron | T | C | 0.71 | 0.008 | 3.34E-15 | Yes | | T | eGFR | 23 |
| rs316009 | 6 | 160675764 | SLC22A2 | Intron | T | C | 0.10 | 0.013 | 4.38E-19 | Yes | | C | eGFR | 23 |
| rs31277573 | 6 | 160681393 | SLC22A2 | Upstr. 2KB | G | A | 0.13 | 1.100 | 6.50E-10 | Yes | | G | CREAT | 3 |
| rs3750082 | 7 | 32919927 | KBTBD2 | Intron | A | T | 0.33 | 0.005 | 3.22E-08 | No | rs970673 | A | eGFR | 23 |

Fig. 6 (continued)

| Original SNP | Chr | Position of original SNP (GRCh37) | Locus (Gene) | Functional Consequence | Alleles Effect | Alleles Other | EAF | European ancestry values as published β | European ancestry values as published p-value | Present in ADVANCE? | Best ADVANCE Proxy | ADVANCE Effect Allele | Risk Factor | Reference |
|---|---|---|---|---|---|---|---|---|---|---|---|---|---|---|
| rs848490 | 7 | 77555005 | PHTF2 | Intron | C | G | 0.73 | 0.007 | 7.80E-13 | Yes | | G | eGFR | 23 |
| rs7805747 | 7 | 151407801 | PRKAG2 | Intron | A | G | 0.25 | 0.013 | 7.96E-29 | No | rs17173238 | G | eGFR | 23 |
| rs7805747 | 7 | 151407801 | PRKAG2 | Intron | A | G | 0.24 | 0.012 | 4.20E-12 | No | rs17173238 | G | eGFR | 23 |
| rs3758086 | 8 | 23714992 | STC1-ADAM28 | | A | G | 0.42 | 0.007 | 1.71E-15 | Yes | | A | eGFR | 23 |
| rs1731274 | 8 | 23766319 | STC1-ADAM28 | | G | A | 0.45 | 0.017 | 4.60E-08 | Yes | | G | eGFR | 3 |
| rs4744712 | 9 | 71434707 | PIP5K1B | Intron | A | C | 0.40 | 0.007 | 4.29E-15 | Yes | | A | eGFR | 23 |
| rs1044261 | 10 | 1065710 | IDI2 | Stop-Gain | T | C | 0.08 | 0.011 | 1.21E-11 | No | rs149288300 | G | eGFR | 23 |
| rs10994860 | 10 | 52645424 | A1CF | 5'UTR | T | C | 0.19 | 0.008 | 1.07E-12 | Yes | | C | eGFR | 23 |
| rs163160 | 11 | 2789955 | KCNQ1 | Intron | A | G | 0.82 | 0.007 | 2.26E-09 | Yes | | G | eGFR | 23 |
| rs963837 | 11 | 30749090 | LOC101928316 | Intron | T | C | 0.54 | 0.008 | 5.69E-18 | Yes | | T | eGFR | 23 |
| rs4014195 | 11 | 65506822 | RNASEH2C-AP5B1 | | C | G | 0.64 | 0.006 | 1.10E-11 | Yes | | G | eGFR | 23 |
| rs10774021 | 12 | 349298 | SLC6A13 | Intron | T | C | 0.65 | 0.006 | 4.77E-12 | Yes | | T | eGFR | 23 |
| rs10491967 | 12 | 3368093 | TSPAN9 | Intron | A | G | 0.10 | 0.010 | 5.18E-14 | Yes | | A | eGFR | 23 |
| rs7956634 | 12 | 15321194 | RERG | Intron | T | C | 0.81 | 0.007 | 7.17E-12 | Yes | | T | eGFR | 23 |
| rs1106766 | 12 | 57809456 | R3HDM2 | Intron | C | T | 0.22 | 0.006 | 2.41E-09 | No | rs79395356 | T | eGFR | 23 |
| rs653178 | 12 | 112007756 | ATXN2 | Intron | C | T | 0.51 | 0.003 | 3.50E-11 | No | rs7137828 | C | eGFR | 3 |
| rs716877 | 13 | 72347448 | DACH1 | Intron | C | G | 0.40 | 0.005 | 6.22E-08 | Yes | | G | eGFR | 23 |
| rs626277 | 13 | 72347696 | DACH1 | Intron | A | C | 0.60 | 0.009 | 2.50E-11 | Yes | | A | eGFR | 23 |
| rs476633 | 15 | 41392134 | INO80 | Intron | C | G | 0.57 | 0.005 | 8.90E-09 | Yes | | G | eGFR | 23 |
| rs2453533 | 15 | 45641225 | SLC28A2-GATM | Intron | A | C | 0.62 | 0.013 | 4.60E-22 | Yes | | A | eGFR | 3 |
| rs2467853 | 15 | 45698793 | SPATA5L1 | | T | G | 0.62 | 0.013 | 1.05E-42 | Yes | | G | eGFR | 23 |
| rs491567 | 15 | 53946593 | WDR72 | Intron | A | C | 0.78 | 0.008 | 2.86E-15 | Yes | | A | eGFR | 23 |
| rs1394125 | 15 | 76158983 | UBE2Q2 | | A | G | 0.35 | 0.007 | 5.47E-14 | Yes | | A | eGFR | 23 |
| rs4293393 | 16 | 20364588 | UMOD | Intron | T | C | 0.80 | 1.930 | 1.30E-23 | Yes | | T | CREAT | 3 |
| rs13329952 | 16 | 20366507 | UMOD | Intron | T | C | 0.81 | 0.016 | 9.47E-43 | Yes | | T | eGFR | 23 |
| rs164748 | 16 | 89708292 | DPEP1 | Downstream 500B | C | G | 0.53 | 0.005 | 1.95E-08 | Yes | | G | eGFR | 23 |
| rs11657044 | 17 | 59450105 | BCAS3 | Intron | T | C | 0.19 | 0.012 | 7.89E-22 | Yes | | T | eGFR | 23 |
| rs8068318 | 17 | 59483766 | TBX2 | Intron | G | A | 0.27 | 0.800 | 3.40E-10 | Yes | | G | CREAT | 3 |
| rs12450876 | 19 | 33356891 | SLC7A9 | Intron | T | C | 0.60 | 0.007 | 1.86E-13 | Yes | | T | eGFR | 23 |
| rs11666497 | 19 | 38464262 | SIPA1L3 | Intron | T | C | 0.18 | 0.006 | 4.25E-08 | Yes | | T | eGFR | 23 |
| rs6088580 | 20 | 33285053 | PIGU-TP53INP2 | | C | G | 0.47 | 0.005 | 1.79E-09 | Yes | | C | eGFR | 23 |
| rs17216707 | 20 | 52732362 | BCAS1-CYP24A1 | | T | C | 0.79 | 0.008 | 8.83E-15 | No | rs81121940 | C | eGFR | 23 |
| rs4821467 | 22 | 36616200 | APOL4-APOL2 | | A | G | 0.30 | 0.621 | 4.77E-15 | Yes | | A | ESRD | 3 |

BLOOD PRESSURE

| Original SNP | Chr | Position of original SNP (GRCh37) | Locus (Gene) | Functional Consequence | Alleles Effect | Alleles Other | EAF | European ancestry values as published β | European ancestry values as published p-value | Present in ADVANCE? | Best ADVANCE Proxy | ADVANCE Effect Allele | Risk Factor | Reference |
|---|---|---|---|---|---|---|---|---|---|---|---|---|---|---|
| rs17367504 | 1 | 11862778 | MTHFR | Intron | A | G | 0.80 | 0.103 | 2.30E-10 | No | rs7537765 | A | HTN | 3 |
| rs17367504 | 1 | 11862778 | MTHFR | Intron | G | A | 0.15 | 0.903 | 8.70E-22 | No | rs7537765 | A | SBP | 24 |
| rs848309 | 1 | 16308447 | ZBTB17-C1orf64 | | T | C | 0.57 | 0.347 | 7.07E-12 | Yes | | T | SBP | 25 |
| rs4360494 | 1 | 38455891 | SF3A3 | Upstr. 2kB | C | G | 0.55 | 0.278 | 3.70E-16 | Yes | | C | PP | 26 |
| rs112557609 | 1 | 56576924 | LOC105378741 | Intron | A | G | 0.35 | 0.227 | 6.80E-12 | Yes | | A | PP | 26 |

Fig. 6 (continued)

| Original SNP | Chr | Position of original SNP (GRCh37) | Locus (Gene) | Functional Consequence | Alleles Effect | Alleles Other | EAF | European ancestry values as published β | European ancestry values as published p-value | Present in ADVANCE? | Best ADVANCE Proxy | ADVANCE Effect Allele | Risk Factor | Reference |
|---|---|---|---|---|---|---|---|---|---|---|---|---|---|---|
| rs3889199 | 1 | 59653742 | JUN-FGGY | | A | G | 0.71 | 0.351 | 1.80E-24 | Yes | | A | PP | 26 |
| rs2932538 | 1 | 113216543 | MOV10 | Upstream 2kB | G | A | 0.75 | 0.388 | 1.20E-09 | Yes | | G | SBP | 24 |
| rs2289081 | 2 | 20881840 | LDAH | Downstream 500B | C | G | 0.36 | 0.223 | 5.50E-12 | Yes | | C | PP | 26 |
| rs11690961 | 2 | 46363336 | PRKCE | Intron | A | C | 0.88 | 0.340 | 3.90E-12 | Yes | | A | PP | 26 |
| rs74181299 | 2 | 65283972 | CEP68 | Intron | T | C | 0.62 | 0.230 | 9.60E-13 | Yes | | T | PP | 26 |
| rs11689667 | 2 | 85491365 | TCF7L1 | Intron | T | C | 0.54 | 0.176 | 1.70E-08 | Yes | | T | PP | 26 |
| rs1250259 | 2 | 216300482 | FN1 | Exon non-syn. | A | T | 0.74 | 0.314 | 8.70E-19 | No | rs1250258 | T | PP | 26 |
| rs13082711 | 3 | 27537909 | SLC4A7-EOMES | | T | C | 0.78 | 0.315 | 1.50E-06 | Yes | | C | SBP | 24 |
| rs3774372 | 3 | 41877414 | ULK4 | Exon non-syn. | T | C | 0.83 | 0.067 | 3.90E-01 | Yes | | C | SBP | 24 |
| rs419076 | 3 | 169100886 | MECOM | Intron | T | C | 0.50 | 0.031 | 3.10E-04 | No | rs2421647 | C | HTN | 3 |
| rs419076 | 3 | 169100886 | MECOM | Intron | T | C | 0.47 | 0.409 | 1.80E-13 | No | rs2421647 | C | SBP | 24 |
| rs8716606 | 4 | 54799245 | LNX1-CHIC2 | | T | C | 0.85 | 0.429 | 1.32E-08 | Yes | | T | PP | 3 |
| rs1458038 | 4 | 81164723 | PRDM8-FGF5 | | T | C | 0.29 | 0.706 | 1.50E-23 | Yes | | T | SBP | 24 |
| rs13107325 | 4 | 103188709 | SLC39A8 | Exon non-syn. | T | C | 0.05 | 0.981 | 3.30E-14 | No | rs6855246 | A | SBP | 24 |
| rs78049276 | 4 | 148427503 | EDNRA | Intron | C | A | 0.13 | 0.267 | 1.00E-08 | Yes | | C | PP | 26 |
| rs146853253 | 4 | 156406055 | MAP9-GUCY1A3 | | Del | A | 0.16 | 0.316 | 7.00E-14 | No | rs17033041 | G | PP | 26 |
| rs13139571 | 4 | 156645513 | GUCY1A3 | Intron | C | A | 0.76 | 0.321 | 1.20E-06 | Yes | | C | SBP | 24 |
| rs1566497 | 4 | 169717148 | PALLD | Intron | A | C | 0.42 | 0.236 | 1.90E-13 | Yes | | A | PP | 26 |
| rs17059668 | 4 | 174584663 | HAND2-AS1-FBXO8 | | C | G | 0.92 | 0.332 | 2.80E-08 | Yes | | C | PP | 26 |
| rs1173771 | 5 | 32815028 | NPR3-TARS | | G | A | 0.60 | 0.062 | 3.20E-10 | No | rs9292468 | C | HTN | 3 |
| rs10057188 | 5 | 77837789 | LHFPL2 | Intron | A | G | 0.46 | 0.205 | 6.70E-11 | Yes | | A | PP | 26 |
| rs31864 | 5 | 158220193 | EBF1 | Intron | A | G | 0.55 | 0.206 | 6.00E-11 | No | rs12332693 | A | PP | 26 |
| rs1799945 | 6 | 26091179 | HFE | Exon non-syn. | G | C | 0.14 | 0.627 | 7.70E-12 | Yes | | G | SBP | 24 |
| rs805303 | 6 | 31724345 | BAG6 | Intron | G | A | 0.61 | 0.376 | 1.50E-11 | Yes | | G | SBP | 24 |
| rs185819 | 6 | 32050067 | TNXB | Exon non-syn. | T | C | 0.51 | 0.365 | 1.04E-17 | Yes | | T | SBP | 25 |
| rs11154027 | 6 | 121781390 | GJA1-HSF2 | | T | C | 0.47 | 0.207 | 1.10E-10 | Yes | | T | PP | 26 |
| rs36083386 | 6 | 152397913 | ESR1 | Intron | C | Del | 0.11 | 0.439 | 1.50E-18 | Yes | rs77410344 | AC | PP | 26 |
| rs449789 | 6 | 159699125 | FNDC1-LOC105378084 | | C | G | 0.14 | 0.359 | 2.40E-15 | Yes | rs2392929 | C | PP | 26 |
| rs1322639 | 6 | 169587103 | SMOC2-THBS2 | | A | G | 0.78 | 0.316 | 4.80E-17 | Yes | rs9314318 | A | PP | 26 |
| rs76206723 | 7 | 40447971 | SUGCT | Intron | A | G | 0.10 | 0.346 | 7.40E-12 | No | rs77410344 | C | PP | 26 |
| rs17477177 | 7 | 106411858 | CCDC71L-PIK3CG | | C | T | 0.28 | 0.418 | 2.27E-13 | No | rs2392929 | G | PP | 3 |
| rs6557876 | 8 | 25900675 | EBF2 | | C | T | 0.25 | 0.371 | 2.85E-14 | No | rs9314318 | A | SBP | 25 |
| rs35783704 | 8 | 105966258 | LRP12-ZFPM2 | | G | A | 0.11 | 0.414 | 7.08E-09 | No | rs11774829 | A | SBP | 25 |
| rs2071518 | 8 | 120435812 | NOV | 3'UTR | T | A | 0.17 | 0.312 | 3.66E-09 | Yes | | T | SBP | 3 |
| rs4454254 | 8 | 141060027 | TRAPPC9 | Intron | A | G | 0.63 | 0.261 | 5.10E-16 | Yes | | A | PP | 26 |
| rs72765298 | 9 | 127900996 | SCAI | Intron | T | C | 0.87 | 0.374 | 2.70E-14 | No | rs869248 | A | PP | 26 |
| rs4373814 | 10 | 18419972 | SLC39A12-CACNB2 | | G | C | 0.55 | 0.373 | 4.80E-11 | Yes | | C | SBP | 24 |
| rs1813353 | 10 | 18707448 | CACNB2 | Intron | T | C | 0.68 | 0.569 | 2.60E-12 | Yes | | T | SBP | 24 |
| rs9337951 | 10 | 30317073 | KIAA1462 | Exon syn. | A | G | 0.34 | 0.280 | 2.50E-15 | Yes | | A | PP | 26 |

Fig. 6 (continued)

| Original SNP | Chr | Position of original SNP (GRCh37) | Locus (Gene) | Functional Consequence | Alleles Effect | Alleles Other | EAF | European ancestry values as published β | European ancestry values as published p-value | Present in ADVANCE? | Best ADVANCE Proxy | ADVANCE Effect Allele | Risk Factor | Reference |
|---|---|---|---|---|---|---|---|---|---|---|---|---|---|---|
| rs10826995 | 10 | 32082658 | ARHGAP12-ZEB1 |  | T | C | 0.71 | 0.212 | 1.10E-09 | Yes |  | T | PP | 26 |
| rs4590817 | 10 | 63467553 | C10orf107 | Intron | G | C | 0.84 | 0.646 | 4.00E-12 | Yes |  | G | SBP | 24 |
| rs932764 | 10 | 95895940 | PLCE1 | Intron | G | A | 0.44 | 0.484 | 7.10E-16 | Yes |  | G | SBP | 24 |
| rs11191548 | 10 | 104846178 | CNNM2 | Non coding | T | C | 0.91 | 1.095 | 6.90E-26 | Yes |  | T | SBP | 24 |
| rs7129220 | 11 | 10350538 | ADM-AMPD3 |  | G | A | 0.89 | 0.619 | 3.00E-12 | Yes |  | A | SBP | 24 |
| rs381815 | 11 | 16902268 | PLEKHA7 | Intron | T | C | 0.26 | 0.575 | 5.30E-11 | Yes |  | T | SBP | 24 |
| rs11442819 | 11 | 45208141 | PRDM11 | Intron | T | Del | 0.11 | 0.279 | 7.10E-09 | No | rs4755950 | C | PP | 26 |
| rs2289125 | 11 | 89224453 | NOX4 | 5'UTR | A | C | 0.21 | 0.377 | 9.10E-22 | No | rs2289124 | A | PP | 26 |
| rs633185 | 11 | 100593538 | ARHGAP42 | Intron | G | C | 0.28 | 0.565 | 1.20E-17 | Yes |  | C | SBP | 24 |
| rs8258 | 11 | 117283676 | CEP164 | 3'UTR | T | C | 0.38 | 0.236 | 2.90E-13 | Yes |  | T | PP | 26 |
| rs11222084 | 11 | 130273230 | LOC646383 | Non coding | T | A | 0.38 | 0.337 | 1.90E-11 | Yes |  | T | PP | 3 |
| rs10770612 | 12 | 20230639 | LOC100506393 | Intron | A | G | 0.80 | 0.313 | 7.00E-15 | Yes |  | A | PP | 26 |
| rs73099903 | 12 | 53440779 | TNS2, LOC283335 | 5'UTR, Intron | C | T | 0.07 | 0.515 | 1.95E-10 | Yes |  | C | SBP | 25 |
| rs7312464 | 12 | 66374247 | HMGA2-LLPH |  | G | A | 0.52 | 0.210 | 5.00E-10 | Yes |  | G | PP | 26 |
| rs172497S4 | 12 | 90060586 | ATP2B1 | Intron | G | A | 0.84 | 0.928 | 1.80E-18 | Yes |  | G | SBP | 24 |
| rs139236208 | 12 | 94880742 | LOC102724960 | Intron | A | G | 0.10 | 0.363 | 1.60E-10 | No | rs140802080 | A | PP | 26 |
| rs3184504 | 12 | 111884608 | SH2B3 | Exon non-syn. | T | C | 0.50 | 0.056 | 2.60E-06 | No | rs7310615 | C | HTN | 3 |
| rs3184504 | 12 | 111884608 | SH2B3 | Exon non-syn. | T | C | 0.47 | 0.598 | 3.80E-18 | No | rs7310615 | C | SBP | 24 |
| rs10850411 | 12 | 115387796 | TBX3-MED13L |  | T | C | 0.7 | 0.354 | 5.40E-08 | Yes |  | T | SBP | 24 |
| rs12434998 | 14 | 94455554 | LOC107984663 | Intron | C | T | 0.37 | 0.189 | 2.00E-08 | Yes |  | C | PP | 26 |
| rs9323988 | 14 | 98587630 | LOC105370655 | Intron | T | C | 0.63 | 0.212 | 4.10E-11 | No | rs8018617 | A | PP | 26 |
| rs1378942 | 15 | 75077367 | CSK | Intron | C | A | 0.35 | 0.613 | 5.70E-23 | Yes |  | C | SBP | 24 |
| rs56249585 | 16 | 65265702 | CDH11-LINC00922 |  | T | C | 0.53 | 0.183 | 9.00E-09 | No | rs9931601 | C | PP | 26 |
| rs7500448 | 16 | 83045790 | CDH13 | Intron | A | G | 0.75 | 0.329 | 1.10E-19 | Yes |  | A | PP | 26 |
| rs7226020 | 17 | 6570508 | PITPNM3-KIAA0753 |  | T | C | 0.56 | 0.256 | 2.30E-14 | No | rs930526 | C | PP | 26 |
| rs62080325 | 17 | 42060631 | PYY | Intron | A | G | 0.66 | 0.186 | 4.00E-08 | Yes |  | A | PP | 26 |
| rs17608766 | 17 | 45013271 | GOSR2 | Intron | T | C | 0.86 | 0.556 | 1.10E-10 | Yes |  | C | PP | 24 |
| rs12940887 | 17 | 47402807 | ZNF652 | Intron | T | C | 0.38 | 0.362 | 1.80E-10 | Yes |  | T | SBP | 24 |
| rs57927100 | 17 | 75317300 | SEPT9 | Intron | C | G | 0.26 | 0.310 | 4.04E-10 | No | rs77946446 | T | PP | 26 |
| rs7236548 | 18 | 43097750 | SLC14A2 | Intron | A | C | 0.18 | 0.352 | 2.00E-18 | No | rs72745140 | C | PP | 26 |
| rs2116941 | 19 | 10334443 | S1PR2 | 3'UTR | C | A | 0.81 | 0.220 | 3.00E-08 | No | rs200688233 | G | SBP | 26 |
| rs2206815 | 20 | 10669188 | JAG1-C20orf187 |  | A | C | 0.50 | 0.326 | 5.00E-25 | Yes |  | A | PP | 26 |
| rs1327235 | 20 | 10969030 | C20orf187 | Intron | G | A | 0.46 | 0.340 | 1.90E-08 | Yes |  | G | SBP | 24 |
| rs6081613 | 20 | 19465907 | SLC24A3 | Intron | A | G | 0.28 | 0.263 | 1.60E-13 | No | rs3838376 | C | PP | 26 |
| rs6015450 | 20 | 57751117 | ZNF831 | Intron | G | A | 0.10 | 0.110 | 4.20E-14 | No | rs8116295 | A | HTN | 25 |
| rs6015450 | 20 | 57751117 | ZNF831 | Intron | G | A | 0.12 | 0.896 | 3.90E-23 | No | rs8116295 | A | SBP | 24 |
| rs73161324 | 22 | 42038786 | XRCC6 | Intron | T | C | 0.05 | 0.496 | 2.80E-11 | Yes |  | T | SBP | 26 |
| rs126280322 | 22 | 19967980 | ARVCF | Intron | T | C | 0.30 | 0.240 | 5.50E-12 | Yes |  | T | PP | 26 |

Fig. 6 (continued)

| Original SNP | Chr | Position of original SNP (GRCh37) | Locus (Gene) | Functional Consequence | Alleles Effect | Alleles Other | EAF | European ancestry values as published β | European ancestry values as published p-value | Present in ADVANCE? | Best ADVANCE Proxy | ADVANCE Effect Allele | Risk Factor | Reference |
|---|---|---|---|---|---|---|---|---|---|---|---|---|---|---|
| colspan=15 | BIOMARKERS LEVELS |
| rs12037222 | 1 | 40064961 | PABPC4-HEYL |  | A | G | 0.24 | 0.045 | 6.40E-11 | No | rs76841360 | A | CRP | 3 |
| rs4420065 | 1 | 66161461 | LEPR-PDE4B | Intron | C | T | 0.61 | 0.090 | 3.50E-62 | Yes |  | C | CRP | 3 |
| rs4129267 | 1 | 154426264 | IL6R | Intron | C | T | 0.60 | 0.079 | 2.10E-48 | Yes |  | C | CRP | 3 |
| rs2794520 | 1 | 159678816 | APCS-CRP |  | C | T | 0.66 | 0.160 | 2.00E-186 | Yes |  | C | CRP | 3 |
| rs12239046 | 1 | 247601595 | NLRP3 | Intron | C | T | 0.61 | 0.047 | 1.20E-15 | Yes |  | C | CRP | 3 |
| rs1260326 | 2 | 27730940 | GCKR | Exon non-syn. | T | C | 0.41 | 0.072 | 4.60E-40 | No | rs780094 | T | CRP | 3 |
| rs6734238 | 2 | 113841030 | IL1F10-IL1RN |  | G | A | 0.42 | 0.050 | 1.80E-17 | Yes |  | G | CRP | 3 |
| rs511154 | 3 | 135950921 | MSL2-PCCB |  | A | G | 0.23 | 0.045 | 5.94E-10 | Yes |  | A | Fibrinogen | 3 |
| rs1800789 | 4 | 155482743 | FGB | Upstream 2KB | A | G | 0.20 | 0.087 | 1.75E-30 | Yes |  | A | Fibrinogen | 3 |
| rs2522056 | 5 | 131801726 | C5orf56 | Intron | G | A | 0.20 | 0.063 | 1.31E-15 | Yes |  | G | Fibrinogen | 3 |
| rs4705952 | 5 | 131839618 | IRF1-IL5 |  | G | A | 0.20 | 0.042 | 1.30E-08 | Yes |  | G | CRP | 3 |
| rs6901250 | 6 | 117114025 | GPRC6A | Exon syn. | G | A | 0.30 | 0.035 | 4.80E-08 | Yes |  | A | CRP | 3 |
| rs13233571 | 7 | 72971231 | BCL7B | Intron | C | T | 0.86 | 0.054 | 3.60E-09 | Yes |  | C | CRP | 3 |
| rs9987289 | 8 | 9183358 | LOC157273 | Intron | A | G | 0.10 | 0.069 | 3.40E-13 | No | rs2169387 | A | CRP | 3 |
| rs10745954 | 12 | 103483094 | C12orf42 | Intron | A | G | 0.50 | 0.039 | 1.60E-11 | Yes |  | A | CRP | 3 |
| rs1183310 | 12 | 121420807 | HNF1A | Intron | G | A | 0.67 | 0.149 | 2.10E-124 | No | rs1169284 | T | CRP | 3 |
| rs340029 | 15 | 60894965 | RORA, RORA-AS1 | Intron, Intron | T | C | 0.62 | 0.032 | 4.10E-09 | Yes |  | T | CRP | 3 |
| rs2847281 | 18 | 12821593 | PTPN2 | Intron | A | G | 0.80 | 0.031 | 2.20E-08 | Yes |  | A | CRP | 3 |
| rs4420638 | 19 | 45422946 | APOC1 | Downstream 500B | A | G | 0.80 | 0.236 | 8.80E-139 | Yes |  | A | CRP | 3 |
| colspan=15 | LIPIDS |
| rs12027135 | 1 | 25775733 | TMEM57 | Intron | A | T | 0.45 | 1.220 | 4.00E-11 | Yes |  | A | TC | 3 |
| rs4660293 | 1 | 40028180 | PABPC4 | Intron | G | A | 0.23 | 0.480 | 4.00E-10 | Yes |  | G | HDL | 3 |
| rs2479409 | 1 | 55504650 | PCSK9 | Upstream 2KB | G | A | 0.30 | 2.010 | 2.00E-28 | Yes |  | G | LDL | 3 |
| rs2131925 | 1 | 63025942 | DOCK7 | Intron | T | G | 0.68 | 4.940 | 9.00E-43 | Yes |  | T | TG | 3 |
| rs7515577 | 1 | 93009438 | EVI5 | Intron | A | C | 0.79 | 1.180 | 3.00E-08 | No | rs145341911 | A | TC | 3 |
| rs629301 | 1 | 109818306 | CELSR2 | 3'UTR | T | G | 0.78 | 5.650 | 1.00E-170 | Yes |  | T | LDL | 3 |
| rs16899800 | 1 | 182168885 | ZNF648 | Intron | G | A | 0.35 | 0.470 | 3.00E-10 | Yes |  | G | HDL | 3 |
| rs2642442 | 1 | 220973563 | MARC1 | Intron | T | C | 0.68 | 1.390 | 6.00E-13 | Yes |  | T | TC | 3 |
| rs4846914 | 1 | 230295691 | GALNT2 | Intron | G | A | 0.40 | 0.610 | 4.00E-21 | No | rs4846913 | C | HDL | 3 |
| rs514230 | 1 | 234858597 | IRF2BP2-TOMM20 |  | T | A | 0.48 | 1.360 | 5.00E-14 | Yes |  | T | TC | 3 |
| rs1367117 | 2 | 21263900 | APOB | Exon non-syn. | A | G | 0.30 | 4.050 | 4.00E-114 | Yes |  | A | LDL | 3 |
| rs4299376 | 2 | 44072576 | ABCG8 | Intron | G | T | 0.30 | 2.750 | 2.00E-47 | Yes |  | G | LDL | 3 |
| rs7570971 | 2 | 135837906 | RAB3GAP1 | Intron | A | C | 0.34 | 1.250 | 2.00E-08 | Yes |  | A | TC | 3 |
| rs2972146 | 2 | 227100698 | NYAP2-IRS1 |  | T | G | 0.63 | 0.460 | 3.00E-09 | Yes |  | T | HDL | 3 |
| rs2290159 | 3 | 12628920 | RAF1 |  | G | C | 7.80 | 1.420 | 4.00E-09 | Yes |  | G | TC | 3 |
| rs645040 | 3 | 135926622 | MSL2-PCCB |  | T | G | 0.78 | 2.220 | 3.00E-08 | No | rs895893 | T | TG | 3 |
| rs442177 | 4 | 88030261 | AFF1 | Intron | T | G | 0.59 | 2.250 | 9.00E-12 | Yes |  | T | TG | 3 |

Fig. 6 (continued)

| Original SNP | Chr | Position of original SNP (GRCh37) | Locus (Gene) | Functional Consequence | Alleles Effect | Alleles Other | EAF | European ancestry values as published β | European ancestry values as published p-value | Present in ADVANCE? | Best ADVANCE Proxy | ADVANCE Effect Allele | Risk Factor | Reference |
|---|---|---|---|---|---|---|---|---|---|---|---|---|---|---|
| rs6450176 | 5 | 53298025 | ARL15 | Intron | A | G | 0.26 | 0.490 | 5.00E-08 | Yes | | A | HDL | 3 |
| rs9686661 | 5 | 55861786 | C5orf67 | Intron | T | C | 0.20 | 2.570 | 1.00E-10 | Yes | | T | TG | 3 |
| rs12916 | 5 | 74656539 | HMGCR | 3'UTR | C | T | 0.39 | 2.840 | 9.00E-47 | Yes | | C | TC | 3 |
| rs6882076 | 5 | 156390297 | TIMD4 | Upstream 2kB | C | T | 0.65 | 1.980 | 7.00E-28 | No | rs9715911 | A | TC | 3 |
| rs3757354 | 6 | 16127407 | MYLIP | Upstream 2kB | C | T | 0.78 | 1.430 | 1.00E-11 | Yes | | C | LDL | 3 |
| rs3177928 | 6 | 32412435 | HLA-DRA | 3'UTR | A | G | 0.16 | 2.310 | 4.00E-19 | Yes | | A | TC | 3 |
| rs2814944 | 6 | 34552797 | SPDEF-C6orf106 | | A | G | 0.16 | 0.490 | 4.00E-09 | No | rs2814983 | G | HDL | 3 |
| rs9488822 | 6 | 116312893 | FRK | Intron | A | T | 0.65 | 1.180 | 2.00E-10 | Yes | | A | TC | 3 |
| rs605056 | 6 | 139829666 | CITED2-LOC105378023 | | C | T | 0.42 | 0.390 | 3.00E-08 | No | rs71562509 | G | HDL | 3 |
| rs1564348 | 6 | 160578860 | SLC22A1 | Intron | T | C | 0.83 | 0.560 | 2.00E-17 | Yes | | T | LDL | 3 |
| rs12670798 | 7 | 21607352 | DNAH11 | Intron | C | T | 0.23 | 1.430 | 9.00E-10 | Yes | | C | TC | 3 |
| rs2072183 | 7 | 44579180 | NPC1L1 | Exon syn. | C | G | 0.25 | 2.010 | 3.00E-11 | No | rs2073547 | G | TC | 3 |
| rs17145738 | 7 | 72982874 | TBL2 | Downstr.500B | C | T | 0.88 | 9.320 | 6.00E-58 | Yes | | C | TG | 3 |
| rs4731702 | 7 | 130433384 | LOC105375508 | Intron | C | T | 0.48 | 0.590 | 1.00E-15 | Yes | | C | HDL | 3 |
| rs11776767 | 8 | 10683929 | PINX1 | Intron | C | G | 0.40 | 2.010 | 1.00E-08 | Yes | | C | TG | 3 |
| rs1495741 | 8 | 18272881 | NAT2-PSD3 | | G | A | 0.22 | 2.850 | 5.00E-14 | Yes | | G | TG | 3 |
| rs12678919 | 8 | 19844222 | LPL-SLC18A1 | | A | G | 0.88 | 13.640 | 2.00E-115 | Yes | | A | TG | 3 |
| rs2081687 | 8 | 59388565 | UBXN2B-CYP7A1 | | T | C | 0.35 | 1.230 | 2.00E-12 | Yes | | T | TC | 3 |
| rs2293889 | 8 | 116599199 | TRPS1 | Intron | T | G | 0.41 | 0.440 | 6.00E-11 | Yes | | T | HDL | 3 |
| rs2954029 | 8 | 126490972 | TRIB1-LOC105375746 | | A | T | 0.47 | 5.640 | 3.00E-55 | No | rs2980875 | A | TG | 3 |
| rs11136341 | 8 | 145043543 | PLEC1 | Intron | G | A | 0.40 | 1.400 | 4.00E-13 | Yes | | G | LDL | 3 |
| rs581080 | 9 | 15305378 | TTC39B | Intron | G | C | 0.18 | 0.650 | 3.00E-12 | Yes | | G | HDL | 3 |
| rs1883025 | 9 | 107664301 | ABCA1 | Intron | T | C | 0.25 | 0.940 | 2.00E-33 | Yes | | T | HDL | 3 |
| rs9411489 | 9 | 136155000 | ABO-SURF6 | | C | T | 0.20 | 2.240 | 6.00E-13 | No | rs651007 | T | LDL | 3 |
| rs10761731 | 10 | 65027610 | JMJD1C | Intron | A | T | 0.57 | 2.380 | 3.00E-12 | Yes | | A | TG | 3 |
| rs2255141 | 10 | 113933886 | GPAM | Intron | A | G | 0.30 | 1.140 | 2.00E-10 | Yes | | A | TC | 3 |
| rs2923084 | 11 | 10388782 | LOC100130460 | | G | A | 0.17 | 0.410 | 5.00E-08 | Yes | | G | HDL | 3 |
| rs10128711 | 11 | 18632984 | SPTY2D1 | | C | T | 0.72 | 1.040 | 3.00E-08 | Yes | | C | TC | 3 |
| rs3136441 | 11 | 46743247 | F2 | Intron | T | C | 0.85 | 0.780 | 3.00E-18 | No | rs148055528 | Ins | HDL | 3 |
| rs174546 | 11 | 61569830 | FADS1 | 3'UTR | T | C | 0.34 | 3.820 | 5.00E-24 | No | rs99780 | T | TG | 3 |
| rs12280753 | 11 | 116613660 | LOC101929011-BUD13 | | T | C | 0.07 | 0.690 | 7.80E-06 | Yes | | C | TG | 21 |
| rs964184 | 11 | 116648917 | ZPR1 | 3'UTR | G | C | 0.13 | 16.950 | 7.00E-240 | Yes | | G | TG | 3 |
| rs7941030 | 11 | 122522375 | BUD-UBASH3B | | C | T | 0.38 | 0.970 | 2.00E-10 | Yes | | C | TC | 3 |
| rs112220462 | 11 | 126243952 | ST3GAL4 | | A | G | 0.14 | 1.950 | 1.00E-15 | Yes | | A | LDL | 3 |
| rs7134375 | 12 | 20473758 | LOC105369688 | Non coding | C | A | 0.58 | 0.400 | 4.00E-08 | Yes | | C | HDL | 3 |
| rs116133352 | 12 | 57792580 | R3HDM2 | Intron | C | T | 0.77 | 2.700 | 4.00E-10 | No | rs79395356 | T | TG | 3 |
| rs7134594 | 12 | 110000193 | MMAB | Intron | C | T | 0.47 | 0.440 | 7.00E-15 | Yes | | C | HDL | 3 |
| rs1169288 | 12 | 121416650 | HNF1A | Exon non-syn. | C | A | 0.33 | 1.420 | 1.00E-14 | Yes | | C | TC | 3 |
| rs4759375 | 12 | 123796238 | SBNO1 | Intron | C | T | 0.94 | 0.860 | 7.00E-09 | Yes | | C | HDL | 3 |

Fig. 6 (continued)

| Original SNP | Chr | Position of original SNP (GRCh37) | Locus (Gene) | Functional Consequence | Alleles Effect | Alleles Other | EAF | European ancestry values as published β | European ancestry values as published p-value | Present in ADVANCE? | Best ADVANCE Proxy | ADVANCE Effect Allele | Risk Factor | Reference |
|---|---|---|---|---|---|---|---|---|---|---|---|---|---|---|
| rs4765127 | 12 | 124460167 | ZNF664-FAM101A, ZNF664 | Intron, Intron | G | T | 0.66 | 0.440 | 3.00E-10 | Yes | | G | HDL | 3 |
| rs2929282 | 15 | 44245931 | FRMD5 | Intron | T | A | 0.05 | 5.130 | 2.00E-11 | No | rs34586661 | C | TG | 3 |
| rs1532085 | 15 | 58683366 | LOC101928635 | Intron | G | A | 0.39 | 1.450 | 3.00E-96 | Yes | | G | HDL | 3 |
| rs11649653 | 16 | 30918487 | CTF1-FBXL19 | | C | G | 0.60 | 2.130 | 3.00E-08 | Yes | | C | TG | 3 |
| rs3764261 | 16 | 56993324 | HERPUD1-CETP | | C | A | 0.68 | 3.390 | 7.0E-380 | Yes | | C | HDL | 3 |
| rs16942887 | 16 | 67928042 | PSKH1 | Intron | G | A | 0.88 | 1.270 | 8.00E-33 | No | rs8054091 | A | HDL | 3 |
| rs2000999 | 16 | 72108093 | HPR, TXNL4B | Intron, Intron | A | G | 0.20 | 2.340 | 3.00E-24 | Yes | | A | TC | 3 |
| rs2925979 | 16 | 81534790 | CMIP | Intron | T | C | 0.30 | 0.450 | 2.00E-11 | Yes | | T | HDL | 3 |
| rs11869286 | 17 | 37813856 | STARD3 | Intron | G | A | 0.34 | 0.480 | 1.00E-13 | Yes | | G | HDL | 3 |
| rs7206971 | 17 | 45425115 | EFCAB13 | Intron | A | G | 0.49 | 0.780 | 2.00E-08 | Yes | | A | LDL | 3 |
| rs4148008 | 17 | 66875294 | ABCA8 | Intron | G | C | 0.32 | 0.420 | 2.00E-10 | No | rs8065105 | G | HDL | 3 |
| rs4129767 | 17 | 76403984 | PGS1 | Intron | G | A | 0.51 | 0.390 | 8.00E-09 | Yes | | G | HDL | 3 |
| rs7241918 | 18 | 47160953 | LOC105372112 | Intron | G | T | 0.17 | 1.310 | 3.00E-49 | Yes | | G | HDL | 3 |
| rs12967135 | 18 | 57849023 | CCBE1-CDH20 | | A | G | 0.23 | 0.420 | 7.00E-09 | No | rs663129 | A | HDL | 3 |
| rs737337 | 19 | 11347493 | DOCK6 | Exon syn. | C | T | 0.08 | 0.640 | 3.00E-09 | Yes | | C | HDL | 3 |
| rs10401969 | 19 | 19407718 | SUGP1 | Intron | T | C | 0.93 | 4.740 | 3.00E-38 | Yes | | T | TC | 3 |
| rs2277862 | 20 | 34152782 | FER1L4 | Non coding | C | T | 0.85 | 1.190 | 4.00E-10 | Yes | | C | TC | 3 |
| rs2902940 | 20 | 39091487 | LOC105372618 | Intron | A | G | 0.71 | 1.380 | 6.00E-11 | Yes | | A | TC | 3 |
| rs6029526 | 20 | 39672618 | TOP1 | Intron | A | T | 0.47 | 1.390 | 4.00E-19 | Yes | | A | LDL | 3 |
| rs6065906 | 20 | 44554015 | PLTP-PCIF1 | | C | T | 0.18 | 0.930 | 2.00E-22 | No | rs6073972 | G | HDL | 3 |
| rs181362 | 22 | 21932068 | UBE2L3 | Intron | T | C | 0.20 | 0.460 | 3.80E-27 | No | rs878825 | C | HDL | 3 |
| rs5756931 | 22 | 38546033 | PLA2G6 | Intron | T | C | 0.60 | 1.540 | 1.00E-08 | Yes | | T | TG | 3 |
| CARDIOVASCULAR | | | | | | | | | | | | | | |
| rs161802 | 1 | 8042826 | PARK7 | Intron | G | T | NR | 0.105 | 2.13E-07 | Yes | | G | Stroke | 34 |
| rs2225132 | 1 | 8095500 | ERRFI1-SLC45A1 | | T | G | NR | 0.117 | 6.40E-08 | Yes | | T | Stroke | 34 |
| rs11206510 | 1 | 55496039 | BSND-PCSK9 | | T | C | 0.81 | 0.140 | 9.60E-09 | Yes | | T | MI | 27 |
| rs17114036 | 1 | 56962821 | PPAP2B | intron | A | G | NR | 0.139 | 9.78E-09 | Yes | | A | CAD | 34 |
| rs9970807 | 1 | 56965664 | PLPP3 | Intron | C | T | 0.92 | 0.113 | 1.79E-09 | Yes | | C | MI | 28 |
| rs56170783 | 1 | 57016131 | PLPP3 | Intron | A | C | 0.92 | 0.104 | 2.10E-12 | Yes | | A | CAD | 29 |
| rs7528419 | 1 | 109817192 | CELSR2 | 3'UTR | A | G | 0.78 | 0.104 | 3.80E-27 | Yes | | A | CAD | 29 |
| rs646776 | 1 | 109818530 | CELSR2 | Downstr. 500B | T | C | 0.81 | 0.174 | 7.90E-12 | Yes | | T | MI | 27 |
| rs646776 | 1 | 109818530 | CELSR2 | Downstr. 500B | T | C | 0.81 | 0.157 | 9.36E-11 | Yes | | T | CAD | 3 |
| rs602633 | 1 | 109821511 | CELSR2-PSRC1 | | G | T | NR | 0.105 | 1.42E-08 | Yes | | G | CAD | 34 |
| rs12122341 | 1 | 115655690 | TSPAN2-NGF | | G | C | 0.26 | 0.174 | 1.00E-09 | Yes | | G | Stroke | 30 |
| rs11810571 | 1 | 151762308 | TDRKH | | G | C | 0.79 | 0.055 | 4.24E-08 | No | rs4845579 | C | CAD | 29 |
| rs6689306 | 1 | 154395946 | IL6R | Intron | A | G | 0.44 | 0.049 | 1.50E-09 | Yes | | A | CAD | 29 |
| rs12118721 | 1 | 154397416 | IL6R | Intron | T | C | 0.48 | 0.058 | 1.17E-07 | Yes | | T | MI | 28 |
| rs13376333 | 1 | 154814353 | KCNN3 | Intron | T | C | 0.30 | 0.445 | 6.30E-12 | Yes | | T | AF | 3 |
| rs1800594 | 1 | 169510524 | F5 | Exon syn. | A | G | 0.69 | 0.166 | 2.26E-06 | Yes | | A | Stroke | 31 |

Fig. 6 (continued)

| Original SNP | Chr | Position of original SNP (GRCh37) | Locus (Gene) | Functional Consequence | Alleles Effect | Alleles Other | EAF | European ancestry values as published β | European ancestry values as published p-value | Present in ADVANCE? | Best ADVANCE Proxy | ADVANCE Effect Allele | Risk Factor | Reference |
|---|---|---|---|---|---|---|---|---|---|---|---|---|---|---|
| rs10911021 | 1 | 182081960 | ZNF648, LOC105371642 | Intron, Intron | C | T | 0.68 | 0.307 | 2.04E-08 | No | rs61063076 | C | CHD | 32 |
| rs35700460 | 1 | 222811407 | MIA3 | Intron | G | A | 0.65 | 0.086 | 1.88E-11 | Yes | | G | MI | 28 |
| rs17465637 | 1 | 222823529 | MIA3 | Intron | C | A | 0.72 | 0.131 | 1.40E-09 | Yes | | C | MI | 27 |
| rs17465637 | 1 | 222823529 | MIA3 | Intron | C | A | 0.72 | 0.122 | 1.33E-08 | Yes | | C | CAD | 3 |
| rs67180937 | 1 | 222823743 | MIA3 | Intron | G | T | 0.68 | 0.068 | 8.50E-14 | Yes | | G | CAD | 29 |
| rs585967 | 2 | 21270554 | APOB-TDRD15 | | C | A | 0.84 | 0.068 | 2.80E-08 | Yes | | C | CAD | 29 |
| rs4299376 | 2 | 44072576 | ABCG8 | Intron | G | T | 0.32 | 0.058 | 5.70E-10 | Yes | | G | CAD | 29 |
| rs13407662 | 2 | 53782559 | LOC105369165-ASB3 | | T | C | 0.04 | 0.668 | 5.18E-08 | No | rs67499383 | T | Stroke | 33 |
| rs10176176 | 2 | 85762048 | SH2D6-MAT2A | | T | A | 0.47 | 0.068 | 2.88E-10 | Yes | | T | MI | 28 |
| rs7568458 | 2 | 85788175 | GGCX | Intron | A | T | 0.45 | 0.058 | 2.40E-13 | Yes | | A | CAD | 29 |
| rs17678683 | 2 | 145286559 | LINC01412 | | G | T | 0.09 | 0.077 | 1.20E-07 | Yes | | G | CAD | 29 |
| rs6725887 | 2 | 203745885 | WDR12 | Intron | C | T | NR | 0.131 | 2.37E-08 | Yes | | C | CAD | 34 |
| rs6725887 | 2 | 203745885 | WDR12 | Intron | C | T | 0.14 | 0.157 | 1.30E-08 | Yes | | C | MI | 27 |
| rs114123510 | 2 | 203831212 | CARF | Intron | A | T | 0.12 | 0.122 | 2.90E-19 | Yes | | A | CAD | 29 |
| rs1250229 | 2 | 215304384 | FN1-LOC102724849 | | T | C | 0.26 | 0.069 | 2.77E-13 | No | rs3910516 | A | CAD | 29 |
| rs13003675 | 2 | 233584109 | GIGYF2 | Intron | T | C | 0.36 | 0.039 | 1.70E-06 | Yes | | T | CAD | 29 |
| rs7623687 | 3 | 49448566 | RHOA, TCTA | Intron, Upstr. 2KB | A | C | 0.86 | 0.073 | 3.44E-10 | Yes | | A | CAD | 29 |
| rs142695226 | 3 | 124475201 | UMPS-ITGB5 | | G | T | 0.14 | 0.069 | 1.53E-09 | Yes | | G | CAD | 29 |
| rs139016349 | 3 | 138099162 | MRAS | Intron | I (TTC) | | 0.16 | 0.077 | 9.20E-12 | Yes | | TTC | CAD | 29 |
| rs9818870 | 3 | 138122122 | MRAS | 3'UTR | T | C | NR | 0.104 | 1.24E-07 | No | rs34905952 | A | CAD | 34 |
| rs16851055 | 3 | 140799213 | SPSB4 | 3'UTR | G | A | 0.81 | 0.113 | 6.34E-07 | Yes | | G | Stroke | 33 |
| rs12493885 | 3 | 153839866 | ARHGEF26 | Exon non-syn. | C | G | 0.87 | 0.070 | 3.16E-08 | No | rs1713822 | G | CAD | 29 |
| rs72627509 | 4 | 57839051 | NOA1 | Intron | G | C | 0.20 | 0.058 | 8.10E-08 | Yes | | G | CAD | 29 |
| rs10857147 | 4 | 81181072 | PRDM8-FGF5 | | T | A | 0.27 | 0.053 | 5.66E-09 | Yes | | T | CAD | 29 |
| rs2634074 | 4 | 111677041 | PITX2-MIR297 | | T | A | 0.02 | 0.095 | 2.68E-14 | Yes | | T | Stroke | 30 |
| rs12645447 | 4 | 111699326 | PITX2-MIR297 | | C | T | NR | 0.131 | 3.19E-08 | No | rs75725917 | A | Stroke | 34 |
| rs17042171 | 4 | 111708287 | PITX2-LOC729065 | | A | C | 0.15 | 0.501 | 6.00E-27 | Yes | | A | AF | 3 |
| rs2200733 | 4 | 111710169 | PITX2-MIR297 | | T | C | 0.12 | 0.315 | 2.79E-32 | Yes | | T | Stroke | 30 |
| rs1906599 | 4 | 111712686 | PITX2-MIR297 | | T | C | 0.19 | 0.372 | 3.45E-08 | Yes | | T | Stroke | 40 |
| rs6843082 | 4 | 111718067 | PITX2-MIR297 | | G | A | 0.21 | 0.307 | 2.80E-16 | Yes | | G | Stroke | 33 |
| rs7678555 | 4 | 120909501 | LOC100996694-MAD2L1 | | C | A | 0.28 | 0.051 | 1.32E-08 | No | rs13134800 | T | CAD | 29 |
| rs4593108 | 4 | 148281001 | MIR548G-EDNRA | | C | G | 0.80 | 0.068 | 3.75E-07 | No | rs2059904 | A | MI | 28 |
| rs6841581 | 4 | 148401190 | EDNRA | Upstream 2KB | A | G | 0.15 | 0.068 | 4.60E-10 | Yes | | A | CAD | 29 |
| rs2306556 | 4 | 156638573 | GUCY1A3 | Intron | A | G | 0.82 | 0.068 | 1.20E-09 | Yes | | A | CAD | 29 |
| rs72689147 | 4 | 156639888 | GUCY1A3 | Intron | G | T | 0.82 | 0.077 | 1.63E-08 | Yes | | G | MI | 28 |
| rs7692395 | 4 | 183624644 | TENM3 | Intron | G | T | NR | 0.371 | 2.50E-07 | No | rs9784414 | G | MI | 35 |
| rs4975709 | 5 | 1877280 | IRX4 | Downstr. 500B | C | A | 0.24 | 1.621 | 7.70E-07 | Yes | | C | CHD | 36 |
| rs9369640 | 6 | 12901441 | PHACTR1 | intron | A | C | NR | 0.094 | 2.69E-11 | Yes | | A | CAD | 34 |
| rs9349379 | 6 | 12903957 | PHACTR1 | Intron | G | A | 0.41 | 0.104 | 1.00E-35 | Yes | | G | CAD | 29 |

Fig. 6 (continued)

| Original SNP | Chr | Position of original SNP (GRCh37) | Locus (Gene) | Functional Consequence | Alleles Effect | Alleles Other | EAF | European ancestry values as published β | European ancestry values as published p-value | Present in ADVANCE? | Best ADVANCE Proxy | ADVANCE Effect Allele | Risk Factor | Reference |
|---|---|---|---|---|---|---|---|---|---|---|---|---|---|---|
| rs12526453 | 6 | 12927544 | PHACTR1 | Intron | C | G | 0.65 | 0.113 | 1.30E-09 | Yes | | C | MI | 27 |
| rs6909752 | 6 | 22612629 | LOC105374971-LOC105374972 | | A | G | 0.33 | 0.050 | 2.19E-09 | Yes | | A | CAD | 29 |
| rs3130683 | 6 | 31888357 | C2 | Intron | T | C | 0.86 | 0.077 | 2.80E-08 | Yes | | T | CAD | 29 |
| rs4722337 | 6 | 34769765 | UHRF1BP1 | Intron | T | C | 0.16 | 0.058 | 2.40E-06 | Yes | | T | CAD | 29 |
| rs12205331 | 6 | 34898455 | ANKS1A | intron | C | T | NR | 0.073 | 6.39E-06 | Yes | | C | CAD | 34 |
| rs1544935 | 6 | 39124448 | SAYSD1-KCNK5 | | T | G | 0.81 | 0.077 | 2.89E-08 | No | rs755852 | A | MI | 28 |
| rs56015508 | 6 | 39152041 | SAYSD1-KCNK5 | | C | A | 0.79 | 0.058 | 1.10E-07 | Yes | | C | CAD | 29 |
| rs2916260 | 6 | 40382711 | LRFN2 | Intron | T | C | NR | 0.140 | 1.80E-06 | Yes | | T | CHD | 32 |
| rs556621 | 6 | 44594159 | LOC105375075-LOC101929770 | | A | C | 0.30 | 0.191 | 4.70E-08 | Yes | | A | Stroke | 37 |
| rs632728 | 6 | 44596341 | LOC105375075-LOC101929770 | | T | C | NR | 0.174 | 2.14E-06 | Yes | | T | Stroke | 34 |
| rs783396 | 6 | 105987370 | AIM1 | Exon non-syn. | C | A | 0.90 | 0.775 | 9.24E-06 | Yes | | C | Stroke | 38 |
| rs12202017 | 6 | 134173151 | LINC031312, TARID | Non coding, intron | A | G | 0.70 | 0.068 | 6.00E-14 | No | rs7769954 | A | CAD | 29 |
| rs12190287 | 6 | 134214525 | TCF21 | 3'UTR | C | T | NR | 0.105 | 2.32E-09 | Yes | | C | CAD | 34 |
| rs6922269 | 6 | 151252985 | MTHFD1L | Intron | A | G | 0.30 | 0.207 | 6.33E-06 | Yes | | A | CAD | 3 |
| rs2048327 | 6 | 160863532 | SLC22A3 | Intron | C | T | 0.68 | 0.068 | 1.34E-06 | No | rs9355288 | A | CAD | 34 |
| rs10455872 | 6 | 161010118 | LPA | Intron | G | A | 0.07 | 0.531 | 3.40E-15 | No | rs374071816 | A | CAD | 3 |
| rs10455872 | 6 | 161010118 | LPA | Intron | G | A | 0.05 | 0.285 | 8.88E-27 | No | rs374071816 | A | MI | 28 |
| rs2315065 | 6 | 161108144 | PLG-LPA | | A | C | 0.06 | 0.262 | 2.34E-24 | No | rs4252185 | C | MI | 28 |
| rs6941513 | 6 | 164030800 | QKI-LOC102724152 | | G | A | NR | 0.182 | 6.20E-09 | Yes | | G | MI | 35 |
| rs4721377 | 7 | 14855062 | DGKB | Intron | T | C | NR | 0.231 | 1.90E-06 | Yes | | T | MI | 35 |
| rs10486776 | 7 | 15742786 | LOC101927558 | Intron | A | G | 0.10 | 1.726 | 6.00E-06 | Yes | | A | Stroke | 38 |
| rs12669789 | 7 | 18734065 | HDAC9 | Intron | C | T | NR | 0.262 | 1.73E-06 | Yes | | C | ICA | 39 |
| rs11984041 | 7 | 19031935 | HDAC9 | | A | G | 0.09 | 0.351 | 1.87E-11 | Yes | | A | Stroke | 40 |
| rs11984041 | 7 | 19031935 | HDAC9 | Intron | T | C | 0.09 | 0.4055 | 1.07E-05 | Yes | | T | Stroke | 3 |
| rs7798197 | 7 | 19037661 | HDAC9 | 3'UTR | A | G | NR | 0.166 | 4.67E-06 | Yes | | A | ICA | 39 |
| rs2107595 | 7 | 19049388 | HDAC9-TWIST1 | | A | G | 0.18 | 0.077 | 3.40E-13 | Yes | | A | CAD | 29 |
| rs2107595 | 7 | 19049388 | HDAC9-TWIST1 | | A | G | 0.16 | 0.329 | 2.03E-16 | Yes | | A | Stroke | 33 |
| rs10230207 | 7 | 19611307 | LOC105375179-LOC105375180 | | T | G | 0.09 | 0.191 | 9.91E-10 | Yes | | T | ICA | 39 |
| rs112370447 | 7 | 107176780 | COG5 | Intron | T | C | 0.28 | 0.049 | 9.60E-07 | No | rs987391 | G | CAD | 29 |
| rs11556924 | 7 | 129663496 | ZC3HC1 | Exon non-syn. | C | T | 0.66 | 0.068 | 6.30E-13 | Yes | | C | CAD | 29 |
| rs11556924 | 7 | 129663496 | ZC3HC1 | Exon non-syn. | C | T | NR | 0.094 | 2.66E-10 | Yes | | C | Stroke | 34 |
| rs264 | 8 | 19813180 | LPL | intron | G | A | NR | 0.105 | 2.92E-07 | Yes | | G | CAD | 34 |
| rs2083636 | 8 | 19865263 | LPL-LOC105379311 | | T | G | 0.74 | 0.049 | 6.40E-08 | Yes | | T | CAD | 29 |
| rs2001846 | 8 | 126478450 | TRIB1-LOC105375746 | | T | C | 0.49 | 0.049 | 8.97E-07 | Yes | | T | MI | 28 |
| rs2954029 | 8 | 126490972 | TRIB1-LOC105375746 | | A | T | 0.54 | 0.058 | 5.20E-13 | No | rs2980875 | A | CAD | 29 |
| rs6475606 | 9 | 22081850 | CDKN2B-AS1 | Intron | T | C | 0.48 | 0.300 | 3.59E-08 | Yes | | T | ICA | 41 |
| rs1537370 | 9 | 22084310 | CDKN2B-AS1 | Intron | T | C | 0.46 | 0.532 | 2.35E-11 | Yes | | C | CAC | 42 |
| rs4977574 | 9 | 22098574 | CDKN2B-AS1 | Intron | G | A | 0.56 | 0.247 | 1.08E-41 | Yes | | G | CAD | 3 |
| rs4977574 | 9 | 22098574 | CDKN2B-AS1 | Intron | G | A | 0.56 | 0.255 | 2.70E-44 | Yes | | G | MI | 27 |

Fig. 6 (continued)

| Original SNP | Chr | Position of original SNP (GRCh37) | Locus (Gene) | Functional Consequence | Alleles Effect | Alleles Other | EAF | European ancestry values as published β | European ancestry values as published p-value | Present in ADVANCE? | Best ADVANCE Proxy | ADVANCE Effect Allele | Risk Factor | Reference |
|---|---|---|---|---|---|---|---|---|---|---|---|---|---|---|
| rs2891168 | 9 | 22098619 | CDKN2B-AS1 | Intron | G | A | 0.49 | 0.174 | 1.30E-101 | Yes | | G | CAD | 29 |
| rs10757278 | 9 | 22124477 | CDKN2B-AS1-DMRTA1 | | G | A | 0.45 | 0.247 | 1.00E-20 | Yes | | G | MI | 43 |
| rs1333047 | 9 | 22124504 | CDKN2B-AS1-DMRTA1 | | T | A | NR | 0.182 | 1.64E-06 | Yes | | T | Stroke | 34 |
| rs1333049 | 9 | 22125503 | CDKN2B-AS1-DMRTA1 | | C | G | 0.46 | 0.199 | 3.33E-24 | Yes | | G | CAC | 44 |
| rs514659 | 9 | 136142203 | ABO | Intron | C | A | 0.40 | 0.191 | 7.62E-09 | No | rs576123 | C | CAD | 3 |
| rs514659 | 9 | 136142203 | ABO | Intron | C | A | 0.37 | 0.191 | 7.62E-09 | No | rs576123 | C | MI | 45 |
| rs532436 | 9 | 136149830 | ABO | Intron | A | G | 0.19 | 0.113 | 2.31E-17 | Yes | | A | MI | 28 |
| rs1887318 | 10 | 30321598 | KIAA1462 | Intron | T | C | 0.43 | 0.058 | 4.10E-12 | Yes | | T | CAD | 29 |
| rs2505083 | 10 | 30335122 | KIAA1462 | Intron | C | T | 0.39 | 0.058 | 6.85E-09 | Yes | | C | MI | 28 |
| rs1870634 | 10 | 44480811 | LINC00841-CXCL12 | | G | T | 0.65 | 0.058 | 5.50E-13 | Yes | | G | CAD | 29 |
| rs501120 | 10 | 44753867 | LINC00841-CXCL12 | | T | G | NR | 0.083 | 1.54E-06 | Yes | | T | CAD | 34 |
| rs1746048 | 10 | 44775824 | ZNF32-CXCL12 | | C | T | 0.84 | 0.131 | 8.14E-11 | Yes | | C | CAD | 3 |
| rs1746048 | 10 | 44775824 | LINC00841-CXCL12 | | C | T | 0.84 | 0.157 | 7.40E-09 | Yes | | C | MI | 27 |
| rs1004467 | 10 | 104594507 | CYP17A1 | Intron | A | G | 0.87 | 0.077 | 7.71E-08 | No | rs7912206 | C | MI | 28 |
| rs11191416 | 10 | 104604916 | LOC107984264-BORCS7 | | T | G | 0.89 | 0.077 | 5.60E-09 | Yes | | T | CAD | 29 |
| rs12413409 | 10 | 104719096 | CNNM2 | intron | G | A | NR | 0.117 | 1.24E-06 | Yes | | G | CAD | 34 |
| rs11196288 | 10 | 115057443 | LOC105378489-LOC105378490 | | G | A | 0.05 | 0.344 | 1.50E-08 | No | rs7906302 | G | Stroke | 46 |
| rs10840293 | 11 | 9751196 | SWAP70 | Intron | A | G | 0.55 | 0.049 | 6.90E-09 | Yes | | A | CAD | 29 |
| rs3993105 | 11 | 13303071 | ARNTL | Intron | T | C | 0.68 | 0.047 | 4.77E-08 | No | rs7928655 | G | CAD | 29 |
| rs2019090 | 11 | 103668962 | LOC105369463-LOC102723862 | | A | T | 0.36 | 0.068 | 3.60E-09 | Yes | | A | MI | 28 |
| rs2839812 | 11 | 103673294 | LOC105369463-LOC102723862 | | T | A | 0.31 | 0.058 | 2.00E-11 | Yes | | T | CAD | 29 |
| rs9326246 | 11 | 116611733 | LOC101929011-BUD13 | | C | G | NR | 0.140 | 3.40E-07 | Yes | | C | CAD | 34 |
| rs964184 | 11 | 116648917 | ZPR1 | 3'UTR | G | C | 0.16 | 0.049 | 4.70E-06 | Yes | | G | CAD | 29 |
| rs12425791 | 12 | 783484 | LOC105369597 | Non coding | A | G | 0.23 | 0.239 | 1.00E-09 | No | rs11833579 | A | Stroke | 46 |
| rs2229357 | 12 | 57843711 | INHBC | Exon non-syn. | G | A | 0.76 | 0.049 | 3.40E-06 | Yes | | G | CAD | 29 |
| rs2681472 | 12 | 90008959 | ATP2B1 | Intron | G | A | 0.19 | 0.068 | 7.60E-11 | Yes | | G | CAD | 29 |
| rs3184504 | 12 | 111884608 | SH2B3 | Exon non-syn. | T | C | NR | 0.068 | 9.33E-07 | No | rs7310615 | C | CAD | 34 |
| rs10774625 | 12 | 111910219 | ATXN2 | Intron | A | G | 0.49 | 0.068 | 9.20E-14 | Yes | | A | CAD | 29 |
| rs653178 | 12 | 112007756 | ATXN2 | Intron | C | T | 0.44 | 0.077 | 2.80E-11 | No | rs7137828 | C | MI | 28 |
| rs2238151 | 12 | 112211833 | ALDH2 | | T | C | 0.66 | 0.122 | 1.03E-06 | Yes | | T | Stroke | 33 |
| rs10744777 | 12 | 112233018 | ALDH2 | | T | C | 0.67 | 0.068 | 4.20E-09 | Yes | | T | Stroke | 30 |
| rs17696736 | 12 | 112486818 | NAA25 | | G | A | NR | 0.095 | 5.96E-08 | No | rs10850001 | A | Stroke | 34 |
| rs2244608 | 12 | 121416988 | HFN1A | Intron | G | A | 0.35 | 0.052 | 7.74E-10 | Yes | | G | CAD | 29 |
| rs11057830 | 12 | 125307053 | SCARB1 | Intron | A | G | 0.15 | 0.068 | 4.20E-09 | Yes | | A | CAD | 29 |
| rs4304924 | 13 | 79238925 | RNF219-LINC00331 | | A | G | 0.44 | 0.163 | 4.50E-06 | Yes | | A | Stroke | 34 |
| rs16945184 | 13 | 917555199 | LINC00380-LOC105370312 | | C | T | 0.66 | 0.186 | 5.80E-06 | Yes | | C | CHD | 32 |
| rs11617955 | 13 | 110818102 | COL4A1 | Intron | T | A | 0.89 | 0.086 | 4.10E-10 | Yes | | T | CAD | 29 |
| rs55940034 | 13 | 111043309 | COL4A2 | Intron | G | A | 0.27 | 0.068 | 7.62E-08 | Yes | | G | MI | 28 |
| rs1924981 | 13 | 290226415 | FLT1 | Intron | T | C | 0.33 | 0.049 | 1.90E-07 | Yes | | T | CAD | 29 |

Fig. 6 (continued)

| Original SNP | Chr | Position of original SNP (GRCh37) | Locus (Gene) | Functional Consequence | Alleles Effect | Alleles Other | EAF | European ancestry values as published β | European ancestry values as published p-value | Present in ADVANCE? | Best ADVANCE Proxy | ADVANCE Effect Allele | Risk Factor | Reference |
|---|---|---|---|---|---|---|---|---|---|---|---|---|---|---|
| rs12435908 | 14 | 66121468 | FUT8 | Intron | A | C | 0.93 | 0.255 | 7.19E-06 | Yes | | A | Stroke | 31 |
| rs1005224 | 14 | 76173860 | TTLL5 | intron | A | T | NR | 0.186 | 1.47E-06 | Yes | | A | Stroke | 34 |
| rs963474 | 14 | 77600584 | ZDHHC22 | intron | G | C | NR | 0.174 | 3.78E-06 | Yes | | G | Stroke | 34 |
| rs10139550 | 14 | 100145710 | HHIPL1 | 3'UTR | G | C | 0.42 | 0.049 | 1.80E-09 | Yes | | G | CAD | 29 |
| rs72743461 | 14 | 67441750 | SMAD3 | Intron | C | A | 0.78 | 0.068 | 4.80E-12 | Yes | | C | CAD | 29 |
| rs1994016 | 15 | 79080234 | ADAMTS7 | Intron | C | T | 0.61 | 0.199 | 2.41E-12 | Yes | | C | CAD | 3 |
| rs1994016 | 15 | 79080234 | ADAMTS7 | Intron | C | T | 0.6 | 0.174 | 4.98E-13 | Yes | | C | CAD | 45 |
| rs3825807 | 15 | 79089111 | ADAMTS7 | Exon non-syn. | T | C | 0.57 | 0.363 | 6.50E-06 | No | rs4886592 | C | CAC | 42 |
| rs7164479 | 15 | 79123054 | ADAMTS7-MORF4L1 | | C | T | 0.58 | 0.068 | 6.40E-18 | No | rs7182716 | C | CAD | 29 |
| rs7165042 | 15 | 79123338 | ADAMTS7-MORF4L1 | | C | T | 0.56 | 0.058 | 3.02E-09 | Yes | | C | MI | 28 |
| rs7173743 | 15 | 79141784 | ADAMTS7-MORF4L1 | | T | C | NR | 0.073 | 6.70E-08 | Yes | | T | CAD | 34 |
| rs2083460 | 15 | 89574484 | MFGE8-ABHD2 | | C | C | 0.89 | 0.068 | 1.40E-07 | Yes | | C | CAD | 29 |
| rs247616 | 16 | 56989590 | HERPUD1-CETP | | C | T | 0.68 | 0.039 | 1.00E-06 | Yes | | C | CAD | 29 |
| rs7193343 | 16 | 73029160 | ZFHX3 | Intron | T | C | 0.17 | 0.157 | 2.29E-10 | Yes | | T | Stroke | 30 |
| rs2106261 | 16 | 73051620 | ZFHX3 | Intron | T | C | 0.22 | 0.223 | 2.30E-07 | Yes | | T | AF | 3 |
| rs879324 | 16 | 73068678 | ZFHX3 | intron | A | G | 0.19 | 0.223 | 2.28E-08 | Yes | | A | Stroke | 33 |
| rs7500448 | 16 | 83045790 | CDH13 | Intron | A | G | 0.77 | 0.061 | 4.76E-10 | Yes | | A | CAD | 29 |
| rs4843616 | 16 | 86685419 | FOXL1-LOC102724344 | | G | A | NR | 0.357 | 6.50E-06 | No | rs16941789 | C | MI | 35 |
| rs113348108 | 17 | 2088849 | SMG6 | Intron | Del | CAGA | 0.31 | 0.049 | 5.80E-08 | No | rs4790883 | C | CAD | 29 |
| rs22811727 | 17 | 2117945 | SMG6 | Intron | G | A | NR | 0.068 | 1.07E-07 | Yes | | G | CAD | 34 |
| rs9914266 | 17 | 2133250 | SMG6 | Intron | C | T | 0.35 | 0.049 | 2.55E-06 | Yes | | C | MI | 28 |
| rs4792143 | 17 | 11385890 | SHISA6 | | C | T | NR | 0.094 | 5.07E-06 | Yes | | C | Stroke | 34 |
| rs12936587 | 17 | 17543722 | PEMT-RAI1 | | G | A | NR | 0.073 | 1.98E-07 | Yes | | G | CAD | 34 |
| rs9897596 | 17 | 17593453 | RAI1 | intron | T | C | 0.52 | 0.039 | 3.10E-06 | Yes | | T | CAD | 29 |
| rs35895680 | 17 | 47060322 | GIP-IGF2BP1 | | C | A | 0.72 | 0.058 | 7.77E-06 | Yes | | C | MI | 28 |
| rs4643373 | 17 | 47123423 | IGF2BP1 | Intron | T | C | 0.72 | 0.049 | 1.20E-06 | Yes | | T | CAD | 29 |
| rs7212798 | 17 | 59013488 | BCAS3 | Intron | C | T | 0.15 | 0.068 | 8.06E-06 | Yes | | C | MI | 28 |
| rs8068952 | 17 | 59286644 | BCAS3 | Intron | G | G | 0.23 | 0.068 | 1.40E-09 | Yes | | G | CAD | 29 |
| rs6565653 | 17 | 78201783 | SLC26A11 | Intron | T | G | 0.46 | 0.182 | 5.51E-07 | Yes | | T | Stroke | 31 |
| rs1122608 | 19 | 11163601 | SMARCA4 | Intron | G | T | 0.75 | 0.140 | 1.90E-09 | No | rs73013202 | C | MI | 27 |
| rs1122608 | 19 | 11163601 | SMARCA4 | Intron | G | T | 0.75 | 0.128 | 3.32E-11 | No | rs73013202 | C | CAD | 34 |
| rs8108632 | 19 | 41854534 | TGFB1 | Intron | T | A | 0.48 | 0.047 | 4.04E-08 | Yes | | T | CAD | 29 |
| rs56131196 | 19 | 45422846 | APOC1 | Downstr.500B | A | G | 0.16 | 0.086 | 3.87E-08 | No | rs4420638 | G | MI | 28 |
| rs28451064 | 21 | 35593827 | LINC00310-LOC105372791 | | A | G | 0.12 | 0.131 | 2.60E-23 | Yes | | A | CAD | 29 |
| rs9982601 | 21 | 35599128 | MRPS6-KCNE2 | | T | C | 0.13 | 0.182 | 6.40E-11 | Yes | | T | MI | 27 |
| rs9982601 | 21 | 35599128 | LINC00310-KCNE2 | | T | C | NR | 0.166 | 2.52E-10 | Yes | | T | CAD | 34 |
| BIRTH WEIGHT | | | | | | | | | | | | | | |
| rs2473248 | 1 | 22536643 | WNT4-ZBTB40 | | C | T | 0.87 | 0.033 | 1.10E-08 | No | rs2744729 | T | Birth Weight | 47 |
| rs4330912 | 1 | 155969428 | LOC107985208, LOC107985210 | Intron | G | C | 0.64 | 0.021 | 1.80E-07 | No | rs12043212 | A | Birth Weight | 47 |

Fig. 6 (continued)

| Original SNP | Position of original SNP (GRCh37) | Chr | Locus (Gene) | Functional Consequence | Alleles Effect | Alleles Other | EAF | European ancestry values as published β | European ancestry values as published p-value | Present in ADVANCE? | Best ADVANCE Proxy | ADVANCE Effect Allele | Risk Factor | Reference |
|---|---|---|---|---|---|---|---|---|---|---|---|---|---|---|
| rs72480273 | 161644871 | 1 | FCGR2B | Intron | C | A | 0.17 | 0.031 | 8.00E-10 | No | rs12118043 | C | Birth Weight | 47 |
| rs61830764 | 212289976 | 1 | DTL-PPP2R5A |  | A | G | 0.38 | 0.022 | 5.60E-08 | Yes |  | G | Birth Weight | 47 |
| rs7575873 | 23962647 | 2 | ATAD2B | Intron | A | G | 0.88 | 0.038 | 1.30E-11 | No | rs7578606 | C | Birth Weight | 47 |
| rs1374204 | 46484205 | 2 | LOC101926974 | Intron | T | C | 0.70 | 0.047 | 6.20E-29 | Yes |  | C | Birth Weight | 47 |
| rs2168443 | 46947087 | 3 | PTH1R-CCDC12 |  | T | A | 0.38 | 0.023 | 3.50E-09 | Yes |  | A | Birth Weight | 47 |
| rs11719201 | 123068744 | 3 | ADCY5 | Intron | T | C | 0.23 | 0.046 | 2.40E-26 | Yes |  | C | Birth Weight | 47 |
| rs10935733 | 148622968 | 3 | CPA3-GYG1 |  | T | C | 0.41 | 0.022 | 9.20E-09 | Yes |  | C | Birth Weight | 47 |
| rs900399 | 156798732 | 3 | LEKR1-LINC00880 |  | A | G | 0.61 | 0.052 | 2.20E-41 | Yes |  | G | Birth Weight | 47 |
| rs2724475 | 17946432 | 4 | LCORL | Intron | T | C | 0.27 | 0.034 | 5.30E-16 | Yes |  | C | Birth Weight | 47 |
| rs2131354 | 145599908 | 4 | HHIP | Intron | A | G | 0.53 | 0.026 | 4.10E-12 | Yes |  | G | Birth Weight | 47 |
| rs4432842 | 57172078 | 5 | LOC101928505-LOC101928539 |  | T | C | 0.70 | 0.021 | 3.40E-07 | Yes |  | C | Birth Weight | 47 |
| rs2946179 | 157886627 | 5 | LOC101927697-EBF1 |  | C | T | 0.73 | 0.024 | 1.30E-08 | Yes |  | T | Birth Weight | 47 |
| rs35261542 | 20675792 | 6 | CDKAL1 | Intron | C | A | 0.73 | 0.044 | 4.40E-27 | Yes |  | A | Birth Weight | 47 |
| rs9379832 | 26186200 | 6 | HIST1H2BE-HIST1H4D |  | A | G | 0.70 | 0.023 | 6.60E-08 | Yes |  | G | Birth Weight | 47 |
| rs9368777 | 33788637 | 6 | LOC105375025 | Intron | C | G | 0.58 | 0.022 | 2.20E-08 | Yes |  | G | Birth Weight | 47 |
| rs1187118 | 34169020 | 6 | GRM4-HMGA1 |  | A | T | 0.17 | 0.030 | 3.60E-09 | Yes |  | T | Birth Weight | 47 |
| rs1415701 | 130345835 | 6 | L3MBTL3 | Intron | G | A | 0.74 | 0.025 | 2.60E-09 | Yes |  | A | Birth Weight | 47 |
| rs10872678 | 152039964 | 6 | ESR1 | Intron | T | C | 0.72 | 0.038 | 6.90E-20 | Yes |  | C | Birth Weight | 47 |
| rs798489 | 2801803 | 7 | GNA12, AMZ1 | Intron, Intron | C | T | 0.73 | 0.023 | 2.00E-08 | Yes |  | T | Birth Weight | 47 |
| rs11765649 | 23479013 | 7 | IGF2BP3 | Intron | T | C | 0.75 | 0.027 | 5.80E-10 | Yes |  | C | Birth Weight | 47 |
| rs6959887 | 35295365 | 7 | TBX20 | Upstream 2KB | A | G | 0.61 | 0.023 | 1.50E-10 | Yes |  | G | Birth Weight | 47 |
| rs62466330 | 73056805 | 7 | MLXIPL-VPS37D |  | C | T | 0.07 | 0.049 | 1.20E-10 | No | rs6987702 | T | Birth Weight | 47 |
| rs13266210 | 41533514 | 8 | ANK1 | Intron | A | G | 0.79 | 0.031 | 1.30E-11 | Yes |  | G | Birth Weight | 47 |
| rs6989280 | 126508746 | 8 | TRIB1-LOC105375746 |  | G | A | 0.73 | 0.022 | 2.20E-07 | No | rs77420391 | A | Birth Weight | 47 |
| rs12543725 | 142247979 | 8 | SLC45A4 | 5'UTR | G | A | 0.59 | 0.023 | 1.20E-09 | Yes |  | A | Birth Weight | 47 |
| rs12551019 | 96949079 | 9 | MIRLET7DHG | Intron | C | T | 0.68 | 0.022 | 3.10E-08 | Yes |  | T | Birth Weight | 47 |
| rs3780573 | 98239503 | 9 | PTCH1 | Intron | A | G | 0.10 | 0.055 | 7.00E-18 | Yes |  | G | Birth Weight | 47 |
| rs1411424 | 113892963 | 9 | LOC105376219 | Intron | A | G | 0.52 | 0.021 | 2.20E-08 | Yes |  | G | Birth Weight | 47 |
| rs4836833 | 123632829 | 9 | PHF19 | Intron | C | G | 0.67 | 0.023 | 8.60E-09 | No | rs3933326 | A | Birth Weight | 47 |
| rs10818797 | 126020405 | 9 | STRBP | Intron | C | T | 0.14 | 0.035 | 1.20E-10 | Yes |  | T | Birth Weight | 47 |
| rs2497304 | 94492716 | 10 | HHEX-EXOC6 |  | C | T | 0.52 | 0.028 | 2.60E-14 | Yes |  | T | Birth Weight | 47 |
| rs79237883 | 104940946 | 10 | NT5C2 | 5'UTR | C | T | 0.08 | 0.037 | 3.60E-08 | No | rs77420391 | G | Birth Weight | 47 |
| rs740746 | 115792787 | 10 | LOC105378493-ADRB1 |  | A | G | 0.73 | 0.036 | 3.80E-18 | No | rs2773469 | A | Birth Weight | 47 |
| rs2421016 | 124167512 | 10 | PLEKHA1 |  | T | C | 0.49 | 0.021 | 1.80E-08 | Yes |  | C | Birth Weight | 47 |
| rs10830963 | 92708710 | 11 | MTNR1B | Intron | G | C | 0.28 | 0.023 | 2.90E-08 | Yes |  | G | Birth Weight | 47 |
| rs11055034 | 12890626 | 12 | APOLD1 | Intron | C | A | 0.73 | 0.022 | 1.80E-07 | No | rs79375472 | G | Birth Weight | 47 |
| rs2306547 | 113632829 | 12 | ITPR2 | Intron | C | T | 0.54 | 0.021 | 1.80E-08 | Yes |  | T | Birth Weight | 47 |
| rs1351394 | 66351826 | 12 | HMGA2 | Intron | T | C | 0.49 | 0.044 | 1.90E-32 | Yes |  | C | Birth Weight | 47 |
| rs7964361 | 102994878 | 12 | LOC105369944 | Intron | A | G | 0.09 | 0.039 | 4.70E-09 | Yes |  | G | Birth Weight | 47 |

Fig. 6 (continued)

| Original SNP | Chr | Position of original SNP (GRCh37) | Locus (Gene) | Functional Consequence | Alleles Effect | Alleles Other | EAF | European ancestry values as published β | European ancestry values as published p-value | Present in ADVANCE? | Best ADVANCE Proxy | ADVANCE Effect Allele | Risk Factor | Reference |
|---|---|---|---|---|---|---|---|---|---|---|---|---|---|---|
| rs7998537 | 13 | 40662742 | LOC107984569-LINC00332 | | G | A | 0.68 | 0.022 | 3.90E-08 | No | rs7328783 | G | Birth Weight | 47 |
| rs34217484 | 13 | 48854550 | ITM2B-LINC00441 | | A | T | 0.26 | 0.024 | 4.80E-08 | Yes | | T | Birth Weight | 47 |
| rs1819436 | 13 | 78580283 | LINC01069-LINC00446 | | C | T | 0.87 | 0.033 | 6.30E-09 | Yes | | T | Birth Weight | 47 |
| rs7402982 | 15 | 99193269 | IGF1R | Intron | A | G | 0.43 | 0.023 | 2.30E-09 | Yes | | G | Birth Weight | 47 |
| rs1011939 | 16 | 19992996 | LOC105371117 | Intron | G | A | 0.30 | 0.022 | 1.30E-07 | Yes | | A | Birth Weight | 47 |
| rs113086489 | 17 | 7171356 | CLDN7-SLC2A4 | | T | C | 0.56 | 0.031 | 9.10E-16 | Yes | | C | Birth Weight | 47 |
| rs72833480 | 17 | 45964861 | SP6-LOC102724532 | | A | G | 0.29 | 0.023 | 4.60E-08 | Yes | | G | Birth Weight | 47 |
| rs10402712 | 19 | 33926013 | PEPD | Intron | A | G | 0.26 | 0.022 | 4.40E-07 | Yes | | G | Birth Weight | 47 |
| rs6040076 | 20 | 10658882 | JAG1-LOC101929395 | | C | G | 0.49 | 0.023 | 2.00E-09 | Yes | | G | Birth Weight | 47 |
| rs28530618 | 20 | 31275581 | C20orf203-COMMD7 | | A | G | 0.49 | 0.026 | 7.70E-12 | No | rs11475789 | A | Birth Weight | 47 |
| rs6016377 | 20 | 39172728 | LOC107985446-LOC102724968 | | T | C | 0.43 | 0.024 | 9.50E-10 | Yes | | C | Birth Weight | 47 |
| rs2229742 | 21 | 16339172 | NRIP1 | Exon non-syn. | G | C | 0.87 | 0.036 | 2.20E-09 | No | rs17274750 | A | Birth Weight | 47 |
| rs134594 | 22 | 29468456 | C22orf31, KREMEN1 | Intron, Upstr. 2KB | C | T | 0.35 | 0.023 | 1.00E-08 | Yes | | T | Birth Weight | 47 |

Fig. 7

| Outcome (number of events) | Polygenic risk scores | | | | | Clinical risk scores | |
|---|---|---|---|---|---|---|---|
| | PRS | PRS1 | PRS2 | PRS3 | PRS4 | FRS | UKPDS |
| Microalbuminuria (851) | 0.569 (0.546-0.592) | 0.569 (0.546-0.592) | 0.570 (0.547-0.593) | 0.570 (0.547-0.593) | 0.576 (0.553-0.599) | 0.550 (0.527-0.573) | 0.523 (0.500-0.546) |
| Macroalbuminuria (150) | 0.581 (0.537-0.625) | 0.601 (0.554-0.647) | 0.633 (0.587-0.678) | 0.633 (0.588-0.678) | 0.638 (0.593-0.684) | 0.614 (0.568-0.659) | 0.561 (0.514-0.608) |
| New or worsening nephropathy (198) | 0.571 (0.531-0.611) | 0.600 (0.558-0.642) | 0.614 (0.573-0.655) | 0.640 (0.601-0.679) | 0.640 (0.601-0.679) | 0.615 (0.576-0.655) | 0.559 (0.517-0.601) |
| New or worsening retinopathy (151) | 0.612 (0.567-0.657) | 0.612 (0.567-0.657) | 0.656 (0.610-0.702) | 0.682 (0.638-0.725) | 0.682 (0.638-0.726) | 0.551 (0.504-0.598) | 0.504 (0.455-0.552) |
| Doubling serum creatinine (62) | 0.578 (0.504-0.652) | 0.590 (0.519-0.662) | 0.610 (0.537-0.683) | 0.665 (0.593-0.737) | 0.672 (0.605-0.739) | 0.641 (0.571-0.712) | 0.528 (0.449-0.607) |
| Major microvascular (334) | 0.566 (0.533-0.599) | 0.569 (0.536-0.601) | 0.588 (0.555-0.622) | 0.662 (0.630-0.694) | 0.670 (0.639-0.702) | 0.620 (0.587-0.652) | 0.547 (0.513-0.581) |
| Major macrovascular (559) | 0.559 (0.533-0.586) | 0.600 (0.575-0.626) | 0.607 (0.582-0.633) | 0.630 (0.604-0.655) | 0.679 (0.654-0.704) | 0.647 (0.622-0.673) | 0.591 (0.565-0.618) |
| Myocardial infarction (192) | 0.596 (0.556-0.636) | 0.636 (0.597-0.675) | 0.637 (0.597-0.676) | 0.647 (0.609-0.684) | 0.660 (0.622-0.699) | 0.653 (0.614-0.691) | 0.601 (0.559-0.642) |
| Stroke (154) | 0.602 (0.555-0.648) | 0.612 (0.567-0.657) | 0.619 (0.574-0.664) | 0.630 (0.587-0.673) | 0.662 (0.618-0.706) | 0.615 (0.570-0.660) | 0.560 (0.512-0.607) |
| Heart failure (225) | 0.569 (0.530-0.609) | 0.572 (0.534-0.611) | 0.587 (0.549-0.625) | 0.619 (0.582-0.656) | 0.684 (0.648-0.720) | 0.606 (0.569-0.645) | 0.571 (0.532-0.611) |
| All cause death (549) | 0.536 (0.510-0.563) | 0.566 (0.541-0.592) | 0.591 (0.565-0.616) | 0.609 (0.583-0.635) | 0.691 (0.667-0.716) | 0.641 (0.616-0.666) | 0.598 (0.573-0.624) |
| Cardiovascular death (283) | 0.555 (0.519-0.591) | 0.577 (0.543-0.611) | 0.594 (0.560-0.627) | 0.632 (0.598-0.666) | 0.720 (0.688-0.752) | 0.650 (0.617-0.683) | 0.597 (0.563-0.631) |

Fig. 15
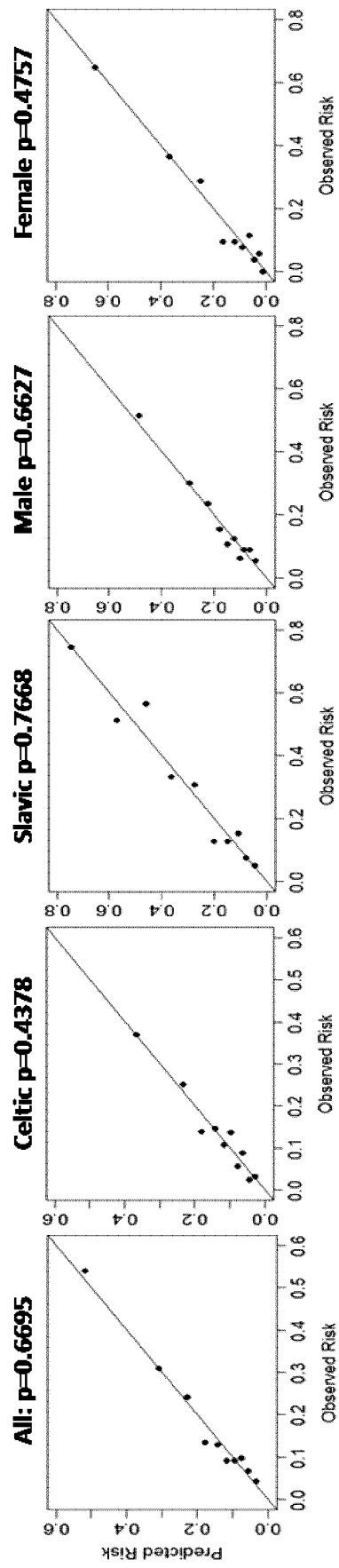
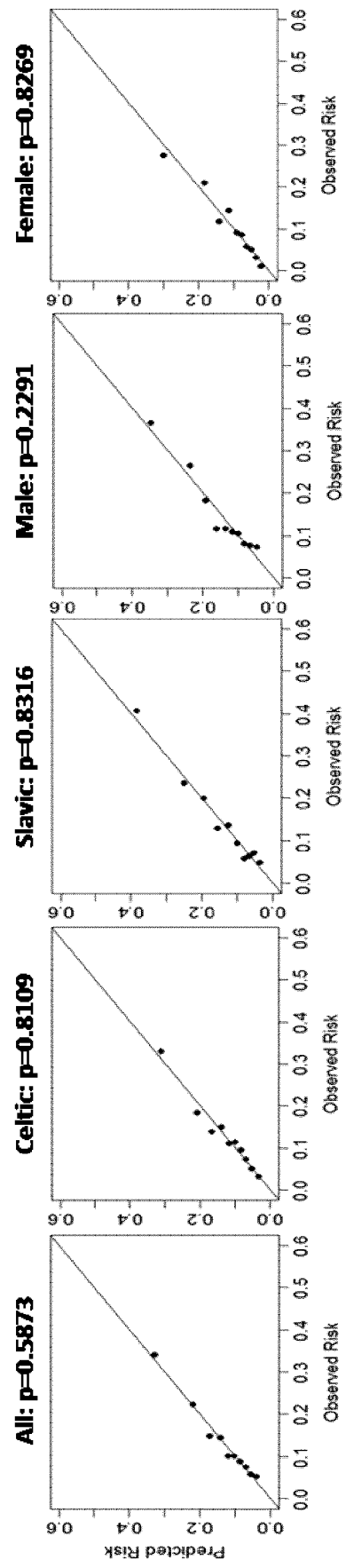

POLYGENIC RISK SCORES FOR PREDICTING DISEASE COMPLICATIONS AND/OR RESPONSE TO THERAPY

CROSS-REFERENCE TO RELATED APPLICATIONS

This application is a U.S. National Stage application of PCT/CA2019/050848 filed 14 Jun. 2019, which claims priority to U.S. Provisional Patent Application No. 62/685,642 filed 15 Jun. 2018, the entire disclosures of which are incorporated herein by reference.

The high incidence and increasing prevalence of type 2 diabetes (T2D) is one of the greatest challenges in public health worldwide. Diabetes is the leading cause of cardiovascular and renal diseases that are both serious and costly[1]. T2D decreases life expectancy by 5 to 10 years, resulting in excess death particularly in younger age groups (60-69 years old)[2]. Since the onset of vascular complications of diabetes can be postponed or partially prevented by early medical interventions that control glycaemia and blood pressure[3], improvement of the risk prediction is becoming crucial to enable targeting individuals at high risk that could most benefit from an early prevention[3].

Over the last few decades, several clinical risk factors have been combined into clinical prediction tools for cardiovascular diseases such as the Framingham Risk Score (FRS) and its many derivatives, some of which even included some genetic data[4,5]. Two prediction models exist for patients with newly diagnosed diabetes both from the UK Prospective Diabetes Study (UKPDS)[6], but their major limitations are that they were developed many decades ago with medications and therapeutic targets of that period. Several other prediction models were developed in populations with varying duration of diagnosed diabetes[7]. The majority of these prediction models predicted 5-year cardiovascular risk with predictors that include age, sex, and duration of diabetes, HbA1c, and smoking. The area (AUC) under receiver operating characteristic curve (ROC) were reported to range from 0.68 to 0.85 for these models, but only a minority of them has been validated and tested for their predictive accuracy[7]. Data from ADVANCE trial were also used to develop a model for cardiovascular risk prediction in people with T2D[8]. The risk factors included in the ADVANCE model are age at diagnosis and known duration of diabetes, sex, pulse pressure, treated hypertension, atrial fibrillation, retinopathy, HbA1c, urinary albumin/creatinine ratio and non-HDL cholesterol. The ADVANCE risk engine reached an AUC of 0.70 for major cardiovascular events occurring over a period of 4.5 years[8] and was replicated (AUC=0.69) in an independent set of patients with T2D, the DIABHYCAR cohort.

There is an increasing interest in the use of genetic variants to predict the risk of diseases[9]. A successful application of genome wide association studies (GWAS) has been the identification of multiple common variants associated to complex traits such as T2D[10-12], renal and cardiovascular diseases[13] using genomic approaches. Taken individually, these genetic variants account for only a small effect size. Combination of hundreds or even thousands of genetic variants into polygenic risk scores (PRS) was recently introduced into models used to predict individual risk of diseases[14,15] and combining PRS with clinical risk scores somewhat improved the predictive power of the model[4]. However, there remains a need for methods for predicting a subject's disease complications and/or response to therapy, particularly in T2D, where early risk prediction can lead to early medical interventions in subjects could benefit the most.

SUMMARY

Our objective was to develop a polygenic risk score (PRS) with high predictive value for complications of type 2 diabetes and other diseases. Genetic variants encompassing the main risk factors of diabetes complications were selected from publicly available GWAS data. A PRS was generated by weighting the number of risk alleles by the effect size of their association, combined with a geo-ethnic principal component as an individualized genomic background. Its predictive value was tested in Caucasian subjects of the ADVANCE trial. The PRS was a significant predictor of micro- and macrovascular complications, and of total and cardiovascular mortality, and its performance improved with the inclusion of sex, age of onset and diabetes duration to the model. The AUCs for prediction of cardiovascular death for this enhanced PRS was 0.720 (95% CI, 0.688-0.752) compared to 0.650 (95% CI, 0.617-0.683) for Framingham risk score and 0.597 (95% CI, 0.563-0.631) for the UK Prospective Diabetes Study in the same population. While the highest risk of macrovascular events and death (total and cardiovascular) was seen in older patients with high PRS, the risk of microvascular, including renal, events was highest in patients with high PRS and early onset of diabetes. High PRS patients had the greatest relative risk reduction with the combined therapy of ADVANCE with a number needed to treat of 12 to prevent one cardiovascular death over 4.5 years (p=0.0062) and persisted during the ADVANCE-ON post-trial observational study. Strikingly, the PRS described herein outperformed clinical scores in identifying earlier diabetic patients at increased risk of incident and prevalent vascular and renal complications and mortality, highlighting the clinical utility of the present invention in targeting high risk individuals that would benefit the most from early therapy.

In some aspects, described herein is a method for predicting a subject's disease complications and/or response to therapy, the method comprising: (a) genotyping said subject at a plurality of risk alleles associated with the disease; (b) genotyping said subject at a plurality of ancestry-informative markers; and (c) generating a PRS by weighting the number of risk alleles by the effect size of their association (weighted genetic risk score or wGRS), combined with a geo-ethnic principal component (PC) determined from the subject's genotype at said ancestry-informative markers such as generating the PRS by comparing the genomic and ancestral profile of said subject with a matching cohort of subjects with outcome data collected during a selected period of interest, wherein the PRS enables prediction of said subject's disease complications and/or response to therapy (e.g., based on data from the matching cohort).

In some aspects, described herein is a method for treating a subject having diabetes, the method comprising predicting the subject's disease complications and/or response to therapy (e.g., based on data from the matching cohort) as described herein, and beginning or modifying the anti-diabetes treatment of said subject based on said PRS.

In some aspects, described herein is a computer-implemented process of predicting a subject's disease complications and/or response to therapy, the process comprising: (a) inputting or receiving genotyping information from said subject at a plurality of risk alleles associated with the disease; (b) inputting or receiving genotyping information from said subject at a plurality of ancestry-informative markers; (c) generating a PRS by weighting the number of risk alleles by the effect size of their association (weighted genetic risk score or wGRS), combined with a geo-ethnic principal component (PC) determined from the subject's genotype at said ancestry-informative markers such as generating the PRS by comparing the genomic and ancestral profile of said subject with a matching cohort of subjects with outcome data collected during a selected period of interest, wherein the PRS enables prediction of said subject's disease complications and/or response to therapy (e.g., based on data from a matching cohort); and (d) optionally communicating said PRS to said subject and/or to said subject's health care provider.

In some aspects, described herein is a computer-implemented system for predicting a subject's disease complications and/or response to therapy, the computer-implemented system comprising a computer configured to: (i) receive a subject's genotyping information at a plurality of risk alleles associated with the disease and at a plurality of ancestry-informative markers; (ii) generate a PRS by weighting the number of risk alleles by the effect size of their association (weighted genetic risk score or wGRS), combined with a geo-ethnic principal component (PC) determined from the subject's genotype at said ancestry-informative markers such as generating the PRS by comparing the genomic and ancestral profile of said subject with a matching cohort of subjects with outcome data collected during a selected period of interest, wherein the PRS enables prediction of said subject's disease complications and/or response to therapy (e.g., based on data from the matching cohort); and (iii) optionally communicate said PRS to said subject and/or to said subject's health care provider.

In some aspects, described herein is a non-transitory computer-readable medium storing processor-executable instructions, the instructions when executed by a processor cause the processor to perform the method of: (i) receiving a subject's genotyping information at a plurality of risk alleles associated with the disease and at a plurality of ancestry-informative markers; (ii) generating a PRS by weighting the number of risk alleles by the effect size of their association (weighted genetic risk score or wGRS), combined with a geo-ethnic principal component (PC) determined from the subject's genotype at said ancestry-informative markers; and (iii) optionally outputting said PRS to a user.

In some aspects, described herein is a method for treating a subject having diabetes, the method comprising predicting the subject's disease complications and/or response to therapy using a PRS generated by a computer-implemented process, a computer-implemented system, or by executing instructions stored on the non-transitory computer-readable medium, as described herein.

General Definitions

Headings, and other identifiers, e.g., (a), (b), (i), (ii), etc., are presented merely for ease of reading the specification and claims. The use of headings or other identifiers in the specification or claims does not necessarily require the steps or elements be performed in alphabetical or numerical order or the order in which they are presented.

The use of the word "a" or "an" when used in conjunction with the term "comprising" in the claims and/or the specification may mean "one" but it is also consistent with the meaning of "one or more", "at least one", and "one or more than one".

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

As used herein, "subject" generally refers to a mammal, including primates, and particularly to a human.

Other objects, advantages and features of the present description will become more apparent upon reading of the following non-restrictive description of specific embodiments thereof, given by way of example only with reference to the accompanying drawings.

BRIEF DESCRIPTION OF THE FIGURES

In the appended figures:

FIG. 1: Characteristics of ADVANCE genotyped participants at baseline in comparison with whole ADVANCE cohort. * The values of all characteristics for whole ADVANCE are reported and extracted from Patel et al.[16] except for eGFR & UACR, extracted from Ninomiya T. et al.[17] Abbreviations: n: Number of patients, yr: Years, SD: Standard deviation, IQR: Interquartile range. BMI: Body mass index, $HbA_{1c}$: Glycated hemoglobin, SBP: Systolic blood pressure, DBP: Diastolic blood pressure, eGFR: Estimated glomerular filtration rate based on CKD-EPI formula, UACR: Urinary albumin creatinine ratio.

FIG. 5: SNPs selected from literature and divided into 9 risk groups of complications of T2D. SNPs are selected from the listed references as adapted from the model described by Ibrahim-Verbaas CA[18].

FIG. 6: List of 622 SNPs organized by risk groups. Abbreviations: SNP: Single nucleotide polymorphism, EAF: Effect Allele Frequency, T2D: Type 2 diabetes, HbA1c: Glycated hemoglobin, BMI: Body mass index, WC: Waist circumference, WHR: Waist hip ratio, MA: Microalbuminuria, UACR: Urinary albumin creatinine ratio, eGFR: Estimated glomerular filtration rate based on CKD-EPI formula, CREAT: Plasma creatinine, ESRD: End-stage renal disease, HTN: Hypertension, PP: Pulse pressure, SBP: Systolic blood pressure, CRP: C-reactive protein, HDL: High density lipoprotein, LDL: Low density lipoprotein, TC: Total cholesterol, TG: Triglycerides, A F: Atrial fibrillation, CAC: Coronary artery calcification, CAD: Coronary artery disease, CHD: Coronary heart disease, ICA: Intracranial aneurysm, MI: Myocardial infarction.

FIG. 7: Improvements in discrimination power of different outcomes when adding sex, age of onset of T2D & diabetes duration to genetic models (PRS to PRS4) and comparison with clinical models (Framingham and UKPDS). The polygenic risk score is composed of the weighted T2D complications genetic risk scores. AUCs and percentile-based confidence intervals were estimated from ROC curves and calculated from the predicted risks derived from the regression models. PRS=PC1+genetic variants, PRS1=sex+PRS, PRS2=age of onset+sex+PRS, PRS3=diabetes duration+sex+PRS, and PRS4=age of onset+diabetes duration+sex+PRS. The controls used for each outcome did not have the specific phenotype at baseline or during the study but may have others (control group). The Framingham and UKPDS risk scores were calculated as described in the literature and tested for association with ADVANCE phenotypes using linear regression. Microalbuminuria is defined as urinary albumin creatinine ratio of 30 to 300 mg/g at the end of the study. Macroalbuminuria is defined as urinary albumin creatinine ratio of >300 mg/g at the end of the study. New or worsening nephropathy is defined as the development of macroalbuminuria, doubling of serum creatinine to a level at least 200 mmol/L, end-stage renal disease (ESRD) defined as a need for dialysis or renal transplantation, and death due to renal disease. New or worsening retinopathy is defined as proliferative retinopathy, macular oedema and history of retinal photocoagulation therapy. Major microvascular events is a composite of ESRD and defined as requirement for renal replacement therapy, death induced by renal disease, requirement of retinal photocoagulation, or diabetes-related blindness in either eye. Major macrovascular events is a composite of nonfatal myocardial infarction, nonfatal stroke, or cardiovascular death. Abbreviation: n: Number of events, AUC: Area under the curve, CI: Confidence interval.

FIG. 15: Ethnic- and sex-specific calibration plots of PRS4 for cardiovascular and all cause death.

DETAILED DESCRIPTION

Figure 2:
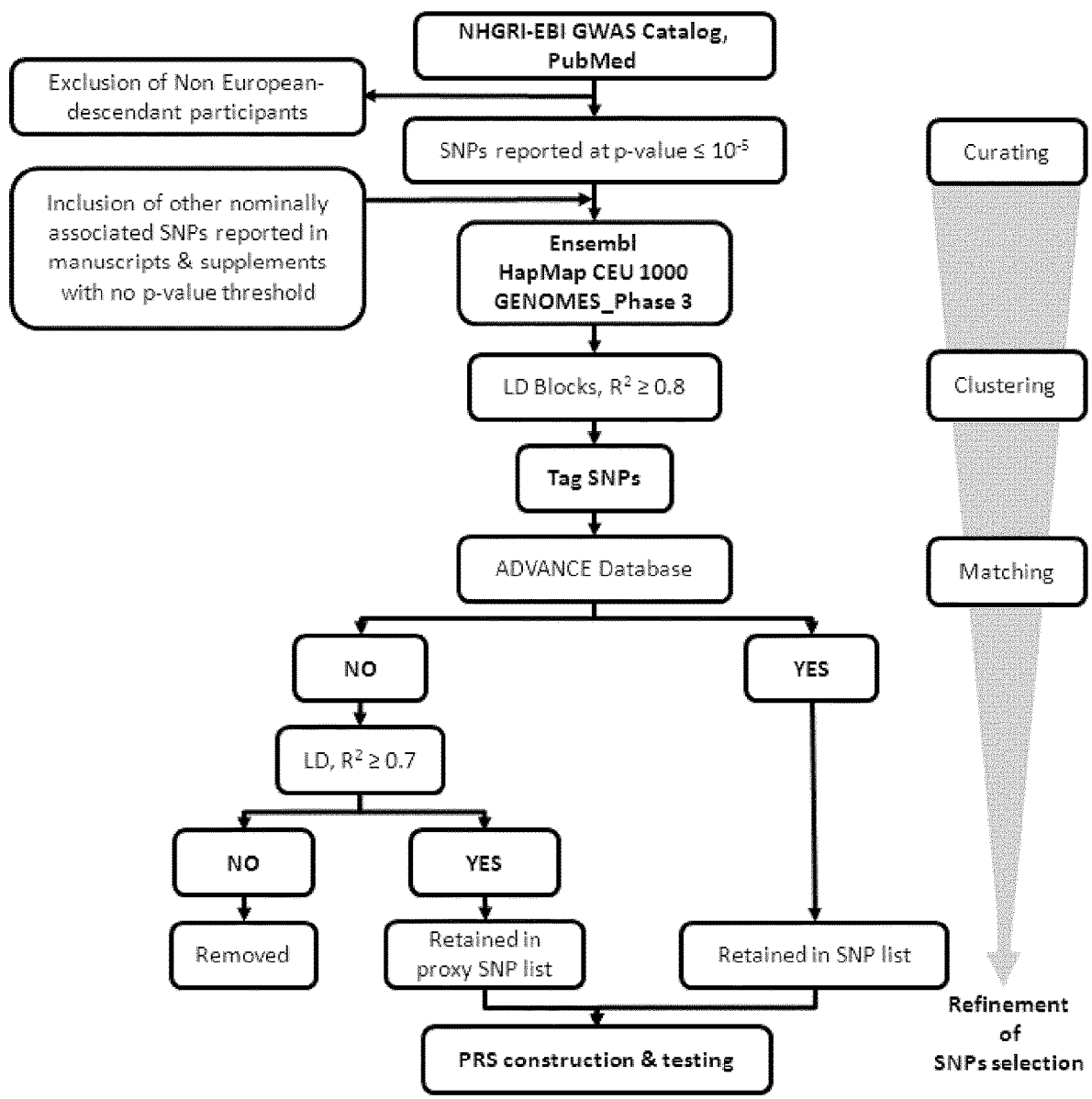
FIG. 2: Stepwise approach for selection of SNPs included in the PRS. The approach of SNP selection to construct the PRS integrates public-access resources including continuously updated database of GWAS results, NHGRI-EBI GWAS Catalog and PubMed. Curating consists on extraction of SNPs associated with one of the selected phenotypes at a given significance threshold from each GWAS and PubMed pertinent literature including only Caucasian participants. Clustering: extracted SNPs are clustered according to patterns of linkage disequilibrium (LD) determined from a HapMap CEU 1000 genomes reference population that matches the European population of the selected SNPs to yield a set of LD Blocks. Matching: Tag SNPs identified from LD blocks were used for matching with SNPs from ADVANCE GWAS databases. SNPs retained were used to construct the PRS that is tested on ADVANCE genotyped participants. Abbreviation: NHGRI-EBI GWAS catalog: National human genome research institute-European bioinformatics institute catalog of published genome-wide association studies.

The present study selected a large number of SNPs within most loci determining risk factors of complications of T2D to construct a polygenic risk score (PRS), and compared its performance with two established clinical risk scores (Framingham risk score and the UKPDS risk engine). We tested these three risk scores on 4098 genotyped patients with T2D of Caucasian origin of the ADVANCE trial[16,19], extended to its post-trial follow-up, ADVANCE-ON[20]. Our selection of informative genetic variants was based on publicly available results of meta-analyses of GWAS data. The risk alleles of the selected genetic variants were used to generate PRS by weighting the number of risk alleles by the effect size of their association in the original association study. Ethnicity plays a role in the development of several diabetic complications and we recently reported[19] that a principal component (PC) analysis with several thousands of SNPs, can be used to stratify ADVANCE Caucasian participants into two main geo-ethnic groups. The first principal component (PC1) divided the individuals of Europe along an east-west gradient of Balto-Slavic and Germano-Celtic origins[19]. These two geo-ethnic groups exhibit different risk profiles for T2D complications, so we integrated PC1 into the PRS as an individualized genetic background (IGB). This PRS was then combined with age of onset and diabetes duration, the two diabetes-specific predictors used in ADVANCE risk engine[8], in order to define specific predictive models that were tested by the AUC of the ROC curves. We also investigated whether the PRS could be used to identify individuals that most benefit from the combined therapy administered in ADVANCE[21].

Accordingly, in some embodiments, the present description relates to a method for predicting a subject's disease complications and/or response to therapy, the method comprising: (a) genotyping said subject at a plurality of risk alleles associated with the disease; (b) genotyping said subject at a plurality of ancestry-informative markers; and (c) generating a polygenic risk score (PRS) by weighting the number of risk alleles by the effect size of their association (weighted genetic risk score or wGRS), combined with a geo-ethnic principal component (PC) determined from the subject's genotype at said ancestry-informative markers (e.g., generating the PRS by comparing the genomic and ancestral profile of said subject with a matching cohort of subjects with outcome data collected during a selected period of interest), wherein the PRS enables prediction of said subject's disease complications and/or response to therapy (e.g., based on data from the matching cohort). For greater clarity, the PRS of the subject may be generated by comparing the genomic and ancestral profile of the subject with a matching cohort of subjects with outcome data collected during a selected period of interest (e.g., a 5- or 10-year period). For example, the PRS determination may take into account multiple genomic and/or ancestral profile variants of a subject and match them to subjects in a database with similar genomic and/or ancestral profiles, and who developed or not the disease or its complications over the same period of time.

Advantageously, the PRSs described herein (e.g., generated in (c) above) may enable better and/or earlier prediction of the subject's disease complications and/or response to therapy, as compared to a corresponding PRS generated lacking the geo-ethnic principal component determined from the subject's genotype at said ancestry-informative markers. In some embodiments, the PRSs described herein may enable earlier prediction of the subject's disease complications and/or response to therapy, as compared to an approved clinical risk score for the disease. For example, the PRSs described herein may enable better and/or earlier prediction of the subject's disease complications and/or response to therapy as compared to Framingham Risk Score and/or UKPDS risk score, for example for one or more outcomes comprising microalbuminuria, macroalbuminuria, new or worsening nephropathy, new or worsening retinopathy, doubling serum creatinine, major microvascular, major macrovascular, myocardial infarction, stroke, heart failure, all cause death, cardiovascular death, or any combination thereof.

In some embodiments, the genotyping is performed from a biological sample from the subject, such as a blood or tissue sample. In some embodiments, the genotyping is performed by microarray analysis.

In some embodiments, the wGRS is determined by the equation $$wGRS_i^k = \sum_{j=1}^{m} X_{ij}^k \times \beta_j^k,$$

where $X_{ij}^k$ is the allele frequency of $i^{th}$ subject in $j^{th}$ SNP for $k^{th}$ phenotype, and $\beta$ is the effect size of the phenotype.

In some embodiments, the PRS further comprises one or more clinical components (e.g., the subject's sex, age, age of onset of said disease, duration of said disease, or any combination thereof). In some embodiments, the inclusion of one or more clinical components further increases the performance of the PRSs described herein for predicting the subject's disease complications and/or response to therapy (e.g., based on data from a matching cohort).

In some embodiments, the plurality of risk alleles may comprise at least 100, 200, 300, 400, 500 or 600 different single nucleotide polymorphisms (SNPs) (e.g., known to be associated with T2D or another disease or outcome described). In some embodiments, the plurality of ancestry-informative markers may comprise at least 1000, 2000, 3000, 4000, 5000, 10 000, 15 000, 20 000, or 30 000 different SNPs.

In some embodiments, the diseases and/or disease complications suitable for the PRS-based prediction methods, processes, and systems generally described herein, are those for which different geo-ethnic groups exhibit different risk profiles. Prediction of such diseases and/or disease complications are expected to benefit from PRSs generated by combining a weighted genetic risk score with a geo-ethnic principal component determined from a subject's genotype at a plurality of ancestry-informative markers (e.g., based on data from a matching cohort), as described herein.

In some embodiments, the subject has been recently (or for the first time) diagnosed with diabetes (e.g., T2D). In some embodiments, the PRS distinguishes subjects who benefit the most from intensive antihypertensive and/or glucose lowering therapy. In some embodiments, the PRS enables the prediction of diabetic patients with increased risk for vascular complications and/or cardiovascular mortality.

In some embodiments, the method described herein may be useful for predicting a subject's diabetes complications, such as macroalbuminuria, new or worsening nephropathy, new or worsening retinopathy, doubling serum creatinine, major microvascular, major macrovascular, myocardial infarction, stroke, heart failure, all causes of death, cardiovascular death, or any combination thereof.

In some embodiments, the plurality of risk alleles comprise the SNPs set forth in FIG. 6. In some embodiments, the plurality of risk alleles comprise at least 50, 100, 150, 200, 250, 300, 350, 400, 450, 500, 550 or 600 different SNPs selected from: rs10923931, rs2779116, rs340874, rs7578597, rs243021, rs7593730, rs552976, rs7578326, rs1801282, rs4607103, rs11708067, rs1470579, rs10010131, rs7754840, rs1800562, rs9472138, rs2191349, rs864745, rs1799884, rs4607517, rs972283, rs4737009, rs896854, rs13266634, rs10811661, rs13292136, rs12779790, rs1111875, rs2334499, rs231362, rs2237892, rs5215, rs1552224, rs1387153, rs10830963, rs1153188, rs1531343, rs7961581, rs7957197, rs7998202, rs11634397, rs8042680, rs9939609, rs1046896, rs855791, rs3127553, rs2815752, rs7531118, rs1514175, rs4130548, rs11165623, rs1555543, rs984222, rs1011731, rs633715, rs543874, rs2820292, rs4846567, rs6429082, rs2867125, rs6755502, rs713586, rs887912, rs6545714, rs2890652, rs10195252, rs2176040, rs6784615, rs6795735, rs3849570, rs2325036, rs13078807, rs6440003, rs9816226, rs1516725, rs10938397, rs2112347, rs4836133, rs6861681, rs1294421, rs806794, rs206936, rs16894959, rs6905288, rs987237, rs943005, rs9400239, rs9491696, rs2489623, rs1055144, rs10968576, rs6163, rs7903146, rs4929949, rs10840100, rs10767658, rs10767664, rs2293576, rs3817334, rs7121446, rs718314, rs7138803, rs1443512, rs4771122, rs12429545, rs10132280, rs12885454, rs10150332, rs7144011, rs4776970, rs2241423, rs2531992, rs12444979, rs12446632, rs2650492, rs7498665, rs7359397, rs1549293, rs1558902, rs7239883, rs6567160, rs571312, rs29941, rs3810291, rs16996700, rs4823006, rs11579312, rs4072037, rs914615, rs13427836, rs17346504, rs16827742, rs11678190, rs11678190, rs13079877, rs1077216, rs7634770, rs13160548, rs12719264, rs17738155, rs2110904, rs4722909, rs17301329, rs7851726, rs1109861, rs17343073, rs1801239, rs6602163, rs12764441, rs3740393, rs7922045, rs729014, rs10899033, rs649529, rs2303658, rs7145202, rs1728897, rs1528472, rs231227, rs6513791, rs2828785, rs1800615, rs12136063, rs267734, rs3850625, rs2802729, rs807601, rs1260326, rs6546838, rs13538, rs4667594, rs2712184, rs6795744, rs2861422, rs347685, rs9682041, rs10513801, rs17319721, rs228611, rs11959928, rs11959928, rs7759001, rs881858, rs9472135, rs316009, rs3127573, rs3750082, rs848490, rs7805747, rs7805747, rs3758086, rs1731274, rs4744712, rs1044261, rs10994860, rs163160, rs963837, rs4014195, rs10774021, rs10491967, rs7956634, rs1106766, rs653178, rs716877, rs626277, rs476633, rs2453533, rs2467853, rs491567, rs1394125, rs4293393, rs13329952, rs164748, rs11657044, rs8068318, rs12460876, rs11666497, rs6088580, rs17216707, rs4821467, rs17367504, rs17367504, rs848309, rs4360494, rs112557609, rs3889199, rs2932538, rs2289081, rs11690961, rs74181299, rs11689667, rs1250259, rs13082711, rs3774372, rs419076, rs419076, rs871606, rs1458038, rs13107325, rs78049276, rs146853253, rs13139571, rs1566497, rs17059668, rs1173771, rs10057188, rs31864, rs1799945, rs805303, rs185819, rs11154027, rs36083386, rs449789, rs1322639, rs76206723, rs17477177, rs6557876, rs35783704, rs2071518, rs4454254, rs72765298, rs4373814, rs1813353, rs9337951, rs10826995, rs4590817, rs932764, rs11191548, rs7129220, rs381815, rs11442819, rs2289125, rs633185, rs8258, rs11222084, rs10770612, rs73099903, rs7312464, rs17249754, rs139236208, rs3184504, rs3184504, rs10850411, rs12434998, rs9323988, rs1378942, rs56249585, rs7500448, rs7226020, rs62080325, rs17608766, rs12940887, rs57927100, rs7236548, rs2116941, rs2206815, rs1327235, rs6081613, rs6015450, rs6015450, rs73161324, rs12628032, rs12037222, rs4420065, rs4129267, rs2794520, rs12239046, rs1260326, rs6734238, rs511154, rs1800789, rs2522056, rs4705952, rs6901250, rs13233571, rs9987289, rs10745954, rs1183910, rs340029, rs2847281, rs4420638, rs12027135, rs4660293, rs2479409, rs2131925, rs7515577, rs629301, rs1689800, rs2642442, rs4846914, rs514230, rs1367117, rs4299376, rs7570971, rs2972146, rs2290159, rs645040, rs442177, rs6450176, rs9686661, rs12916, rs6882076, rs3757354, rs3177928, rs2814944, rs9488822, rs605066, rs1564348, rs12670798, rs2072183, rs17145738, rs4731702, rs11776767, rs1495741, rs12678919, rs2081687, rs2293889, rs2954029, rs11136341, rs581080, rs1883025, rs9411489, rs10761731, rs2255141, rs2923084, rs10128711, rs3136441, rs174546, rs12280753, rs964184, rs7941030, rs11220462, rs7134375, rs11613352, rs7134594, rs1169288, rs4759375, rs4765127, rs2929282, rs1532085, rs11649653, rs3764261, rs16942887, rs2000999, rs2925979, rs11869286, rs7206971, rs4148008, rs4129767, rs7241918, rs12967135, rs737337, rs10401969, rs2277862, rs2902940, rs6029526, rs6065906, rs181362, rs5756931, rs161802, rs225132, rs11206510, rs17114036, rs9970807, rs56170783, rs7528419, rs646776, rs646776, rs602633, rs12122341, rs11810571, rs6689306, rs12118721, rs13376333, rs1800594, rs10911021, rs35700460, rs17465637, rs17465637, rs67180937, rs585967, rs4299376, rs13407662, rs10176176, rs7568458, rs17678683, rs6725887, rs6725887, rs114123510, rs1250229, rs13003675, rs7623687, rs142695226, rs139016349, rs9818870, rs16851055, rs12493885, rs72627509, rs10857147, rs2634074, rs12646447, rs17042171, rs2200733, rs1906599, rs6843082, rs7678555, rs4593108, rs6841581, rs2306556, rs72689147, rs7692395, rs4975709, rs9369640, rs9349379, rs12526453, rs6909752, rs3130683, rs4472337, rs12205331, rs1544935, rs56015508, rs2916260, rs556621, rs632728, rs783396, rs12202017, rs12190287, rs6922269, rs2048327, rs10455872, rs10455872, rs2315065, rs6941513, rs4721377, rs10486776, rs12669789, rs11984041, rs11984041, rs7798197, rs2107595, rs2107595, rs10230207, rs112370447, rs11556924, rs11556924, rs264, rs2083636, rs2001846, rs2954029, rs6475606, rs1537370, rs4977574, rs4977574, rs2891168, rs10757278, rs1333047, rs1333049, rs514659, rs514659, rs532436, rs1887318, rs2505083, rs1870634, rs501120, rs1746048, rs1746048, rs1004467, rs11191416, rs12413409, rs11196288, rs10840293, rs3993105, rs2019090, rs2839812, rs9326246, rs964184, rs12425791, rs2229357, rs2681472, rs3184504, rs10774625, rs653178, rs2238151, rs10744777, rs17696736, rs2244608, rs11057830, rs4304924, rs16945184, rs11617955, rs55940034, rs1924981, rs12435908, rs1005224, rs963474, rs10139550, rs72743461, rs1994016, rs1994016, rs3825807, rs7164479, rs7165042, rs7173743, rs2083460, rs247616, rs7193343, rs2106261, rs879324, rs7500448, rs4843416, rs113348108, rs2281727, rs9914266, rs4792143, rs12936587, rs9897596, rs35895680, rs4643373, rs7212798, rs8068952, rs6565653, rs1122608, rs1122608, rs8108632, rs56131196, rs28451064, rs9982601, rs9982601, rs2473248, rs4330912, rs72480273, rs61830764, rs7575873, rs1374204, rs2168443, rs11719201, rs10935733, rs900399, rs2724475, rs2131354, rs4432842, rs2946179, rs35261542, rs9379832, rs9368777, rs1187118, rs1415701, rs10872678, rs798489, rs11765649, rs6959887, rs62466330, rs13266210, rs6989280, rs12543725, rs12551019, rs3780573, rs1411424, rs4836833, rs10818797, rs2497304, rs79237883, rs740746, rs2421016, rs10830963, rs11055034, rs2306547, rs1351394, rs7964361, rs7998537, rs34217484, rs1819436, rs7402982, rs1011939, rs113086489, rs72833480, rs10402712, rs6040076, rs28530618, rs6016377, rs2229742, and rs134594 (FIG. 6).

In some embodiments, the ancestry-informative markers may be Caucasian ancestry-informative markers.

In some embodiments, the present description relates to a method for treating a subject having diabetes, the method comprising predicting the subject's disease complications and/or response to therapy as set forth herein, and beginning or modifying the anti-diabetes treatment of said subject based on said PRS (e.g., intensive antihypertensive and/or glucose lowering therapy).

In some aspects, the present description relates to a computer-implemented process of predicting a subject's disease complications and/or response to therapy, the process comprising: (a) inputting or receiving genotyping information from said subject at a plurality of risk alleles associated with the disease; (b) inputting or receiving genotyping information from said subject at a plurality of ancestry-informative markers; and (c) the PRS is inferred by comparing the genomic and ancestral profile of said subject with a matching cohort of patients with outcome data collected during a 10 year period. generating a polygenic risk score (PRS) by weighting the number of risk alleles by the effect size of their association (weighted genetic risk score or wGRS), combined with a geo-ethnic principal component (PC) determined from the subject's genotype at said ancestry-informative markers, such as generating the PRS by comparing the genomic and ancestral profile of said subject with a matching cohort of subjects with outcome data collected during a selected period of interest, wherein the PRS enables prediction of said subject's disease complications and/or response to therapy (e.g., based on data from the matching cohort). In some embodiments, the computer-implemented process may further comprise (d) communicating said PRS to a user or party of interest (e.g., said subject and/or to said subject's health care provider).

In some embodiments, the computer-implemented process described herein may be or comprise a cloud-based computer-implemented process. In some embodiments, the computer-implemented process described herein may further include one or more features of the methods described herein.

In some aspects, the present description relates to a computer-implemented system for predicting a subject's disease complications and/or response to therapy, the computer-implemented system comprising a computer configured to: (i) receive a subject's genotyping information at a plurality of risk alleles associated with the disease and at a plurality of ancestry-informative markers; and (ii) generate a polygenic risk score (PRS) by weighting the number of risk alleles by the effect size of their association (weighted genetic risk score or wGRS), combined with a geo-ethnic principal component (PC) determined from the subject's genotype at said ancestry-informative markers such as generating the PRS by comparing the genomic and ancestral profile of said subject with a matching cohort of subjects with outcome data collected during a selected period of interest, wherein the PRS enables prediction of said subject's disease complications and/or response to therapy (e.g., based on data from the matching cohort). In some embodiments, the computer-implemented system may further comprise (iii) communicating the PRS to a user or party of interest (e.g., the subject and/or to the subject's health care provider).

In some embodiments, the computer-implemented system described herein may be or comprise a cloud-based computer-implemented system.

In some embodiments, the computer-implemented system described herein may be configured to implement a method or process as described herein.

In some aspects, the present description relates to a non-transitory computer-readable medium storing processor-executable instructions, the instructions when executed by a processor cause the processor to perform the method of (i) receiving a subject's genotyping information at a plurality of risk alleles associated with the disease and at a plurality of ancestry-informative markers; and (ii) generating a polygenic risk score (PRS) by weighting the number of risk alleles by the effect size of their association (weighted genetic risk score or wGRS), combined with a geo-ethnic principal component (PC) determined from the subject's genotype at said ancestry-informative markers. In some embodiments, the processor-executable instructions, when executed by a processor, further comprise (iii) outputting the PRS to a user or party of interest (e.g., the subject and/or to the subject's health care provider).

In some embodiments, the processor-executable instructions, when executed by a processor, may cause the processor to perform a method, computer-implemented process, or computer-implemented system as described herein.

In some aspects, the present description relates a method for treating a subject having diabetes, the method comprising predicting the subject's disease complications and/or response to therapy using a PRS generated by a computer-implemented process, a computer-implemented system, or by executing instructions stored on the non-transitory computer-readable medium, as described herein.

EXAMPLES

Example 1: Methods 1.1 ADVANCE Cohort and Subset of Genotyped Patients

ADVANCE was a factorial randomized controlled clinical trial of blood pressure (BP) lowering and intensive glucose control in patients with T2D. A total of 11,140 participants were recruited from 215 centers in 20 countries. They were 55 years of age or older and had T2D diagnosed after the age of 30 years. In brief, ADVANCE was a 2×2 factorial randomized controlled trial of blood pressure lowering (perindopril-indapamide vs placebo) and glucose control (glicazide MR-based intensive intervention vs standard care). The trial was successful in decreasing total mortality by attenuation of combined microvascular and macrovascular outcomes with blood pressure control[16] and combination of blood glucose and blood pressure control[22].

In the present study, a genotyped subset of 4098 T2D patients of Caucasian origin from the ADVANCE cohort was analysed. The baseline phenotypes (see FIG. 1) used for this study consists of age, gender, BMI, age at diagnosis of T2D, diabetes duration, HbA1c, systolic blood pressure (SBP), diastolic (DBP), history of currently treated hypertension and renal function as determined by eGFR and UACR. ADVANCE-ON was a 4.5-year post-trial observational extension of ADVANCE conducted in 80% of subjects, which demonstrated that benefits of intensive blood pressure control in reduction of mortality persisted in ADVANCE-ON[20]. The long-term benefit of intensive glycemic control persisted only in reduction of end-stage kidney disease during ADVANCE-ON similarly to what has been reported in the long-term observation of DCCT/EDIC trial on intensive therapy of type 1 diabetes[23,24]. Details of statistical analysis, genotyping and imputation as well as a stepwise approach for selection of SNPs associated to risk factors of complications of T2D are described in Examples 1.3-1.5.

Figure 3:
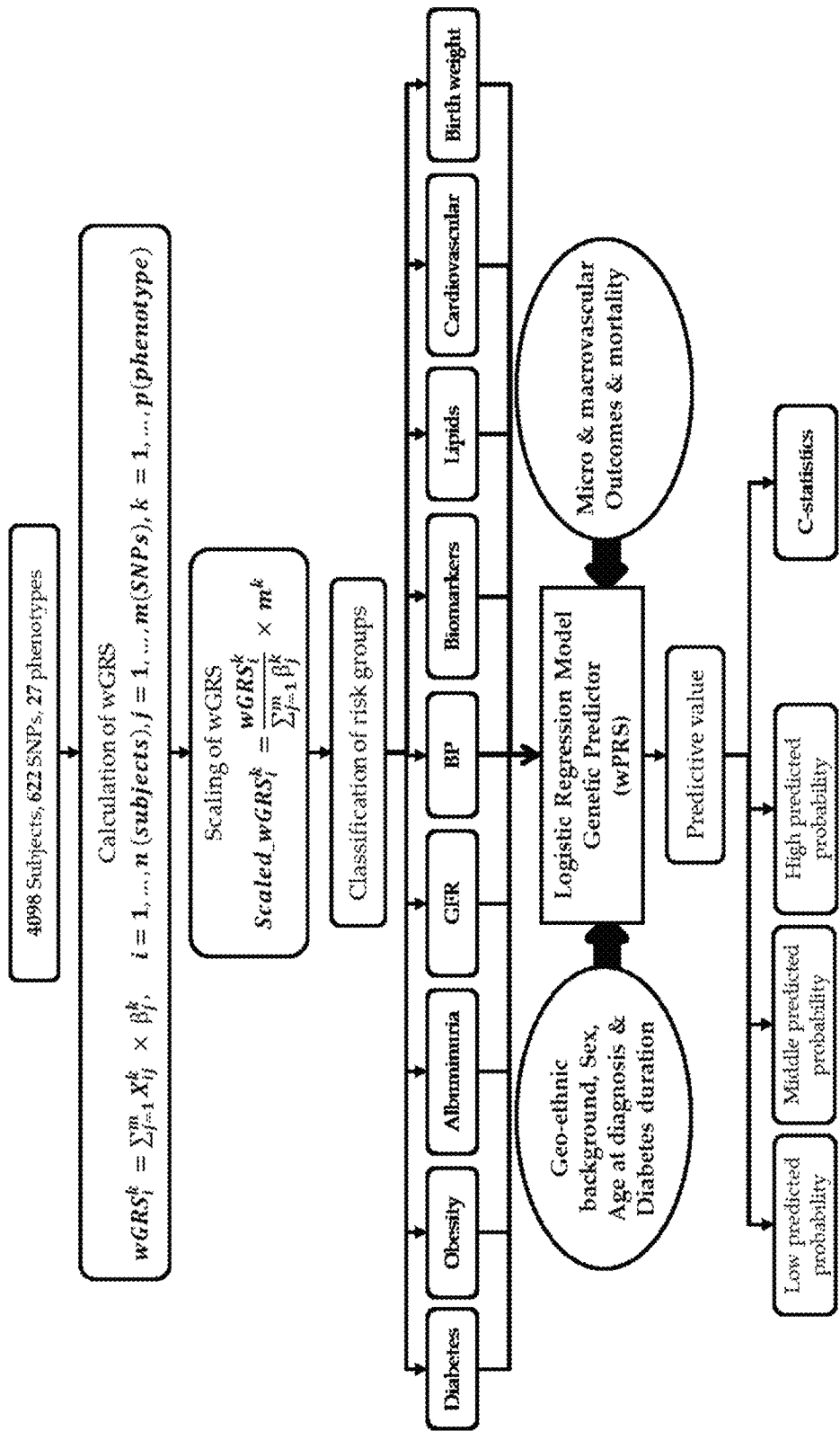
FIG. 3: Polygenic risk score construction from published data & testing on ADVANCE genotyped patients. The PRS creation was based on 27 risk predictors grouped in 9 risk groups and weighted PRS testing was performed on ADVANCE 4098 genotyped subjects using additive model.
Figure 4:
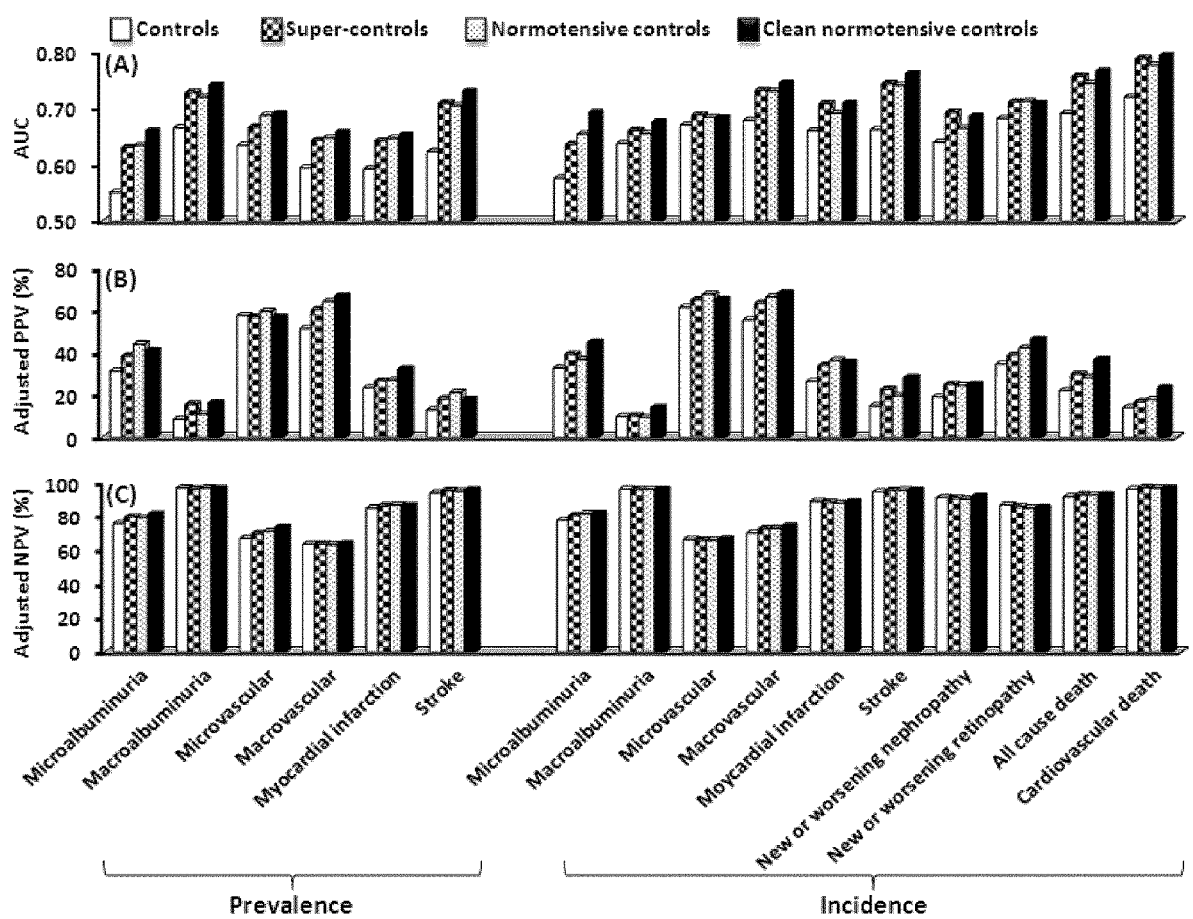
FIG. 4: Optimization of the predictive metrics of the PRS and effect of different controls groups on its performance on prevalent and incident cases of microvascular and macrovascular diseases and death. The logistic regression model used for this analysis included age of onset, diabetes duration, sex and PRS (PRS4). "Controls" group is composed of subjects who do not have a specific phenotype at baseline or during the study but may have others; "Super-controls" group is composed of subjects who had none of the complications at entry or during the whole ADVANCE trial; "Normotensive controls" group is composed of Controls with exclusion of hypertensive subjects at baseline and "Clean normotensive controls" group is normotensive cleaned controls composed of subjects without hypertension at baseline and who had none of the complications at entry of ADVANCE study. Abbreviations: AUC: area under the curve, PPV: positive predictive value, NPV: negative predictive value.

Similarly, the creation of polygenic risk score (PRS), incorporating geoethnicity/individualized genetic background (IGB), is detailed in Examples 1.5 and 1.6, as well as in FIGS. 2 and 3. Finally, in order to optimize the predictive power of our PRS, we evaluated the impact of various control groups, since all subjects were diabetics, recruited for high risk of cardiovascular outcomes, independently of their initial blood pressure, including many with past events. So, as described in Example 1.7, we tested as "controls" subjects without the phenotype in question at baseline or during the study, with and without hypertension, and with or without any phenotype at baseline or throughout the ADVANCE trial (FIG. 4).

1.2 Clinical Prediction Using Framingham and UKPDS Risk Predictors

We did not calculate the ADVANCE clinical risk score[5] in our set of genotyped patients as the original ADVANCE prediction model was developed on the same source population. In a similar way, we did not select the SNPs of our PRS from ADVANCE GWAS data on which it was to be tested. As comparative clinical risk predictors, we used the popular Framingham and UKPDS predictive tools. The FRS includes age, sex, total cholesterol, HDL cholesterol, smoking status, diabetes, SBP, and blood pressure treatment as clinical risk factors[25], while the UKPDS prediction model (UKPDS 56) includes age, sex, diabetes duration, total cholesterol, HDL cholesterol, SBP, smoking status and HbA1c[6]. We calculated the risk scores of our 4098 ADVANCE patients. These formulated risk scores were then used in our models to predict micro- and macrovascular complications and mortality. The PRS was calibrated overall and separately for both sexes and geo-ethnic background.

1.3 Statistical Analyses

Descriptive summary statistics were computed, using frequencies (%) for categorical variables and mean (±SD) for continuous variables. A binomial test was used to compare the two proportions of categorical variables. AUCs with 95% confidence interval were calculated by fitting the multivariable logistic regression over the PRS, including genetically determined ethnicity (PC1). FRS and UKPDS engine were computed on ADVANCE trial subjects as was done in other studies[18]. We divided the study participants into thirds representing equal number of individuals carrying low, medium or high PRS values, thirds of age strata, thirds of age of onset of diabetes and thirds of diabetes duration, and analyzed the predictive performance of these strata on total and cardiovascular death, micro- and macrovascular events, myocardial infarction and stroke events. A proportion trend test[26] was used to calculate the trend p-values of the stratified data. We used the pROC package in R for the analysis of ROC curves[27]. The areas under the receiver operating characteristics (ROC) curves (AUCs; 95% confidence intervals), calculated from the predicted risks derived from the regression models, were used to assess the predictive performance of the PRS and the two clinical risk scores. The DeLong method was used to calculate the p-value for the comparison of two ROC curves[28]. PRS thirds and treatment effects were examined through cumulative hazards curves with the use of Cox proportional hazard models. The log-rank test was used to compare the cumulative hazards and the plots are shown over the period of 9.5 years (ADVANCE-ON) to examine post-trial effects of the intensive blood pressure-lowering and the intensive glucose therapies on cardiovascular death, all cause death and end-stage renal disease in the three genetic risk groups.

1.4 Genotyping and Imputation

Genotyping was performed using the Affymetrix Genome-Wide Human SNP Arrays 5.0 or 6.0 or the Affymetrix UK BioBank Axiom arrays (Affymetrix, Santa Clara, California, USA) following standard protocols recommended by the manufacturer. A quality control filtering step was applied to the genotype calls as described in our previous work[19]. Additional quality control steps included coarse-grain stratification to ensure a Caucasian population ratio more than 0.8 (STRUCTURE software[29]), a genetic relatedness check to ensure independent samples (PLINK) and a sex check to ensure genetic accuracy and database integrity[30].

Quality control was also performed on the final genotypes to remove any SNPs with more than 4% of missing values across the entire cohort and any samples with more than 2% of missing SNP genotypes. A more stringent threshold was used for any SNPs with between 1 and 5% minor allele frequencies (MAF). Low MAF SNPs with more than 1% of missing values were removed prior to the imputation. 4098 samples passed these quality filters. Three sets of imputation were performed separately for the individuals genotyped either on Affymetrix arrays 5.0, 6.0 or UK Biobank using SHAPEIT[31], IMPUTE2 software[32] and the 1000 Genomes project[33,34] phase 3 data set as reference. Only SNPs with an imputation quality score greater than or equal to 0.80 were kept as it has been proposed in other studies[35]. A subset of 34,570 independent SNPs common to all three microchips was selected to perform a principal component (PC)[19] analysis for the ADVANCE study participants of Caucasian origin using the EIGENSOFT 3.0 package[36]. The first principal component (PC1) separated the 4098 individuals along a geographical gradient from East (Balto-Slavic) to West (Germano-Celtic) Europe as described previously[19]. Individual PC1 value was added to the 622 SNPs described below to create the PRS.

1.5 Stepwise Approach for Selection of SNPs Associated to Risk Factors of Complications of T2D We selected 27 risk factors of vascular complications of T2D that we divided into 9 risk groups as initially suggested by Ibrahim-Verbaas[18] and modified as described in the table shown in FIG. 5. The 9 risk groups include SNPs associated to diabetes, obesity, blood pressure, albuminuria, glomerular filtration rate (GFR), biomarker levels, lipids, cardiovascular and birth weight. We identified most of the GWAS (as per Oct. 10, 2017) that were reported in the NGHRI GWAS Catalog and using HuGE navigator we extracted all SNPs together with their p values and effect size (β) for the 27 risk factors listed in FIG. 5. We also performed manual literature curation and included additional SNPs by relaxing p-values threshold of associations if they had evidence of independent replication and/or were reported in meta-analyses published by major GWAS Consortia for blood pressure, renal function, stroke and lipids. We then defined LD blocks and identified tag SNPs (SNPs that are in LD with the lead SNP contained in the block at $R^2 \geq 0.8$) using the HapMap CEU samples from 1000 Genomes phase 3. We matched the tag SNPs with SNPs in our genotype database. When a tag SNPs could not be found in ADVANCE, the LD threshold was relaxed to $R^2 \geq 0.7$ and closest LD proxy was selected. If no tag SNP could be found, the LD block was removed from analysis. When several SNPs within a class of risk factors were located in the same loci, we selected the top SNP with the lowest P value. In some cases, a SNP was associated with more than one trait and it was thus included in more than one risk groups. We identified a total of 622 SNPs (594 unique SNPs) (FIGS. 5 and 6). Among other things, their rs number, genomic position, risk group to which they belong and the published reference which describe them are included in Supplementary table 3. Our stepwise strategy for selection of SNPs to be included in the PRS is illustrated in FIGS. 2 and 3.

1.6 Creation of the PRS

To create a PRS we constructed, at first, a weighted genetic risk score (wGRS) for each of the 27 aforementioned risk predictors over all study participants to evaluate the effect of the 622 SNPs (FIG. 5). We used the additive model, assuming that each SNP is independently associated with risk, to construct wGRS (different SNPs contribute with different weights to the GRS value) according to the effect size (β) attributed to the tested SNPs in the original association study (FIG. 5).

We calculated wGRS for these predictors, as previously described, by summing the product of the number of risk alleles for each patient by the effect size of those SNPs i.e., $$wGRS_i^k = \sum\nolimits_{j=1}^m X_{ij}^k \times \beta_j^k,$$

where $X_{ij}^k$ is the allele frequency of $i^{th}$ subject in $j^{th}$ SNP for $k^{th}$ phenotype and β is the effect size of the phenotype. The number of loci is not the same for the 27 predictors as well as the unit used, so the wGRS had to be scaled by the sum of its effect coefficients and multiplied by the number of loci of that specific trait. With this scaling, each risk predictor will have an equivalent weight at an equivalent number of loci (FIG. 5). Using wGRS of these 27 predictors, we then formed 9 risk groups that were added to the PC1 value to constitute the PRS. The predictive performance of the PRS was computed alone and with the inclusion of sex (PRS1), sex and age of onset of diabetes (PRS2), sex and diabetes duration (PRS3), or sex and both ages (PRS4) in the model.

1.7 Optimization of the Predictive Value of the PRS

It is known that the performance of a risk prediction tool depends not only on the definition of cases but also of the control group[16]. Since high risk patients were recruited in the ADVANCE study and many of them had multiple risk factors at study entry, we used different sets of controls to estimate the maximal predictive power ($AUC_{max}$) of PRS4: 1) A control group defined as patients who did not have a specific phenotype neither at baseline nor during the study, but may have other manifestations; 2) A super-control group composed of subjects who had none of the complications at entry or during the whole ADVANCE trial, 3) A normotensive control group (controls no HT) as in 1) with exclusion of hypertensive subjects at baseline; and finally 4) A normotensive cleaned control group who are controls without hypertension and who had none of the complications at baseline. As shown in FIG. 4, the performance of PRS4 as a classifier or predictor of prevalent or incident complications during the median 4.5-year trial period of ADVANCE, was higher with either super-controls, normotensive controls, or normotensive clean controls when compared to the control group. However, since the number of normotensive clean controls or super-controls compared to cases was too small we reported data using either controls or normotensive controls unless indicated otherwise.

Example 2: Results

We analysed the data of 4098 Caucasian subjects from the total set of 11,140 subjects of the ADVANCE study. Their clinical characteristics at baseline are shown in FIG. 1 along with those of the entire set. A sizable difference in the sex ratio was caused by a higher proportion of males in the most numerous geo-ethnic group, patients of Celtic origin[19]. During the median 4.5-years of the study, the genotyped patients had 334 microvascular and 559 macrovascular events (FIG. 1). During the same period, 192 myocardial infarcts, 154 strokes and 225 heart failures also occurred in these patients. Eight hundred fifty-one patients developed micro-albuminuria and 150 had macro-albuminuria, 198 had new or worsening nephropathy, 62 doubled their serum creatinine and 151 had new or worsening retinopathy. A total of 549 genotyped patients died (including 283 cardiovascular deaths) during the follow-up time of ADVANCE (FIG. 1).

2.1 Predictive Performance of PRS Compared to UKPDS and FRS Scores

The AUCs of FIG. 7 represent the discrimination between cases, defined as having a phenotype, from controls that did not have a specific phenotype either at baseline or during the study, but could have other manifestations, using the PRS models, and the Framingham and UKPDS scores. The AUCs of the PRS alone were modest but significant for all T2D outcomes listed in FIG. 7, ranging from 0.536 (95% CI, 0.510-0.563) for all-cause death to 0.612 (95% CI, 0.567-0.657) for new or worsening retinopathy. This shows that a significant prediction can be achieved with a PRS based on a high number of genomic variants associated to risk factors and IGB. The discriminations with the PRS alone were higher than the AUCs obtained with the UKPDS score for major microvascular events (micro- and macroalbuminuria, new or worsening nephropathy and retinopathy, doubling of serum creatinine). The predictive performance of the PRS improved with the inclusion of sex (PRS1), sex and age of onset of diabetes (PRS2), sex and diabetes duration (PRS3), or sex, age of onset, and diabetes duration (PRS4). The AUC for prediction of cardiovascular death with PRS4 was 0.720 (95% CI, 0.688-0.752) compared to 0.650 (95% CI, 0.617-0.683) for Framingham risk score and 0.597 (95% CI, 0.563-0.631) for UKPDS in the same population. Thus, PRS4 exhibited the best prediction of the risk of outcomes and mortality in T2D patients of Caucasian origin outperforming the two popular Framingham and UKPDS risk scores and without requiring the presence of any clinical manifestations or initial outcomes. The PRS4 was well calibrated for cardiovascular death in the whole population ($p=0.67$: Hosmer-Lameshow test for predicted vs. observed) with better fit for males ($p=0.66$) than females ($p=0.48$) and for Slavic ($p=0.77$) than Celtic ($p=0.44$) individuals The calibration for total death was $p=0.59$ for whole population with better fit for females ($p=0.83$) than males ($p=0.23$) and as good for Celtic ($p=0.81$) and Slavic ($p=0.83$) (FIG. 15).

In general, an AUC of 0.7 or greater is considered acceptable for prediction and AUCs of PRS4 exceeded 0.70 for all incident and prevalent cases when a normotensive control group was used, underlying the importance of hypertension and its AUCs reached 0.79 for cardiovascular death with a group of super-controls or normotensive clean controls (FIG. 4). The adjusted negative predictive values (NPV) of PRS4 were uniformly over 80% for most prevalent and incident cases and the adjusted positive predictive value (PPV) exceeded 0.60 for micro- and macrovascular prevalent and incident cases (FIG. 4).

2.2 Impact of PRS, Age, Age of Onset and Diabetes Duration on Risk Prediction

Figure 8:
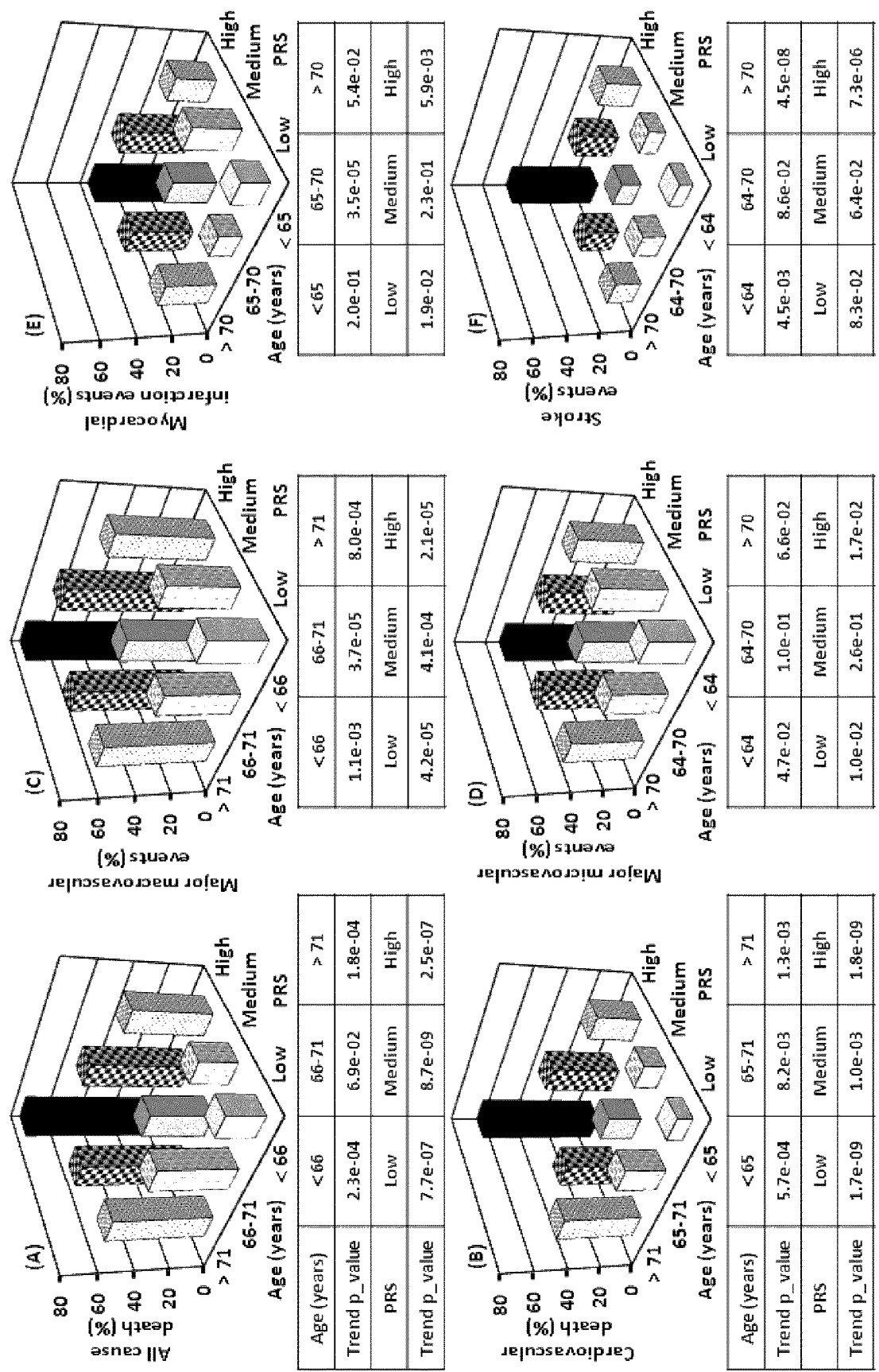
FIG. 8: Frequencies of myocardial infarction, stroke, major micro- & macrovascular events and cardiovascular & all cause death by PRS and age strata. Frequencies during the 4.5-year follow up of ADVANCE of all cause death (A), cardiovascular death (B), major macrovascular events (C), major microvascular events (D), myocardial infarction (E) and stroke (F) by age and PRS thirds. The model used here includes the PRS only (see FIG. 7). The control group is composed of normotensive patients that did not have a specific outcome at any time during the study (normotensive controls). The trend testing was done within formal regression analysis using parametric method separately for different age categories and PRS strata. Major microvascular events is a composite of ESRD and defined as requirement for renal replacement therapy, death induced by renal disease, requirement of retinal photocoagulation, or diabetes-related blindness in either eye. Major macrovascular events is a composite of nonfatal myocardial infarction, nonfatal stroke, or cardiovascular death.

The significance of the age factor was higher than the predicted probability of the PRS for total death ($p=2.1\times 10^{-27}$ and $8.6\times 10^{-14}$, age and PRS respectively), cardiovascular death ($p=6.0\times 10^{-22}$ and $4.8\times 10^{-15}$) and macrovascular events ($p=2.7\times 10^{-16}$ and $3.1\times 10^{-14}$), occurring during the 4.5-year period of ADVANCE. When individuals were divided into equal thirds of PRS values and of age strata, the frequency of macrovascular events, total and cardiovascular deaths increased across all age and PRS strata (trend p values of PRS were significant at all age strata and those of age were significant at all PRS thirds) (FIG. 8). The highest risk was seen in older patients of the high PRS third. On the other hand, age and PRS had comparable capacity of prediction ($p=10^{-5}$ for both) of microvascular events, while the prediction of myocardial infarction ($p=3.8\times 10^{-6}$ and $2.8\times 10^{-5}$, PRS and age respectively) and stroke ($p=7.9\times 10^{-14}$ and $7.4\times 10^{-7}$) was more significant with the PRS than with age and the prediction with age was the highest in patients with high PRS. No interactions were noted between age and PRS on the prediction of micro and macrovascular events, myocardial infarction and stroke (all p interactions >0.4).

Figure 9:
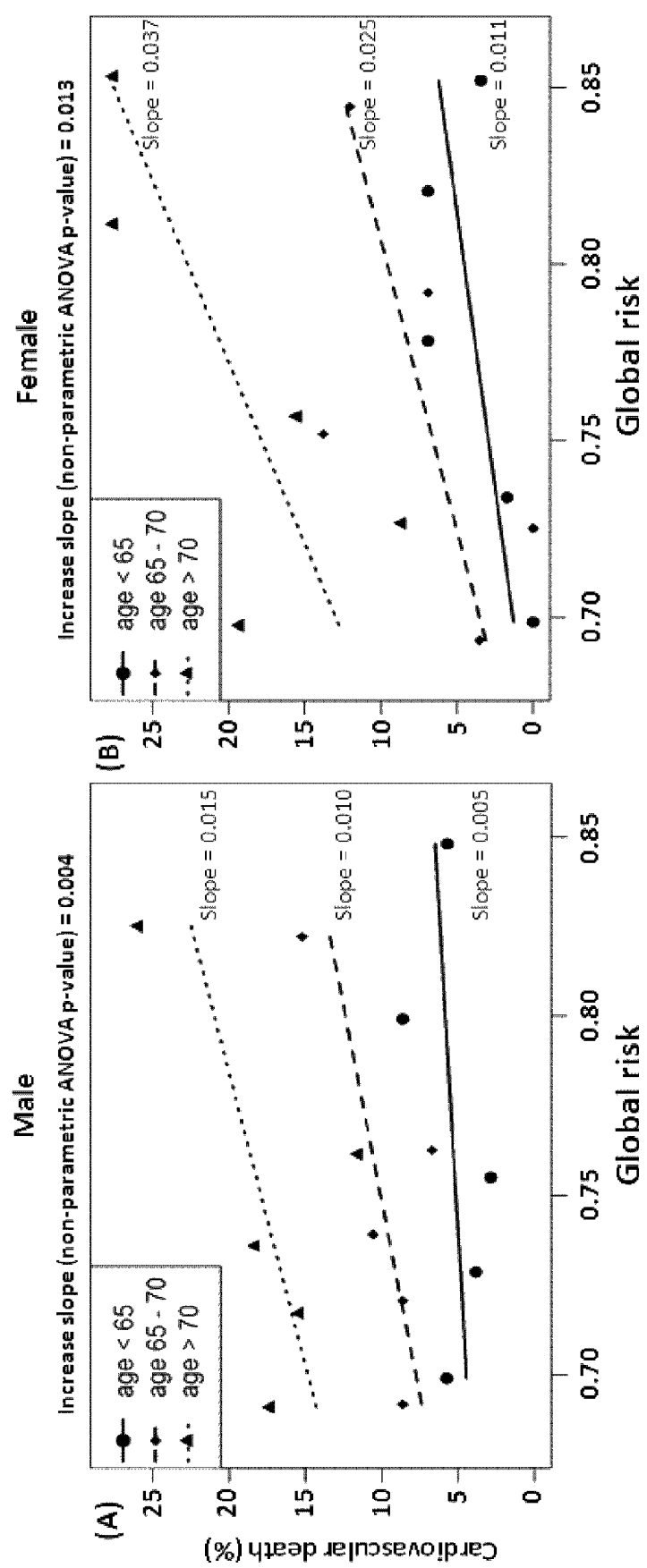
FIG. 9: Frequencies of cardiovascular death separated by sex during the 4.5-year follow-up of ADVANCE by age thirds and global PRS quintiles. The model used here includes PRS only (see FIG. 7). The global risk includes major macrovascular events (a composite of nonfatal myocardial infarction, nonfatal stroke or cardiovascular death), total renal events (including doubling of serum creatinine, macroalbuminuria event, new microalbuminuria and ESRD) and all-cause mortality. The controls used here are composed of subjects who had none of the complications at entry or during the whole ADVANCE trial (Super Controls). The non-parametric ANOVA was used to compare the slopes.

We then calculated a PRS for global risk as defined in ADVANCE[37], and divided individuals into quintiles of their PRS values to assess the difference in cardiovascular death between lower and higher PRS quintiles, in men and women respectively. FIG. 9 shows that cardiovascular death increased across all PRS quintiles and age strata. The slopes of cardiovascular death as a function of PRS quintiles increased from 0.005 and 0.011 in men and women younger than 65 years to 0.010 and 0.025 in middle aged men and women (65 to 70 years old) and to 0.015 and 0.037 in men and women older than 70 years (ANOVA of increasing slopes $p=0.004$ for men and $p=0.013$ for women) suggesting an interaction between age, PRS values of global risk and cardiovascular death.

Figure 10:
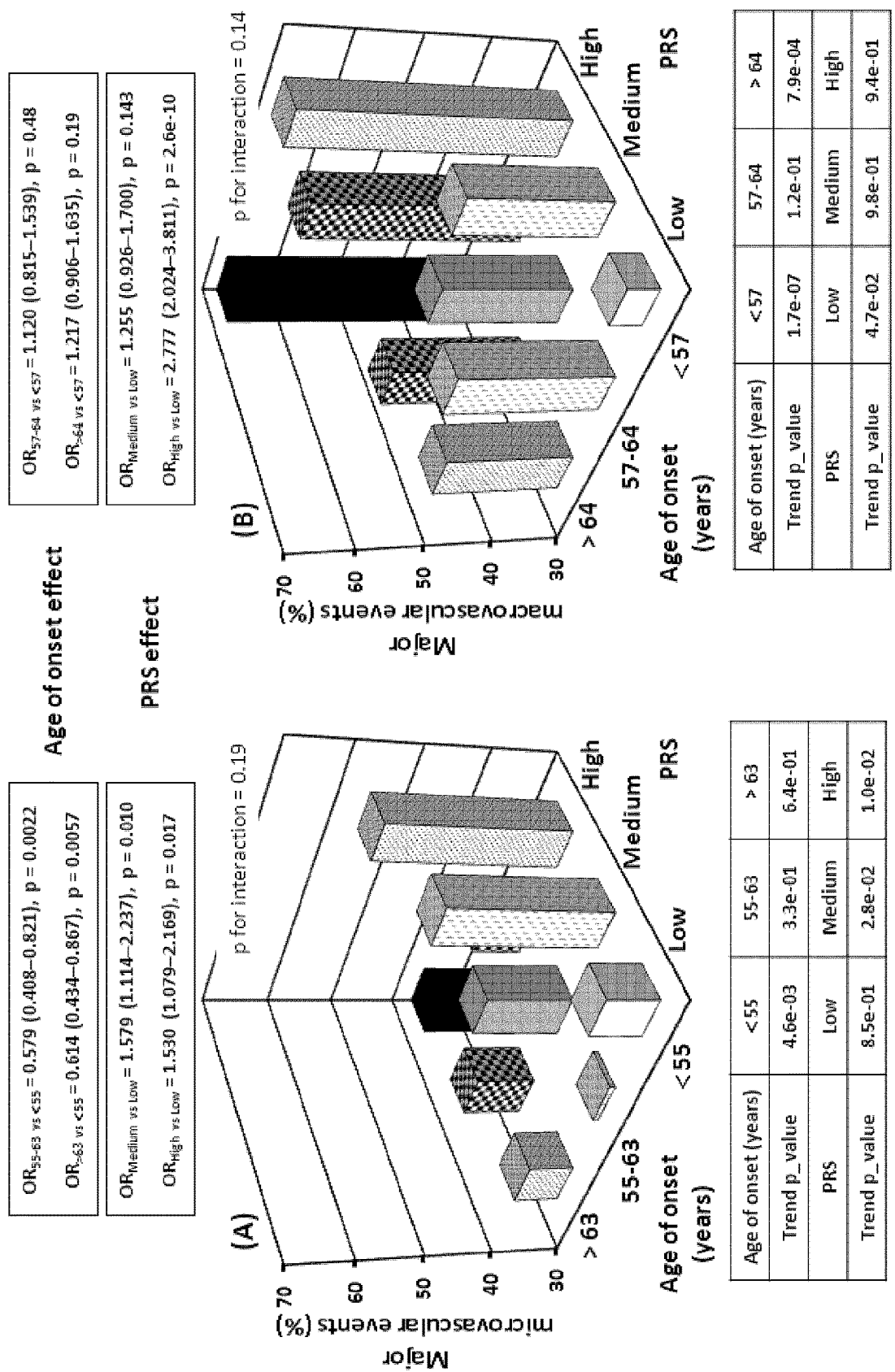
FIG. 10: Major microvascular and macrovascular events frequency by PRS and age of onset strata. Frequencies during the 4.5-year follow-up of ADVANCE of major microvascular (A) and major macrovascular (B) events by age of onset of T2D and PRS thirds. The model used here includes PRS only (see FIG. 7). P-value of interaction was calculated between PRS and age of onset of T2D. The controls used are normotensive subjects with no complication phenotype at baseline (normotensive controls). The trend testing was done within formal regression analysis using parametric method. Major microvascular and major macrovascular events are defined as in FIG. 7.

Zoungas et al[38] reported that the best predictors of microvascular events were age of onset and diabetes duration in ADVANCE. We therefore analyzed micro- and macrovascular events as function of their PRS values and age of onset of T2D. FIG. 10 shows that the PRS was a better predictor ($p=5.6\times 10^{-4}$ and $2.1\times 10^{-13}$) than age of onset ($p=1.5\times 10^{-2}$ and $2.0\times 10^{-2}$) of major microvascular and major macrovascular events, respectively. No significant interactions were noted between PRS and age of onset ($p=0.19$ for microvascular and 0.15 for macrovascular events). The predicted risk of microvascular events was significantly lower in the low PRS third ($p=0.010$ and $p=0.017$ comparing low third to middle and late age of onset thirds). The risk of microvascular events was lower in individuals with later onset of diabetes across all PRS groups, contrasting with macrovascular events for which the highest risk was seen in the highest PRS group independently of the age of onset of diabetes. It is noteworthy that the stratification capacity of the PRS was best in patients with earlier onset of diabetes for both micro- and macrovascular events as shown by the p trend values in FIG. 10.

Figure 11:
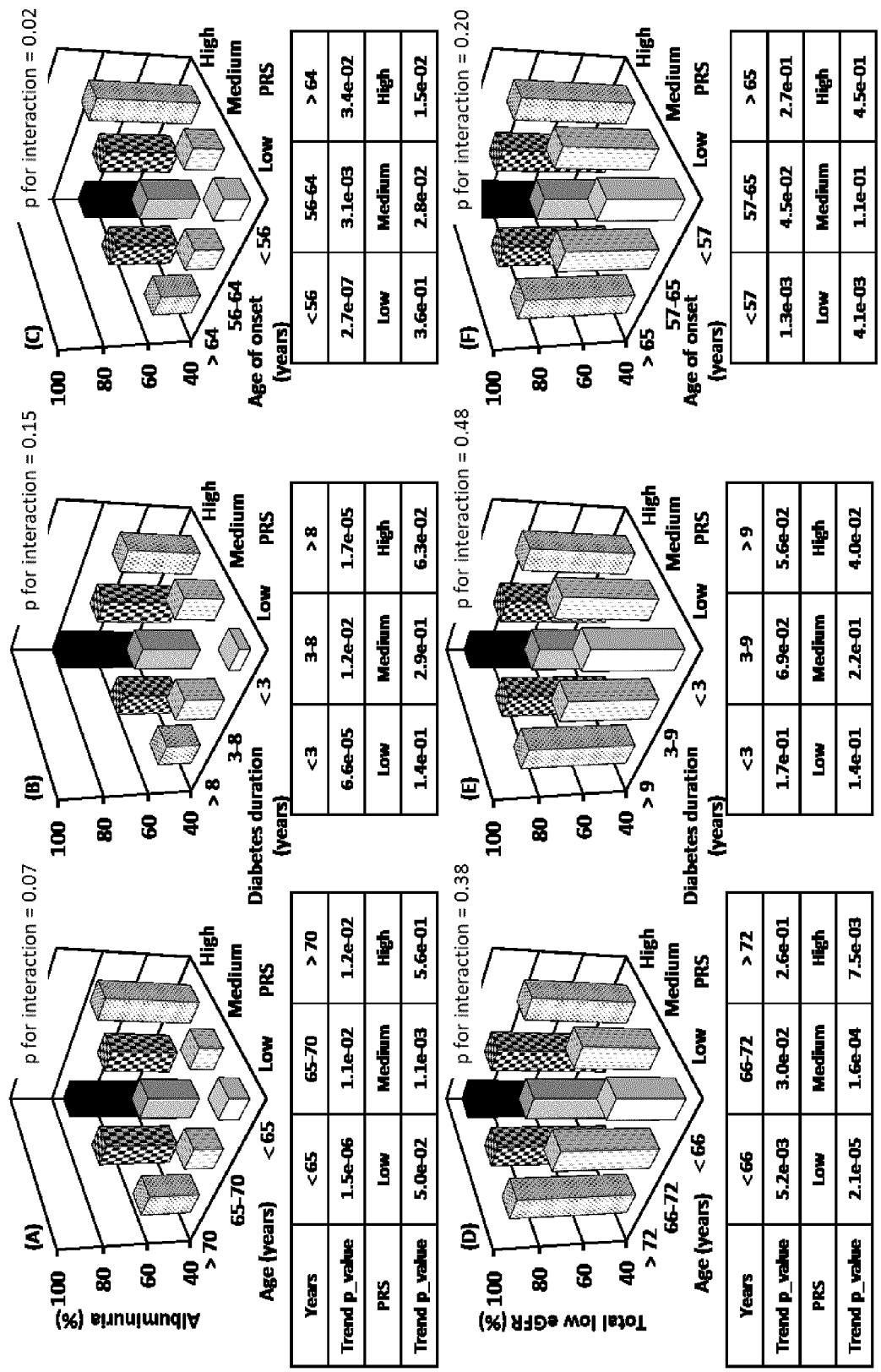
FIG. 11: Frequency of albuminuria and low eGFR events by PRS, age, age of onset of T2D and its duration strata. Frequencies during the 4.5-year follow-up of ADVANCE of albuminuria events (A-C) and total low eGFR (D-F) by age, diabetes duration, age of onset of T2D and PRS thirds. The model used here includes PRS only. The model used includes PRS only. The control group is composed of normotensive subjects that did not have albuminuria or low eGFR events at any time during the study The trend testing was done within formal regression analysis using parametric method separately for different age categories and PRS strata. P-value of interaction was calculated between PRS and age, between PRS and diabetes duration, and between PRS and age of onset of T2D. Albuminuria event is defined as urinary albumin creatinine ratio ≥30 mg/g by the end of the study. Total low eGFR is defined as estimated glomerular filtration rate <60 ml/min/1.73 m$^2$ based on CKD-EPI formula at baseline or by the end of the study.
Figure 12:
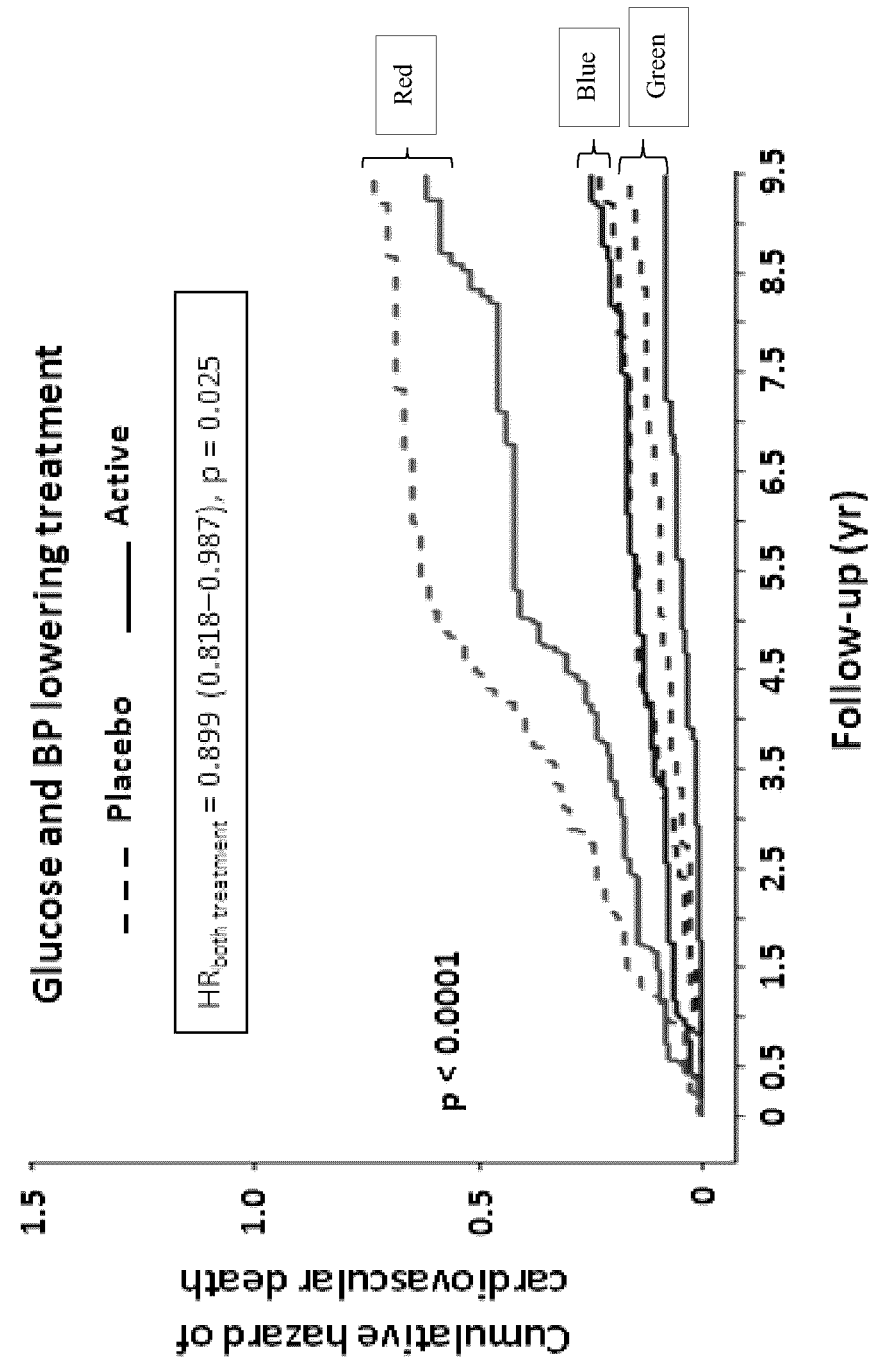
FIG. 12: Cumulative hazard of cardiovascular death stratified by both glucose and BP lowering treatment and risk. Adjusted cumulative hazard curves for 9.5-year cardiovascular death by combined intensive blood pressure and glucose lowering treatment arms in the high (red), medium (blue) and low PRS 4 (green) thirds. Hazard ratio are estimated by Cox proportional hazards regression analysis. The PRS 4 used here includes PRS, sex, age of diagnosis, and diabetes duration. The controls used are normotensive subjects. The difference between high, medium and low risk categories was highly significant (p<0.0001). The effect of BP and glucose lowering treatments was significant for individuals included in the high risk group (p=0.005 at year 4.5 end of ADVANCE trial, and p=0.025 at year 9.5 end of ADVANCE-ON follow-up). Abbreviation: HR: hazard ratio.

As shown previously in ADVANCE[38], renal events are more dependent on age of onset of diabetes than age itself. We investigated further the contribution of the PRS, age, diabetes duration and age of onset of diabetes on the prediction of renal events (albuminuria and low eGFR) shown to be themselves independent predictors of cardiovascular and renal outcomes in T2D[17]. The PRS was a more powerful predictor of development of albuminuria than age (PRS $p=4.2\times 10^{-15}$ and age $p=4.2\times 10^{-5}$) or diabetes duration (PRS $p=6.0\times 10^{-14}$ and diabetes duration $p=1.2\times 10^{-2}$). The prediction with the PRS was also more significant ($p=4.2\times 10^{-14}$) than age of onset ($p=0.25$). While no significant interactions were observed between diabetes duration and PRS (p=0.15) or age and PRS (p=0.07), a significant interaction was observed between the PRS and age of onset and the risk of albuminuria (p=0.02), such that the prediction capacity of the PRS was highest in patients with early onset of diabetes (younger than 56 years old). The risk stratification of developing albuminuria with the PRS was the most significant in younger patients (p trend=$1.5 \times 10^{-6}$) or in patients who had longer diabetes duration (p trend=$1.7 \times 10^{-5}$) or early onset of diabetes (p trend=$2.7 \times 10^{-7}$) (FIG. 11A-C).

Age was a more important predictor of low eGFR than the PRS (age p value=$3.4 \times 10^{-32}$ and PRS p value=$2.6 \times 10^{-13}$) but the PRS had a higher predictive value (p=$1.8 \times 10^{-9}$) than diabetes duration (p=$3.2 \times 10^{-5}$) and a higher predictive value (p=$3.4 \times 10^{-12}$) than age of onset of diabetes (p=$1.1 \times 10^{-9}$). No interaction was noted between PRS and the three strata of age, diabetes duration and age of onset (all p interaction values >0.2). These results suggest that age is a dominant predictor of low eGFR while for albuminuria the PRS is the major predictor particularly in young subjects or at the onset of diabetes (FIG. 11D-F). This is an important characteristic of the prediction with the PRS highlighting its clinical utility for targeting individuals at high risk earlier than with other types of risk engine[18].

2.3 Clinical Utility of the PRS

To further evaluate the clinical utility of the PRS, we compared the differences in reduction of cardiovascular death by the two ADVANCE treatment arms; intensification of blood pressure and blood glucose control (see Example 1: Methods) between patients stratified by the two clinical scores of UKPDS and Framingham or the PRS4. While the UKPDS score failed to identify patients who benefited the most from the ADVANCE treatment combination, we observed a significant reduction of cardiovascular death by the ADVANCE treatment combination in individuals with high Framingham score (FRS) (p=0.013) compared to no significant effect in individuals with low FRS (FIG. 13A individuals with low risk scores and 3B individuals with high risk scores). Patients with high PRS4 values benefited even more from the ADVANCE treatment (p=0.0062) and the number needed to treat (NNT) to save one life from cardiovascular death during the 4.5-year duration of ADVANCE was 12 in the high PRS risk category (FIG. 13B). These results indicate that stratification by PRS values was the most effective to identify patients that benefited the most from ADVANCE combination therapy.

Figure 14:
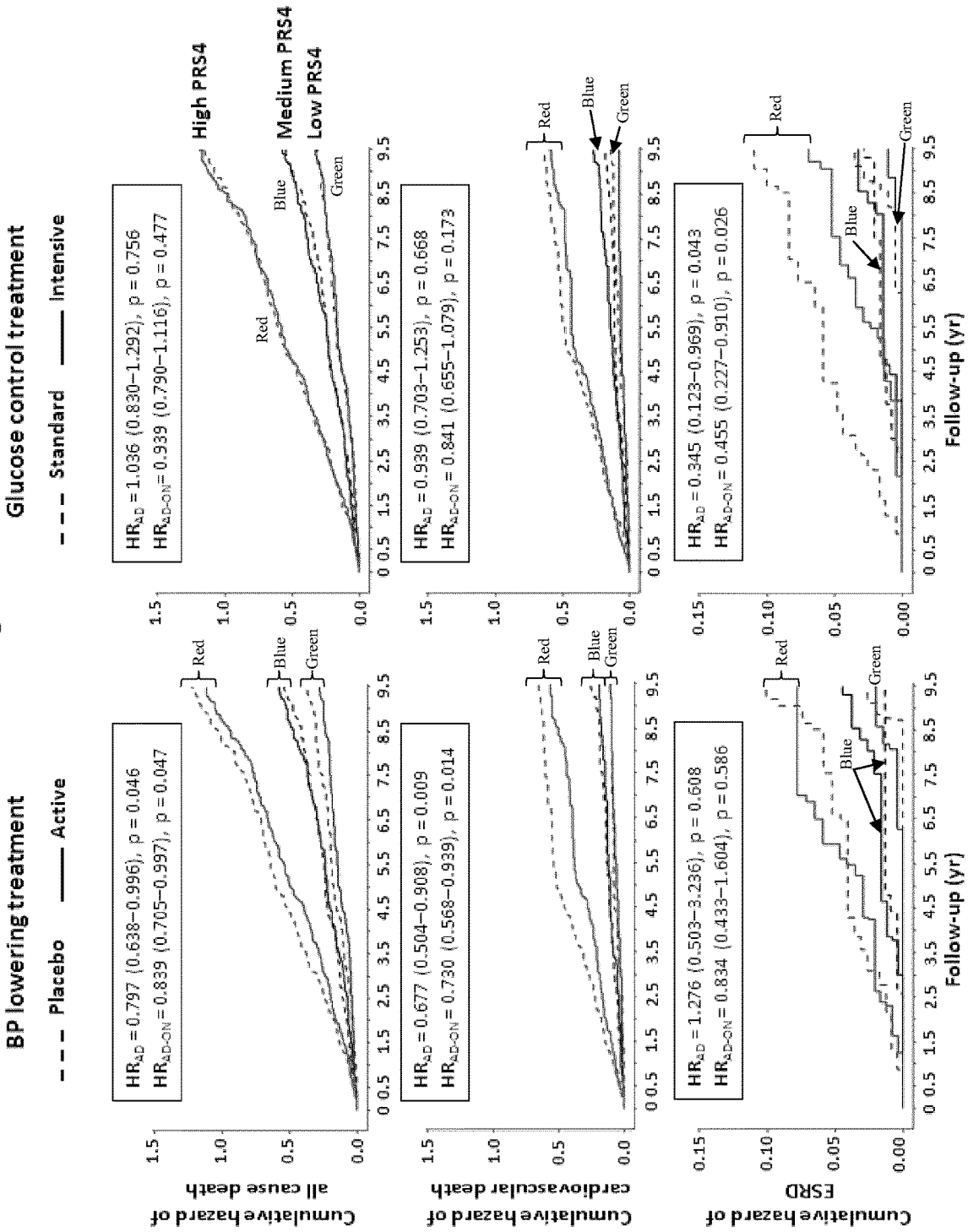
FIG. 14: Cumulative hazard plots of all cause death, cardiovascular death and end-stage renal disease stratified by PRS thirds in standard and intensive blood pressure and glucose treatment arms. Adjusted cumulative hazard curves for all cause death, cardiovascular death, and end-stage renal disease by standard and intensive blood pressure or glucose treatment arms in the high, medium and low PRS4 thirds. Hazard ratio was analyzed by Cox proportional hazards regression analysis. Red: high risk, blue: medium risk, Green: low risk categories. The model used includes PRS, sex, age of diagnosis and diabetes duration (see PRS4 in FIG. 7). The control group includes normotensive subjects with no complications at baseline (normotensive controls). The effect of BP lowering treatment was significant only for individuals included in the high risk third for all cause (p=0.046 at the end of ADVANCE trial and p=0.047 at the end of ADVANCE-ON) and cardiovascular death (p=0.009 at the end of ADVANCE trial and p=0.014 at the end of ADVANCE-ON). The effect of glucose treatment was observed only in individuals in the high risk third for end-stage renal disease (p=0.043 at the end of ADVANCE trial and p=0.026 at the end of ADVANCE-ON). Abbreviation: HR: Hazard ratio, AD: ADVANCE trial, AD-ON: ADVANCE-ON follow-up.

The cumulative hazard plots (FIG. 14) for all cause death, cardiovascular death and end-stage renal disease (ESRD) in ADVANCE (4.5 years for the trial) and ADVANCE-ON (for a total of 9.5 years) are concordant with previous clinical reports[16,20]. The cumulative incidence rate of total death, cardiovascular death, and end-stage renal disease was significantly different (p<0.0001) between individuals with low, medium and high PRS4 (PRS with sex, age of onset and diabetes duration). In addition, our data show that intensive blood pressure control achieved during ADVANCE trial led to a significant reduction of total death (HR=0.797, p=0.046) and cardiovascular death (HR=0.677, p=0.009) in individuals included in the highest PRS4 third only, and the reduction in cardiovascular and total death remained significant during ADVANCE-ON. Again, in line with previous clinical observations[23] no such benefit was observed for total and cardiovascular death with intensive glycemic control but it was observed for ESRD only in individuals carrying the highest PRS4 values (HR=0.345, p=0.043 at year 4.5) remaining significant in ADVANCE-ON (HR=0.455, p=0.026 at year 9.5). It should be noted that 59.2% cases of ESRD occurred in the highest PRS4 third (FIG. 14).

Figure 16:
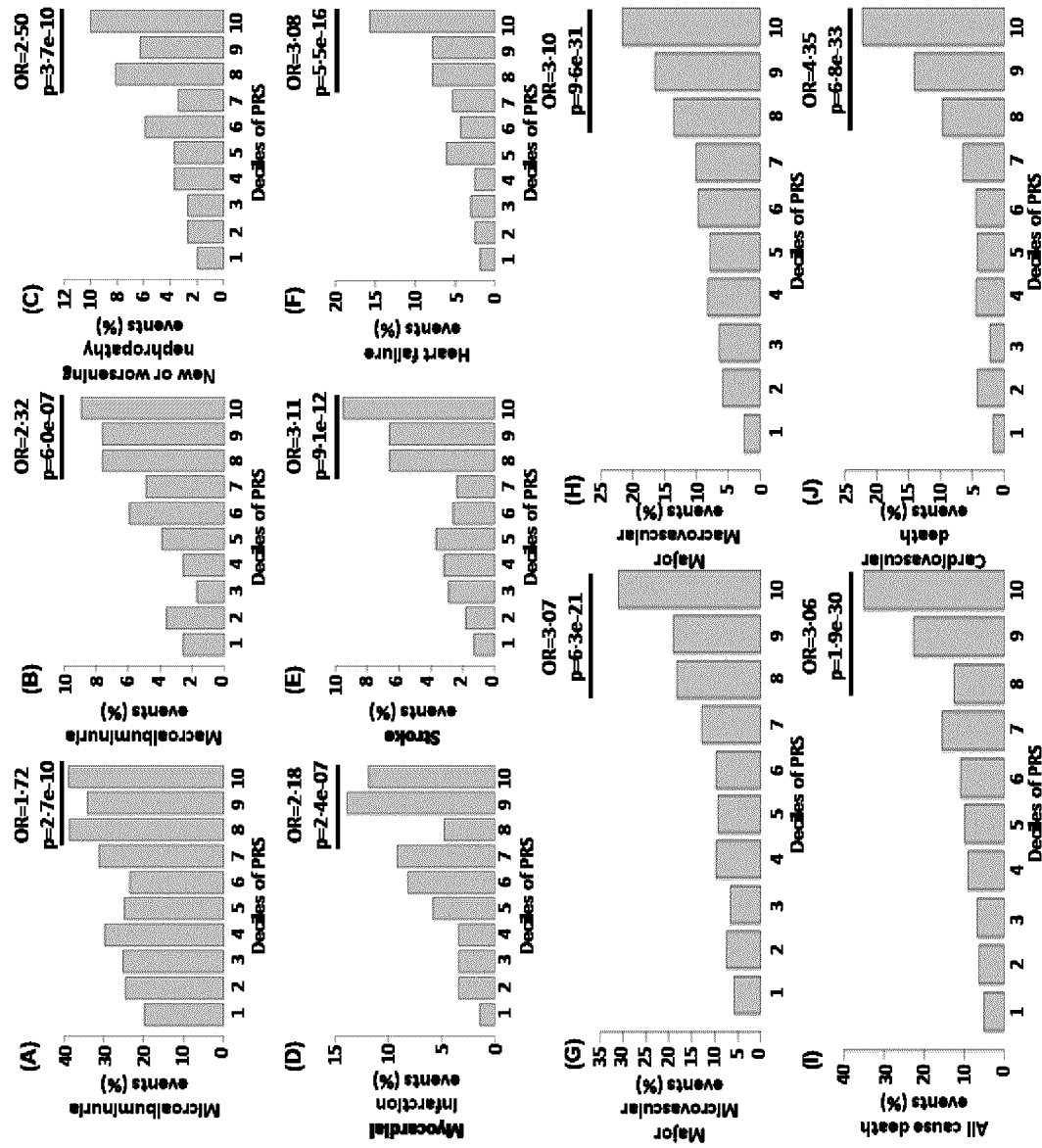
FIG. 16: Percentage of events by deciles of PRS4. OR and p-values were obtained by comparing the top 30% of distribution with the remainder of population. (A) Microalbuminuria; (B) Macroalbuminuria; (C) New or worsening nephropathy; (D) Myocardial infarction; (E) Stroke; (F) Heart failure; (G) Major Microvascular; (H) Major Macrovascular; (I) All cause death; and (J) Cardiovascular death events.

The risk of macrovascular outcomes and death increased exponentially according to PRS4 deciles, rising sharply at the last three deciles of the distribution, suggesting that 30% can be considered the threshold for high risk individuals (FIG. 16). For instance, the top three deciles of ADVANCE participants with the highest PRS4 had a 4.4-fold (p=$1.9 \times 10^{-30}$) increased risk of cardiovascular death and 3.1-fold (p=$6.8 \times 10^{-33}$) of all-cause death than the rest of participants. Here the PRS4 identified about one third of ADVANCE participants at more than 2-fold greater risk than the rest of subjects for almost all T2D complications shown in FIG. 16.

Figure 17:
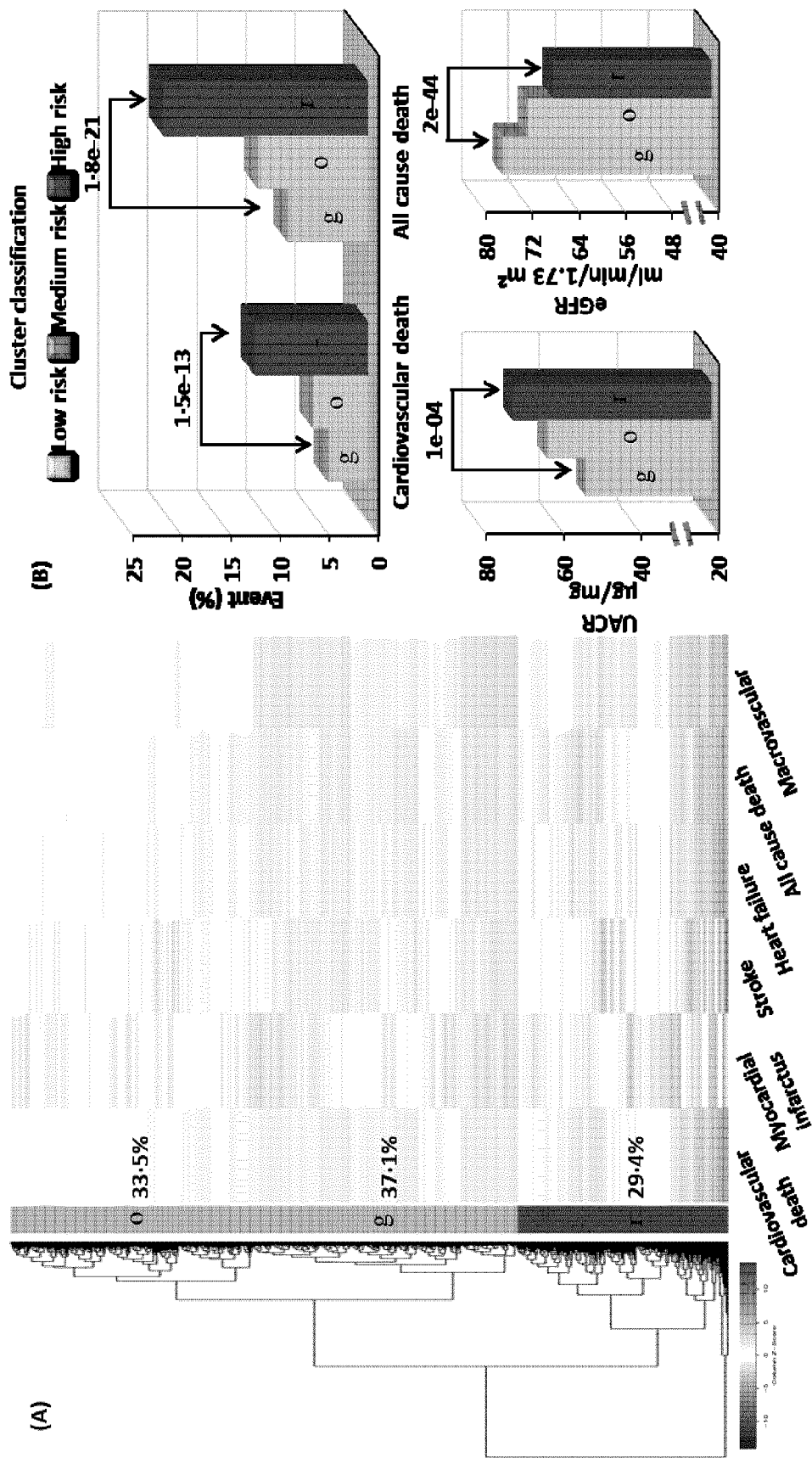
FIG. 17: Clustering of combined macrovascular disease risk by PRS4 using unsupervised hierarchical clustering algorithm. This clustering method identified three clusters of individuals with low (green; "g"), medium (orange; "o"), or high (red; "r") risk for combined macrovascular risk representing 37.1%, 33.5%, and 29.4% respectively of ADVANCE patients. (A) The PRS4 values for each participant and each outcome were represented by Z-score (blue color: low risk score & red color: high risk score) in the heat map. (B) The incidence (%) of cardiovascular and all cause death were compared between the low and high risk clusters. UACR and eGFR values were determined in the three clusters and compared between the low and high risk clusters. Abbreviations: UACR: Urinary albumin creatinine ratio, eGFR: Estimated glomerular filtration rate based on CKD-EPI formula.

The threshold of 30% was confirmed by an unbiased, unsupervised hierarchical clustering analysis that identified three clusters of individuals representing 37.1%, 33.5%, and 29.4% of ADVANCE having a low, medium, or high genetic risk of major macrovascular events including myocardial infarction, stroke, heart failure, and cardiovascular and all cause death (FIG. 17). The incidence of cardiovascular death was 3.8 fold higher in individuals at high (11%) vs low genetic risk (2.9%) (p=$1.5 \times 10^{-13}$). One fifth (20%) of individuals of the high genetic risk group have died during the ADVANCE trial compared to only 5% in the low risk category (p=$1.8 \times 10^{-21}$). The difference was also highly significant for microvascular events (including albuminuria and decrease of eGFR) known to contribute to the high level of mortality in high risk individuals (FIG. 17, right panel).

Example 3: PRS Outperformed Clinical Scores in Identifying Diabetic Patients with Increased Risk for Incident and Prevalent Vascular Complications and Cardiovascular Mortality It is generally perceived that clinical risk scores are better than genetic ones to predict the risk of diseases. However, in the whole ADVANCE cohort, it was noted several years ago that the risks of major CVD and of major coronary heart diseases were over-estimated by the Framingham and UKPDS scores. The AUCs for major cardiovascular events (95% CI) with the re-calibrated UKPDS equations were 0.61 (0.57-0.66), 0.62 (0.57-0.66) and 0.70 (0.65-0.76), performing better than the Framingham one (p<0.004 for UKPDS vs both Framingham)[39]. The authors explained the poor performance of these clinical scores in ADVANCE cohort by the fact that patients in ADVANCE are generally older, are from many countries with different ethnic backgrounds, and have characteristics different from those on which the scores were developed initially.

Prior analyses have evaluated genetic prediction of T2D[13], kidney diseases[40], stroke[18] or cardiovascular outcomes[41]. However, such analyses were limited to either a few SNPs or employed SNPs whose association with the disease was not well validated. Other considerations were that the genetic scores must improve the performance of the clinical ones and not the reciprocal or included in the clinical component, phenotypes that are clearly genetically based (for instance sex, race, ethnicity, family history).

Potential clinical utility of GRS emerged in the last few years with the demonstration that subjects in the highest genetic risk category for coronary heart disease events had the largest relative and absolute clinical benefit from statin therapy[42]. Interestingly, GRS were recently applied in reclassification of diabetes into 5 genetic/clinical categories leading to distinct outcomes[43].

In our study, we selected a high number of well validated common SNPs to construct our PRS and considered that the strength of genetic markers above clinical ones is their presence from birth contrasting with clinical markers of processes already initiated[44]. By dividing the 622 SNPs into 27 risk factors that were further divided into 9 risk groups of vascular complications of T2D, we noticed that more than one SNP per locus were included in the PRS because they were associated to different complications in ADVANCE (FIG. 6). We propose here that taking into account genetic pleiotropy and population specific SNP determinants contribute to a better coverage of the populations. Pleiotropy has been recently proposed as a way of improving accuracy of GRS[45,46].

Most recently a re-analysis of the robust and highly reproducible PRS developed for schizophrenia demonstrated that it contains SNPs strongly associated to ancestry which led the author to suggest caution about PRS[47]. He concluded that any PRS derived from European subjects, cannot be applied to non-Europeans and that previous studies including those cited above, on heart coronary disease and statin therapy[42] and on T2D diabetes re-classification[43] should be re-examined in the light of these findings. We recently published a strong East-West gradient in the prevalence and incidence of T2D complications in Europe[19] that appears to be due in part to a highly significant and genetically-based earlier age of onset of T2D in patients of Slavic origin. We thus selected a subset of 34,570 independent SNPs to perform a principal component (PC)[19] analysis of our genotyped patients[48]. PC1 separated the 4098 individuals into Caucasian of either Slavic or Celtic origin as described previously[19] and this was important to distinguish genomic from environmentally based determinants. For instance, we showed that age of onset of T2D and development of albuminuria were more genetically dependent compared to the presence of hypertension or low eGFR that were more influenced by the environment[19]. We thus incorporated the individual PC1 values to the 622 SNPs as an IGB to create the PRS. Our PRS is thus composed of a combination of SNPs associated to risk factors of T2D complications and PC1/IGB values associated to geo-ethnic stratification within the Caucasian population. Thus, while we concur with Curtis[47] on the importance of ethnicity in the development of diseases (even with increased granularity to capture lesser differences within the same racial group as a consequence of various migrations and admixtures), we propose that ancestral genomic background when relevant to diseases, needs to be incorporated into the PRS and our study demonstrates that the predictive power of the PRS can be improved by the inclusion of sex, age, age of onset and duration of disease exposure in addition to geo-ethnicity in the model.

Several studies have discussed the importance of timing in the application of a genetic test to be clinically useful, underlying the relative contribution to prevalent and incident cases. In ADVANCE, we observed that the penetrance of outcomes is different between macro- and microvascular complications[38]. For instance, in patients with T2D, age, age at T2D diagnosis and diabetes duration are independently positively associated to macrovascular events and death whereas only diabetes duration is independently associated to microvascular events and this is particularly true in young patients. Similarly to ADVANCE, the TODAY clinical trial reported a rapid rise in hypertension and nephropathy in youth with T2D[49]. Age of onset of diabetes is the most important contributor to the PRS to predict microvascular events (FIGS. 7 and 10), while age contributes the most to the prediction of macrovascular events and death by the PRS (see FIG. 8). Furthermore, while a GRS, even with a limited number of SNPs, was significant for prevalence of myocardial infarct in a coronary angiography study, it was not significant for incident cases. The authors concluded that utility of genetic scoring is in primary prevention[50]. Similar observation was made by de Vries et al.[51] in the Rotterdam study where a GRS composed of 152 SNPs improved the prediction of prevalent coronary heart diseases (CHD) beyond traditional risk factors and family history but was not significant for incident CHD cases. We adhere to this conclusion, particularly when testing subjects who already had the pathologic condition at the time of inclusion into the study. We demonstrated here the power of stratifying subjects along gradients of PRS. As discussed above the prediction is better with prevalence than incidence of microvascular complications since they were already present at the time of patients' recruitment into the ADVANCE trial. Again, the main clinical utility of the PRS is in primary prevention before target organ damage.

A genetic risk score alone does not have inherent clinical utility, its clinical utility refers more to its ability to prevent or ameliorate adverse health outcomes by using its results to inform/advise clinical decision-making. Thus, the clinical utility of a risk engine depends not only on its predictive capacity but also on the discrimination thresholds chosen, the set of covariates used and the selection of appropriate control groups. It also includes analyses of prevalent as well as incident cases and finally the contribution of ethnicity, as shown here.

Figure 13:
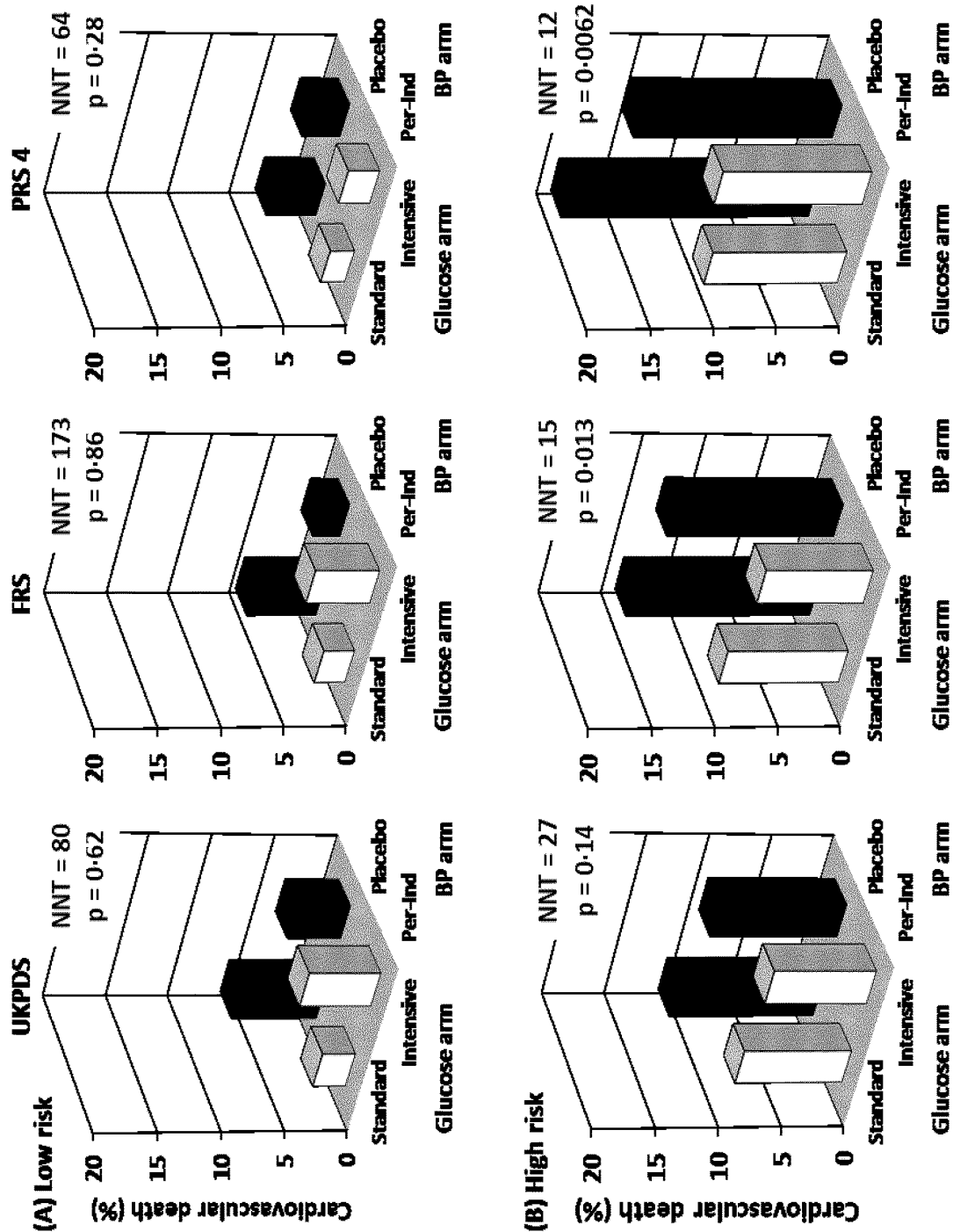
FIG. 13: Effect of ADVANCE treatments on cardiovascular death inpatients stratified into low (A) and high (B) risk groups by UKPDS, FRS and PRS4. The model used here includes PRS, sex, age of diagnosis and diabetes duration (see PRS4 in FIG. 7). The NNT is shown for patients who received the combined BP lowering and intensive glucose control treatments and the p values are for the differences in NNT between this group and the combined control group. Abbreviation: NNT: Number needed to treat, BP: Blood pressure, Per-Ind: Perindopril-Indapamide.

The capacity to detect subjects with the best response to medication is one of the most important observations of this study. The PRS was the best to distinguish subjects who benefit the most from intensive antihypertensive and glucose lowering therapies applied in ADVANCE. FIG. 13 illustrates three main components of the present study: 1) Subjects classified into the low PRS category did not benefit from intensive therapies compared to patients of the higher PRS thirds; classification was the best with PRS compared to UKPDS and Framingham scores. 2) Combination of glucose and blood pressure intensive therapies showed the best reduction in risk, as reported in ADVANCE[22] and finally, 3) the highest thirds of PRS had the lowest number needed to treat with combined therapies: Only 12 subjects are needed to save one life over the 4.5-year period of ADVANCE.

In conclusion, we showed here that PRS outperformed clinical scores in identifying diabetic patients with increased risk for incident and prevalent vascular complications and cardiovascular mortality. The highest benefit of treatment was confined to the highest genetic risk category.

The strength of the present study resides in the dataset used for risk prediction that includes longitudinal data collected over a period of 9.5 years with relatively few missing values. Second, the selection of validated genomic variants was made from large meta-analyses and therefore overfitting was low in our cohort. Third, our prediction models are based on genetic variants that are present at birth and reliable demographic variables that are usually collected during clinical practice without requiring the presence of any clinical manifestations or initial outcomes.

REFERENCES

1. Emerging Risk Factors Collaboration, Sarwar N, Gao P, et al. Diabetes mellitus, fasting blood glucose concentration, and risk of vascular disease: a collaborative meta-analysis of 102 prospective studies. Lancet 2010; 375: 2215-22.
2. Jacobs E, Hoyer A, Brinks R, Kuss O, Rathmann W. Burden of Mortality Attributable to Diagnosed Diabetes: A Nationwide Analysis Based on Claims Data From 65 Million People in Germany. Diabetes Care 2017; 40:1703-9.
3. American Diabetes Association. 9. Cardiovascular Disease and Risk Management: Standards of Medical Care in Diabetes-2018. Diabetes Care 2018; 41:S86-S104.
4. Zarkoob H, Lewinsky S, Almgren P, Melander O, Fakhrai-Rad H. Utilization of genetic data can improve the prediction of type 2 diabetes incidence in a Swedish cohort. PLoS One 2017; 12:e0180180.
5. Kengne A P. The ADVANCE cardiovascular risk model and current strategies for cardiovascular disease risk evaluation in people with diabetes. Cardiovasc J Afr 2013; 24:376-81.
6. Stevens R J, Kothari V, Adler A I, Stratton I M, United Kingdom Prospective Diabetes Study G. The UKPDS risk engine: a model for the risk of coronary heart disease in Type II diabetes (UKPDS 56). Clin Sci (Lond) 2001; 101:671-9.
7. van Dieren S, Beulens J W, Kengne A P, et al. Prediction models for the risk of cardiovascular disease in patients with type 2 diabetes: a systematic review. Heart 2012; 98:360-9.
8. Kengne A P, Patel A, Marre M, et al. Contemporary model for cardiovascular risk prediction in people with type 2 diabetes. Eur J Cardiovasc Prev Rehabil 2011; 18:393-8.
9. Abraham G, Inouye M. Genomic risk prediction of complex human disease and its clinical application. Curr Opin Genet Dev 2015; 33:10-6.
10. Lall K, Magi R, Morris A, Metspalu A, Fischer K. Personalized risk prediction for type 2 diabetes: the potential of genetic risk scores. Genet Med 2017; 19:322-9.
11. Lei X, Huang S. Enrichment of minor allele of SNPs and genetic prediction of type 2 diabetes risk in British population. PLoS One 2017; 12:e0187644.
12. Wu Y, Jing R, Dong Y, et al. Functional annotation of sixty-five type-2 diabetes risk SNPs and its application in risk prediction. Sci Rep 2017; 7:43709.
13. Anand S S, Meyre D, Pare G, et al. Genetic information and the prediction of incident type 2 diabetes in a high-risk multiethnic population: the EpiDREAM genetic study. Diabetes Care 2013; 36:2836-42.
14. Mihaescu R, Moonesinghe R, Khoury M J, Janssens A C. Predictive genetic testing for the identification of high-risk groups: a simulation study on the impact of predictive ability. Genome Med 2011; 3:51.
15. Escott-Price V, Shoai M, Pither R, Williams J, Hardy J. Polygenic score prediction captures nearly all common genetic risk for Alzheimer's disease. Neurobiol Aging 2017; 49:214 e7-e11.
16. Patel A, Group A C, MacMahon S, et al. Effects of a fixed combination of perindopril and indapamide on macrovascular and microvascular outcomes in patients with type 2 diabetes mellitus (the ADVANCE trial): a randomised controlled trial. Lancet 2007; 370:829-40.
17. Ninomiya T, Perkovic V, de Galan B E, et al. Albuminuria and kidney function independently predict cardiovascular and renal outcomes in diabetes. J Am Soc Nephrol 2009; 20:1813-21.
18. Ibrahim-Verbaas C A, Fornage M, Bis J C, et al. Predicting stroke through genetic risk functions: the CHARGE Risk Score Project. Stroke 2014; 45:403-12.
19. Hamet P, Haloui M, Harvey F, et al. PROX1 gene CC genotype as a major determinant of early onset of type 2 diabetes in slavic study participants from Action in Diabetes and Vascular Disease: Preterax and Diamicron MR Controlled Evaluation study. J Hypertens 2017; 35 Suppl 1:S24-S32.
20. Zoungas S, Chalmers J, Neal B, et al. Follow-up of blood-pressure lowering and glucose control in type 2 diabetes. N Engl J Med 2014; 371:1392-406.
21. ADVANCE Collaborative Group, Patel A, MacMahon S, et al. Intensive blood glucose control and vascular outcomes in patients with type 2 diabetes. N Engl J Med 2008; 358:2560-72.
22. Zoungas S, de Galan B E, Ninomiya T, et al. Combined effects of routine blood pressure lowering and intensive glucose control on macrovascular and microvascular outcomes in patients with type 2 diabetes: New results from the ADVANCE trial. Diabetes Care 2009; 32:2068-74.
23. Wong M G, Perkovic V, Chalmers J, et al. Long-term Benefits of Intensive Glucose Control for Preventing End-Stage Kidney Disease: ADVANCE-ON. Diabetes Care 2016; 39:694-700.
24. Dcct Edic research group. Effect of intensive diabetes treatment on albuminuria in type 1 diabetes: long-term follow-up of the Diabetes Control and Complications Trial and Epidemiology of Diabetes Interventions and Complications study. Lancet Diabetes Endocrinol 2014; 2:793-800.
25. D'Agostino R B, Sr., Vasan R S, Pencina M J, et al. General cardiovascular risk profile for use in primary care: the Framingham Heart Study. Circulation 2008; 117:743-53.
26. Dalgaard P. Introductory statistics with R. 2nd ed. ed 2008.
27. Robin X, Turck N, Hainard A, et al. pROC: an open-source package for R and S+ to analyze and compare ROC curves. BMC Bioinformatics 2011; 12:77.
28. DeLong E R, DeLong D M, Clarke-Pearson D L. Comparing the areas under two or more correlated receiver operating characteristic curves: a nonparametric approach. Biometrics 1988; 44:837-45.
29. Raj A, Stephens M, Pritchard J K. fast STRUCTURE: variational inference of population structure in large SNP data sets. Genetics 2014; 197:573-89.
30. Purcell S, Neale B, Todd-Brown K, et al. PLINK: a tool set for whole-genome association and population-based linkage analyses. Am J Hum Genet 2007; 81:559-75.
31. Delaneau O, Marchini J, Zagury J F. A linear complexity phasing method for thousands of genomes. Nat Methods 2011; 9:179-81.
32. Howie B N, Donnelly P, Marchini J. A flexible and accurate genotype imputation method for the next generation of genome-wide association studies. PLoS Genet 2009; 5:e1000529.
33. https://mathgen.stats.ox.ac.uk/impute/1000GP_Phase3.html.
34. Cunningham F, Amode M R, Barrell D, et al. Ensembl 2015. Nucleic Acids Res 2015; 43:D662-9.
35. Southam L, Panoutsopoulou K, Rayner N W, et al. The effect of genome-wide association scan quality control on imputation outcome for common variants. Eur J Hum Genet 2011; 19:610-4.
36. Price A L, Patterson N J, Plenge R M, Weinblatt M E, Shadick N A, Reich D. Principal components analysis corrects for stratification in genome-wide association studies. Nat Genet 2006; 38:904-9.
37. Radholm K, Chalmers J, Ohkuma T, et al. Use of the waist-to-height-ratio to predict cardiovascular risk in patients with diabetes: results from ADVANCE-ON. Diabetes Obes Metab 2018.
38. Zoungas S, Woodward M, Li Q, et al. Impact of age, age at diagnosis and duration of diabetes on the risk of macrovascular and microvascular complications and death in type 2 diabetes. Diabetologia 2014; 57:2465-74.
39. Kengne A P, Patel A, Colagiuri S, et al. The Framingham and UK Prospective Diabetes Study (UKPDS) risk equations do not reliably estimate the probability of cardiovascular events in a large ethnically diverse sample of patients with diabetes: the Action in Diabetes and Vascular Disease: Preterax and Diamicron-MR Controlled Evaluation (ADVANCE) Study. Diabetologia 2010; 53:821-31.
40. Ma J, Yang Q, Hwang S J, Fox C S, Chu A Y. Genetic risk score and risk of stage 3 chronic kidney disease. BMC Nephrol 2017; 18:32.
41. van Setten J, Isgum I, Pechlivanis S, et al. Serum lipid levels, body mass index, and their role in coronary artery calcification: a polygenic analysis. Circ Cardiovasc Genet 2015; 8:327-33.
42. Mega J L, Stitziel N O, Smith J G, et al. Genetic risk, coronary heart disease events, and the clinical benefit of statin therapy: an analysis of primary and secondary prevention trials. Lancet 2015; 385:2264-71.
43. Ahlqvist E, Storm P, Karajamaki A, et al. Novel subgroups of adult-onset diabetes and their association with outcomes: a data-driven cluster analysis of six variables. Lancet Diabetes Endocrinol 2018.
44. Hamet P. Missing heritability or need for reality check of clinical utility in genomic testing? J Hypertens 2014; 32:1395-6.
45. Witoelar A, Jansen I E, Wang Y, et al. Genome-wide Pleiotropy Between Parkinson Disease and Autoimmune Diseases. JAMA Neurol 2017; 74:780-92.
46. Li J, Wei Z, Hakonarson H. Application of computational methods in genetic study of inflammatory bowel disease. World J Gastroenterol 2016; 22:949-60.
47. Curtis D. Polygenic risk score for schizophrenia is more strongly associated with ancestry than with schizophrenia. bioRxiv 2018.
48. Price A L, Patterson N J, Plenge R M, Weinblatt M E, Shadick N A, Reich D. Principal components analysis corrects for stratification in genome-wide association studies. Nat Genet 2006; 38:904-9.
49. Today Study Group. Rapid rise in hypertension and nephropathy in youth with type 2 diabetes: the TODAY clinical trial. Diabetes Care 2013; 36:1735-41.
50. Patel R S, Sun Y V, Hartiala J, et al. Association of a genetic risk score with prevalent and incident myocardial infarction in subjects undergoing coronary angiography. Circ Cardiovasc Genet 2012; 5:441-9.
51. de Vries P S, Kavousi M, Ligthart S, et al. Incremental predictive value of 152 single nucleotide polymorphisms in the 10-year risk prediction of incident coronary heart disease: the Rotterdam Study. Int J Epidemiol 2015; 44:682-8.

The invention claimed is:
1. A method for predicting a subject's risk of diabetes complications and/or response to therapy, the method comprising:

(a) genotyping said subject at a plurality of risk alleles associated with the diabetes complications and their risk factors;
(b) genotyping said subject at a plurality of ancestry-informative markers;
(c) providing a computer programmed with information of a matching cohort of subjects with outcome data over a selected period of interest, the matching cohort of subjects being diagnosed with diabetes or pre-diabetes and being genotyped at said plurality of risk alleles and at said plurality of ancestry-informative markers;
(d) generating a polygenic risk score (PRS) by calculating weighted genetic risk scores (wGRS) weighting the number of risk alleles by the effect size of their associations, adding to said wGRS a geo-ethnic principal component (PC) value determined from the subject's genotype at said ancestry-informative markers, and comparing the PRS of said subject with that constructed using a logistic regression model from said matching cohort of subjects with outcome data collected during the selected period of interest; and
(e) predicting said subject's risk of diabetes complications and/or response to therapy based on said PRS, wherein:
the plurality of risk alleles comprise at least 100 different single nucleotide polymorphisms (SNPs) selected from: rs10923931, rs2779116, rs340874, rs7578597, rs243021, rs7593730, rs552976, rs7578326, rs1801282, rs4607103, rs11708067, rs1470579, rs10010131, rs7754840, rs1800562, rs9472138, rs2191349, rs864745, rs1799884, rs4607517, rs972283, rs4737009, rs896854, rs13266634, rs10811661, rs13292136, rs12779790, rs1111875, rs2334499, rs231362, rs2237892, rs5215, rs1552224, rs1387153, rs10830963, rs1153188, rs1531343, rs7961581, rs7957197, rs7998202, rs11634397, rs8042680, rs9939609, rs1046896, rs855791, rs3127553, rs2815752, rs7531118, rs1514175, rs4130548, rs11165623, rs1555543, rs984222, rs1011731, rs633715, rs543874, rs2820292, rs4846567, rs6429082, rs2867125, rs6755502, rs713586, rs887912, rs6545714, rs2890652, rs10195252, rs2176040, rs6784615, rs6795735, rs3849570, rs2325036, rs13078807, rs6440003, rs9816226, rs1516725, rs10938397, rs2112347, rs4836133, rs6861681, rs1294421, rs806794, rs206936, rs16894959, rs6905288, rs987237, rs943005, rs9400239, rs9491696, rs2489623, rs1055144, rs10968576, rs6163, rs7903146, rs4929949, rs10840100, rs10767658, rs10767664, rs2293576, rs3817334, rs7121446, rs718314, rs7138803, rs1443512, rs4771122, rs12429545, rs10132280, rs12885454, rs10150332, rs7144011, rs4776970, rs2241423, rs2531992, rs12444979, rs12446632, rs2650492, rs7498665, rs7359397, rs1549293, rs1558902, rs7239883, rs6567160, rs571312, rs29941, rs3810291, rs16996700, rs4823006, rs11579312, rs4072037, rs914615, rs13427836, rs17346504, rs16827742, rs11678190, rs11678190, rs13079877, rs1077216, rs7634770, rs13160548, rs12719264, rs17738155, rs2110904, rs4722909, rs17301329, rs7851726, rs1109861, rs17343073, rs1801239, rs6602163, rs12764441, rs3740393, rs7922045, rs729014, rs10899033, rs649529, rs2303658, rs7145202, rs1728897, rs1528472, rs231227, rs6513791, rs2828785, rs1800615, rs12136063, rs267734, rs3850625, rs2802729, rs807601, rs1260326, rs6546838, rs13538, rs4667594, rs2712184, rs6795744, rs2861422, rs347685, rs9682041, rs10513801, rs17319721, rs228611, rs11959928, rs11959928, rs7759001, rs881858, rs9472135, rs316009, rs3127573, rs3750082, rs848490, rs7805747, rs7805747, rs3758086, rs1731274, rs4744712, rs1044261, rs10994860, rs163160, rs963837, rs4014195, rs10774021, rs10491967, rs7956634, rs1106766, rs653178, rs716877, rs626277, rs476633, rs2453533, rs2467853, rs491567, rs1394125, rs4293393, rs13329952, rs164748, rs11657044, rs8068318, rs12460876, rs11666497, rs6088580, rs17216707, rs4821467, rs17367504, rs17367504, rs848309, rs4360494, rs112557609, rs3889199, rs2932538, rs2289081, rs11690961, rs74181299, rs11689667, rs1250259, rs13082711, rs3774372, rs419076, rs419076, rs871606, rs1458038, rs13107325, rs78049276, rs146853253, rs13139571, rs1566497, rs17059668, rs1173771, rs10057188, rs31864, rs1799945, rs805303, rs185819, rs11154027, rs36083386, rs449789, rs1322639, rs76206723, rs17477177, rs6557876, rs35783704, rs2071518, rs4454254, rs72765298, rs4373814, rs1813353, rs9337951, rs10826995, rs4590817, rs932764, rs11191548, rs7129220, rs381815, rs11442819, rs2289125, rs633185, rs8258, rs11222084, rs10770612, rs73099903, rs7312464, rs17249754, rs139236208, rs3184504, rs3184504, rs10850411, rs12434998, rs9323988, rs1378942, rs56249585, rs7500448, rs7226020, rs62080325, rs17608766, rs12940887, rs57927100, rs7236548, rs2116941, rs2206815, rs1327235, rs6081613, rs6015450, rs6015450, rs73161324, rs12628032, rs12037222, rs4420065, rs4129267, rs2794520, rs12239046, rs1260326, rs6734238, rs511154, rs1800789, rs2522056, rs4705952, rs6901250, rs13233571, rs9987289, rs10745954, rs1183910, rs340029, rs2847281, rs4420638, rs12027135, rs4660293, rs2479409, rs2131925, rs7515577, rs629301, rs1689800, rs2642442, rs4846914, rs514230, rs1367117, rs4299376, rs7570971, rs2972146, rs2290159, rs645040, rs442177, rs6450176, rs9686661, rs12916, rs6882076, rs3757354, rs3177928, rs2814944, rs9488822, rs605066, rs1564348, rs12670798, rs2072183, rs17145738, rs4731702, rs11776767, rs1495741, rs12678919, rs2081687, rs2293889, rs2954029, rs11136341, rs581080, rs1883025, rs9411489, rs10761731, rs2255141, rs2923084, rs10128711, rs3136441, rs174546, rs12280753, rs964184, rs7941030, rs11220462, rs7134375, rs11613352, rs7134594, rs1169288, rs4759375, rs4765127, rs2929282, rs1532085, rs11649653, rs3764261, rs16942887, rs2000999, rs2925979, rs11869286, rs7206971, rs4148008, rs4129767, rs7241918, rs12967135, rs737337, rs10401969, rs2277862, rs2902940, rs6029526, rs6065906, rs181362, rs5756931, rs161802, rs225132, rs11206510, rs17114036, rs9970807, rs56170783, rs7528419, rs646776, rs646776, rs602633, rs12122341, rs11810571, rs6689306, rs12118721, rs13376333, rs1800594, rs10911021, rs35700460, rs17465637, rs17465637, rs67180937, rs585967, rs4299376, rs13407662, rs10176176, rs7568458, rs17678683, rs6725887, rs6725887, rs114123510, rs1250229, rs13003675, rs7623687, rs142695226, rs139016349, rs9818870, rs16851055, rs12493885, rs72627509, rs10857147, rs2634074, rs12646447, rs17042171, rs2200733, rs1906599, rs6843082, rs7678555, rs4593108, rs6841581, rs2306556, rs72689147, rs7692395, rs4975709, rs9369640, rs9349379, rs12526453, rs6909752, rs3130683, rs4472337, rs12205331, rs1544935, rs56015508, rs2916260, rs556621, rs632728, rs783396, rs12202017, rs12190287, rs6922269, rs2048327, rs10455872, rs10455872, rs2315065, rs6941513, rs4721377, rs10486776, rs12669789, rs11984041, rs11984041, rs7798197, rs2107595, rs2107595, rs10230207, rs112370447, rs11556924, rs11556924, rs264, rs2083636, rs2001846, rs2954029, rs6475606, rs1537370, rs4977574, rs4977574, rs2891168, rs10757278, rs1333047, rs1333049, rs514659, rs514659, rs532436, rs1887318, rs2505083, rs1870634, rs501120, rs1746048, rs1746048, rs1004467, rs11191416, rs12413409, rs11196288, rs10840293, rs3993105, rs2019090, rs2839812, rs9326246, rs964184, rs12425791, rs2229357, rs2681472, rs3184504, rs10774625, rs653178, rs2238151, rs10744777, rs17696736, rs2244608, rs11057830, rs4304924, rs16945184, rs11617955, rs55940034, rs1924981, rs12435908, rs1005224, rs963474, rs10139550, rs72743461, rs1994016, rs1994016, rs3825807, rs7164479, rs7165042, rs7173743, rs2083460, rs247616, rs7193343, rs2106261, rs879324, rs7500448, rs4843416, rs113348108, rs2281727, rs9914266, rs4792143, rs12936587, rs9897596, rs35895680, rs4643373, rs7212798, rs8068952, rs6565653, rs1122608, rs1122608, rs8108632, rs56131196, rs28451064, rs9982601, rs9982601, rs2473248, rs4330912, rs72480273, rs61830764, rs7575873, rs1374204, rs2168443, rs11719201, rs10935733, rs900399, rs2724475, rs2131354, rs4432842, rs2946179, rs35261542, rs9379832, rs9368777, rs1187118, rs1415701, rs10872678, rs798489, rs11765649, rs6959887, rs62466330, rs13266210, rs6989280, rs12543725, rs12551019, rs3780573, rs1411424, rs4836833, rs10818797, rs2497304, rs79237883, rs740746, rs2421016, rs10830963, rs11055034, rs2306547, rs1351394, rs7964361, rs7998537, rs34217484, rs1819436, rs7402982, rs1011939, rs113086489, rs72833480, rs10402712, rs6040076, rs28530618, rs6016377, rs2229742, and rs134594;

the plurality of ancestry-informative markers comprise at least 1000 different SNPs; and the wGRS is determined by the equation $$wGRS_i^k = \sum_{j=1}^{m} X_{ij}^k \times \beta_j^k,$$

where $X_{ij}^k$ is the allele frequency of $i^{th}$ subject in $j^{th}$ SNP for $k^{th}$ phenotype, and $\beta$ is the effect size of the phenotype.

2. The method of claim 1, wherein the PRS further comprises one or more clinical components, wherein the clinical components comprise said subject's sex, age, age of onset of diabetes, duration of diabetes, or any combination thereof.

3. The method of claim 1, wherein said plurality of risk alleles comprise at least 200 different SNPs.

4. The method of claim 1, wherein said plurality of ancestry-informative markers comprise at least 2000 different SNPs.

5. The method of claim 1, wherein said subject has been diagnosed with diabetes or pre-diabetes.

6. The method of claim 5, wherein said PRS distinguishes subjects who benefit the most from intensive antihypertensive and/or glucose lowering therapy.

7. The method of claim 5, wherein said PRS enables the prediction of diabetic or pre-diabetic patients with increased risk for vascular complications and/or cardiovascular mortality.

8. The method of claim 5, wherein said diabetes complications comprise macroalbuminuria, low glomerular filtration rate (GFR), new or worsening nephropathy, new or worsening retinopathy, doubling serum creatinine, major microvascular, major macrovascular, myocardial infarction, stroke, heart failure, all causes of death, cardiovascular death, or any combination thereof.

9. A method for treating a subject having diabetes, said method comprising predicting the subject's diabetes complications and/or response to therapy as set forth in claim 1, and beginning or modifying the anti-diabetes treatment of said subject based on said PRS.

10. A computer-implemented process of predicting a subject's diabetes complications and/or response to therapy, the process comprising:
    (a) providing a computer programmed with information of the matching cohort of subjects as set forth in claim 1 (c);
    (b) inputting or receiving genotyping information from said subject at a plurality of risk alleles associated with diabetes;
    (c) inputting or receiving genotyping information from said subject at a plurality of ancestry-informative markers;
    (d) generating a polygenic risk score (PRS) as set forth in claim 1 (d); and
    (e) communicating said PRS to said subject and/or to said subject's health care provider.

11. The computer-implemented process of claim 10, which is a cloud-based computer-implemented process.

12. The computer-implemented process of claim 10, wherein the PRS further comprises one or more clinical components, wherein the clinical components comprise said subject's sex, age, age of onset of diabetes, duration of diabetes, or any combination thereof.

13. The method of claim 1, wherein said plurality of risk alleles comprise at least 200 different SNPs.

14. The method of claim 1, wherein said plurality of risk alleles comprise at least 300 different SNPs.

15. The method of claim 1, wherein said plurality of ancestry-informative markers comprise at least 5000 different SNPs.

16. The method of claim 1, further comprising communicating said PRS to said subject and/or to said subject's health care provider.

17. A method for processing a human clinical biological sample, the method comprising:
    (a) providing a biological sample from a subject diagnosed with diabetes or pre-diabetes;
    (b) genotyping the biological sample at a plurality of ancestry-informative markers and at a plurality of risk alleles associated with diabetes complications and their risk factors, wherein:
        the plurality of ancestry-informative markers comprise at least 1000 different SNPs; and
        the plurality of risk alleles comprise at least 100 different single nucleotide polymorphisms (SNPs) selected from: rs10923931, rs2779116, rs340874, rs7578597, rs243021, rs7593730, rs552976, rs7578326, rs1801282, rs4607103, rs11708067, rs1470579, rs10010131, rs7754840, rs1800562, rs9472138, rs2191349, rs864745, rs1799884, rs4607517, rs972283, rs4737009, rs896854, rs13266634, rs10811661, rs13292136, rs12779790, rs1111875, rs2334499, rs231362, rs2237892, rs5215, rs1552224, rs1387153, rs10830963, rs1153188, rs1531343, rs7961581, rs7957197, rs7998202, rs11634397, rs8042680, rs9939609, rs1046896, rs855791, rs3127553, rs2815752, rs7531118, rs1514175, rs4130548, rs11165623, rs1555543, rs984222, rs1011731, rs633715, rs543874, rs2820292, rs4846567, rs6429082, rs2867125, rs6755502, rs713586, rs887912, rs6545714, rs2890652, rs10195252, rs2176040, rs6784615, rs6795735, rs3849570, rs2325036, rs13078807, rs6440003, rs9816226, rs1516725, rs10938397, rs2112347, rs4836133, rs6861681, rs1294421, rs806794, rs206936, rs16894959, rs6905288, rs987237, rs943005, rs9400239, rs9491696, rs2489623, rs1055144, rs10968576, rs6163, rs7903146, rs4929949, rs10840100, rs10767658, rs10767664, rs2293576, rs3817334, rs7121446, rs718314, rs7138803, rs1443512, rs4771122, rs12429545, rs10132280, rs12885454, rs10150332, rs7144011, rs4776970, rs2241423, rs2531992, rs12444979, rs12446632, rs2650492, rs7498665, rs7359397, rs1549293, rs1558902, rs7239883, rs6567160, rs571312, rs29941, rs3810291, rs16996700, rs4823006, rs11579312, rs4072037, rs914615, rs13427836, rs17346504, rs16827742, rs11678190, rs11678190, rs13079877, rs1077216, rs7634770, rs13160548, rs12719264, rs17738155, rs2110904, rs4722909, rs17301329, rs7851726, rs1109861, rs17343073, rs1801239, rs6602163, rs12764441, rs3740393, rs7922045, rs729014, rs10899033, rs649529, rs2303658, rs7145202, rs1728897, rs1528472, rs231227, rs6513791, rs2828785, rs1800615, rs12136063, rs267734, rs3850625, rs2802729, rs807601, rs1260326, rs6546838, rs13538, rs4667594, rs2712184, rs6795744, rs2861422, rs347685, rs9682041, rs10513801, rs17319721, rs228611, rs11959928, rs11959928, rs7759001, rs881858, rs9472135, rs316009, rs3127573, rs3750082, rs848490, rs7805747, rs7805747, rs3758086, rs1731274, rs4744712, rs1044261, rs10994860, rs163160, rs963837, rs4014195, rs10774021, rs10491967, rs7956634, rs1106766, rs653178, rs716877, rs626277, rs476633, rs2453533, rs2467853, rs491567, rs1394125, rs4293393, rs13329952, rs164748, rs11657044, rs8068318, rs12460876, rs11666497, rs6088580, rs17216707, rs4821467, rs17367504, rs17367504, rs848309, rs4360494, rs112557609, rs3889199, rs2932538, rs2289081, rs11690961, rs74181299, rs11689667, rs1250259, rs13082711, rs3774372, rs419076, rs419076, rs871606, rs1458038, rs13107325, rs78049276, rs146853253, rs13139571, rs1566497, rs17059668, rs1173771, rs10057188, rs31864, rs1799945, rs805303, rs185819, rs11154027, rs36083386, rs449789, rs1322639, rs76206723, rs17477177, rs6557876, rs35783704, rs2071518, rs4454254, rs72765298, rs4373814, rs1813353, rs9337951, rs10826995, rs4590817, rs932764, rs11191548, rs7129220, rs381815, rs11442819, rs2289125, rs633185, rs8258, rs11222084, rs10770612, rs73099903, rs7312464, rs17249754, rs139236208, rs3184504, rs3184504, rs10850411, rs12434998, rs9323988, rs1378942, rs56249585, rs7500448, rs7226020, rs62080325, rs17608766, rs12940887, rs57927100, rs7236548, rs2116941, rs2206815, rs1327235, rs6081613, rs6015450, rs6015450, rs73161324, rs12628032, rs12037222, rs4420065, rs4129267, rs2794520, rs12239046, rs1260326, rs6734238, rs511154, rs1800789, rs2522056, rs4705952, rs6901250, rs13233571, rs9987289, rs10745954, rs1183910, rs340029, rs2847281, rs4420638, rs12027135, rs4660293, rs2479409, rs2131925, rs7515577, rs629301, rs1689800, rs2642442, rs4846914, rs514230, rs1367117, rs4299376, rs7570971, rs2972146, rs2290159, rs645040, rs442177, rs6450176, rs9686661, rs12916, rs6882076, rs3757354, rs3177928, rs2814944, rs9488822, rs605066, rs1564348, rs12670798, rs2072183, rs17145738, rs4731702, rs11776767, rs1495741, rs12678919, rs2081687, rs2293889, rs2954029, rs11136341, rs581080, rs1883025, rs9411489, rs10761731, rs2255141, rs2923084, rs10128711, rs3136441, rs174546, rs12280753, rs964184, rs7941030, rs11220462, rs7134375, rs11613352, rs7134594, rs1169288, rs4759375, rs4765127, rs2929282, rs1532085, rs11649653, rs3764261, rs16942887, rs2000999, rs2925979, rs11869286, rs7206971, rs4148008, rs4129767, rs7241918, rs12967135, rs737337, rs10401969, rs2277862, rs2902940, rs6029526, rs6065906, rs181362, rs5756931, rs161802, rs225132, rs11206510, rs17114036, rs9970807, rs56170783, rs7528419, rs646776, rs646776, rs602633, rs12122341, rs11810571, rs6689306, rs12118721, rs13376333, rs1800594, rs10911021, rs35700460, rs17465637, rs17465637, rs67180937, rs585967, rs4299376, rs13407662, rs10176176, rs7568458, rs17678683, rs6725887, rs6725887, rs114123510, rs1250229, rs13003675, rs7623687, rs142695226, rs139016349, rs9818870, rs16851055, rs12493885, rs72627509, rs10857147, rs2634074, rs12646447, rs17042171, rs2200733, rs1906599, rs6843082, rs7678555, rs4593108, rs6841581, rs2306556, rs72689147, rs7692395, rs4975709, rs9369640, rs9349379, rs12526453, rs6909752, rs3130683, rs4472337, rs12205331, rs1544935, rs56015508, rs2916260, rs556621, rs632728, rs783396, rs12202017, rs12190287, rs6922269, rs2048327, rs10455872, rs10455872, rs2315065, rs6941513, rs4721377, rs10486776, rs12669789, rs11984041, rs11984041, rs7798197, rs2107595, rs2107595, rs10230207, rs112370447, rs11556924, rs11556924, rs264, rs2083636, rs2001846, rs2954029, rs6475606, rs1537370, rs4977574, rs4977574, rs2891168, rs10757278, rs1333047, rs1333049, rs514659, rs514659, rs532436, rs1887318, rs2505083, rs1870634, rs501120, rs1746048, rs1746048, rs1004467, rs11191416, rs12413409, rs11196288, rs10840293, rs3993105, rs2019090, rs2839812, rs9326246, rs964184, rs12425791, rs2229357, rs2681472, rs3184504, rs10774625, rs653178, rs2238151, rs10744777, rs17696736, rs2244608, rs11057830, rs4304924, rs16945184, rs11617955, rs55940034, rs1924981, rs12435908, rs1005224, rs963474, rs10139550, rs72743461, rs1994016, rs1994016, rs3825807, rs7164479, rs7165042, rs7173743, rs2083460, rs247616, rs7193343, rs2106261, rs879324, rs7500448, rs4843416, rs113348108, rs2281727, rs9914266, rs4792143, rs12936587, rs9897596, rs35895680, rs4643373, rs7212798, rs8068952, rs6565653, rs1122608, rs1122608, rs8108632, rs56131196, rs28451064, rs9982601, rs9982601, rs2473248, rs4330912, rs72480273, rs61830764, rs7575873, rs1374204, rs2168443, rs11719201, rs10935733, rs900399, rs2724475, rs2131354, rs4432842, rs2946179, rs35261542, rs9379832, rs9368777, rs1187118, rs1415701, rs10872678, rs798489, rs11765649, rs6959887, rs62466330, rs13266210, rs6989280, rs12543725, rs12551019, rs3780573, rs1411424, rs4836833, rs10818797, rs2497304, rs79237883, rs740746, rs2421016, rs10830963, rs11055034, rs2306547, rs1351394, rs7964361, rs7998537, rs34217484, rs1819436, rs7402982, rs1011939, rs113086489, rs72833480, rs10402712, rs6040076, rs28530618, rs6016377, rs2229742, and rs134594.

18. The method of claim 17, further comprising obtaining clinical components from the subject, wherein the clinical components comprise the subject's sex, age, age of onset of diabetes, duration of diabetes, or any combination thereof.

19. The method of claim 17, wherein said plurality of risk alleles comprise at least 200 different SNPs.

20. The method of claim 17, wherein said plurality of ancestry-informative markers comprise at least 2000 different SNPs.

* * * * *